US012714094B2

(12) United States Patent
Lynd et al.

(10) Patent No.: US 12,714,094 B2
(45) Date of Patent: Aug. 25, 2026

(54) CRYOPROTECTANT POLYMERS AND METHODS OF MAKING AND USING THEREOF

(71) Applicant: BOARD OF REGENTS, THE UNIVERSITY OF TEXAS SYSTEM, Austin, TX (US)

(72) Inventors: Nathaniel Lynd, Austin, TX (US); Aaron Burkey, Austin, TX (US); Jacob Baltzegar, Columbia, SC (US); Adrianne Rosales, Austin, TX (US); Dale Harris, Austin, TX (US); Alex Hillsley, Austin, TX (US); Natalie Julia Czarnecki, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1210 days.

(21) Appl. No.: 17/629,635

(22) PCT Filed: Jul. 24, 2020

(86) PCT No.: PCT/US2020/043539
§ 371 (c)(1),
(2) Date: Jan. 24, 2022

(87) PCT Pub. No.: WO2021/016575
PCT Pub. Date: Jan. 28, 2021

(65) Prior Publication Data

US 2022/0248664 A1 Aug. 11, 2022

Related U.S. Application Data

(60) Provisional application No. 62/878,099, filed on Jul. 24, 2019.

(51) Int. Cl.
*A01N 1/125* (2025.01)
*C08G 81/02* (2006.01)
*C08L 71/02* (2006.01)

(52) U.S. Cl.
CPC ........... *A01N 1/125* (2025.01); *C08G 81/025* (2013.01); *C08L 71/02* (2013.01); *C08G 2261/145* (2013.01)

(58) Field of Classification Search
CPC .................. A01N 1/125; C07C 317/02; C08G 2261/145; C08L 71/02
See application file for complete search history.

(56) References Cited

U.S. PATENT DOCUMENTS

2015/0320031 A1 11/2015 Andreasen et al.
2018/0325820 A1 11/2018 Matyjaszewski et al.

OTHER PUBLICATIONS

Frey et al., Oxidation-Responsive and “Clickable” Poly(ethylene glycol) via Copolymerization of 2-(Methylthio)ethyl Glycidyl Ether, J. Am. Chem. Soc. 2016, 138, 9212-9223. (Year: 2016).*

(Continued)

*Primary Examiner* — Marc S Zimmer
*Assistant Examiner* — Surbhi M Du
(74) *Attorney, Agent, or Firm* — Meunier Carlin & Curfman LLC

(57) ABSTRACT

Disclosed herein are cryoprotective polymers. The cryoprotective polymers can include one or more DMSO-like moieties (e.g., one or more sulfoxide moieties, one or more sulfone moieties, or a combination thereof) that many the hydrogen-bonding characteristics of DMSO with the advantages of polymeric cryoprotectants. In doing so, very high post-thaw recovery of example cells and tissues can be achieved. The cryoprotective effects of these polymers can result from a limitation of total ice formation, a disruption of water hydrogen-bonding networks, and a well-timed vitrification of the unfrozen space between ice crystals. Also (Continued)

DMSO

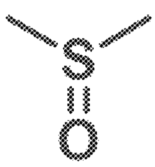

Prevents water from freezing.
Toxic at high concentrations.

PMGS

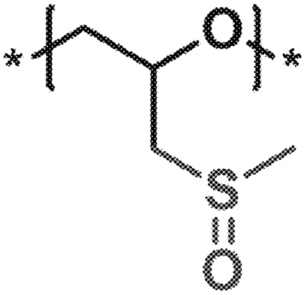

High glass-forming propensity.
Less toxic.

provided are cryoprotective solutions comprising these cryoprotective polymers as well as methods of using these polymers and solutions to preserve biological materials.

16 Claims, 31 Drawing Sheets

(56) References Cited

OTHER PUBLICATIONS

Matyjaszewski et al., Biocompatible Polymeric Analogues of DMSO Prepared by Atom Transfer Radical Polymerization, Biomacromolecules 2017, 18, 475-482 (Year: 2017).*
Thomas et al. Beyond Poly(ethylene glycol): Linear Polyglycerol as a Multifunctional Polyether for Biomedical and Pharmaceutical Applications; Biomacromolecules 2014, 15, 1935-1954. (Year: 2014).*
International Search Report and Written Opinion mailed Oct. 20, 2020, from International Application No. PCT/US2020/043539, 10 pages.
C. Wang et al., "Antifreeze Hydrogels from Amphiphilic Statistical Copolymers", Chemistry of Materials, Dec. 13, 2018, vol. 31, pp. 135-145.
Redouan Mahou et al., "Alginate-Poly(ethylene glycol) Hybrid Microspheres with Adjustable Physical Properties", Macromolecules, Jan. 13, 2010, vol. 43, pp. 1371-1378.
Sipei Li et al., "Biocompatible Polymeric Analogues of DMSO Prepared by Atom Transfer Radical Polymerization", Biomacromolecules, Jan. 5, 2017, vol. 18, pp. 475-482.
Toshiyuki Oyama et al., "Polymer Homologue of DMSO; Synthesis of Poly(ehtylene sulfoxide) by Selective Oxidation of Poly(ethylene sulfide)" Macromolecules, Jul. 20, 1999, vol. 32, pp. 5240-5242.
Azim Ziyaei Halimehjani et al., "Multicomponent synthesis of dithiocarbarnates starting from vinyl sulfones/sulfoxides and their use in polymerization reactions", RSC Advances, Aug. 3, 2016, vol. 6, pp. 75223-75226.

* cited by examiner

DMSO

PMGS

Prevents water from freezing.
Toxic at high concentrations.

High glass-forming propensity.
Less toxic.

CRYOPROTECTANT POLYMERS AND METHODS OF MAKING AND USING THEREOF

CROSS REFERENCE TO RELATED APPLICATIONS

This application is a United States National Phase Patent Application of International Patent Application Number PCT/US2020/043539, filed on Jul. 24, 2020, which claims benefit of priority of U.S. Provisional Application No. 62/878,099, filed Jul. 24, 2019, which are incorporated by reference herein in their entirety.

TECHNICAL FIELD

This application relates generally to cryoprotective polymers, cryoprotection solutions comprising these polymers, and methods for the cryopreservation of biological materials.

BACKGROUND

The formation of ice introduces stresses on cells. In particular, osmotic stress results from the increased concentration of solutes in the unfrozen space between ice crystals. Traditionally, small molecule cryoprotectants like dimethyl sulfoxide (DMSO) are used in combination with protein-rich serum to promote post-thaw cell survival. DMSO is believed to balance osmotic pressure by crossing the cell membrane after extracellular ice formation. In doing so, DMSO effectively replaces intracellular water and limits excessive cell shrinkage.

Additionally, DMSO increases cell membrane permeability and facilitates membrane repair, potentially due to a disruption of the water network at the membrane surface. At high concentrations (ca. 50 wt %), DMSO can also promote the vitrification of water through extensive water-DMSO hydrogen bonding. However, small molecule cryoprotectants such as DMSO generally suffer from cytotoxicity and difficult post-thaw removal.

Polymeric cryoprotectants, on the other hand, offer three key advantages over traditional cryoprotectants because of their high molecular weight: (1) high molecular weight materials exert relatively low osmotic osmolality, (2) polymers are less likely to be cytotoxic because they are less likely to freely cross the cell membrane, and (3) concentrated polymer solutions can become viscous or glassy, which provides a level of control over the rate of water diffusion during freezing and thawing.

A handful of potent polymeric cryoprotectants have been identified in past research. Polyampholyte materials have been used to achieve high post-thaw survival and their mechanism of action has been attributed to membrane stabilization during freezing and thawing. Other polymers, such as poly(ethylene oxide) (PEO), hydroxyethyl starch (HES), alginate microgels, and polyvinylpyrrolidone (PVP) have been used. When used in combination with other cryoprotectants, poly(vinyl alcohol) (PVA) can reduce the damaging effects of ice grain coarsening.

While many cryoprotectants have been evaluated, improved cryoprotectants are needed to enable long-term frozen storage of cells and complex tissue without the loss of viability or function. The realization of improved cryoprotectants would facilitate biological research, improve the post-thaw efficacy of therapeutic cell lines, and widen the number of organs and tissues that can be frozen and stored for extended periods of time prior to transplantation. This capability would vastly improve the availability of organs and tissues for regenerative therapies.

SUMMARY

Disclosed herein are cryoprotective polymers. The cryoprotective polymers can include one or more DMSO-like moieties (e.g., one or more sulfoxide moieties, one or more sulfone moieties, or a combination thereof) that marry the hydrogen-bonding characteristics of DMSO with the advantages of polymeric cryoprotectants. In doing so, very high post-thaw recovery of example cells and tissues can be achieved. The cryoprotective effects of these polymers can result from a limitation of total ice formation, a disruption of water hydrogen-bonding networks, and a well-timed vitrification of the unfrozen space between ice crystals. Also provided are cryoprotective solutions comprising these cryoprotective polymers as well as methods of using these polymers and solutions to preserve biological materials.

DETAILED DESCRIPTION

General Definitions

Figure 1:
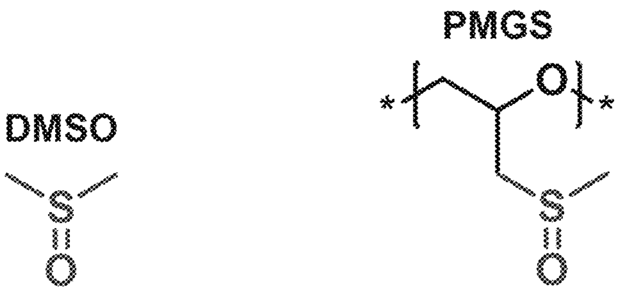
FIG. 1 illustrates an example cryoprotective polymer (poly(methyl glycidyl sulfoxide); PMGS) that incorporates a DMSO-like sulfoxide moiety as a pendant side attached to a polymer backbone.

Terms used herein will have their customary meaning in the art unless specified otherwise. The organic moieties mentioned when defining variable positions within the general formulae described herein (e.g., the term "halogen") are collective terms for the individual sub stituents encompassed by the organic moiety. The prefix $C_n$-$C_m$ indicates in each case the possible number of carbon atoms in the group.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a compound" includes mixtures of two or more such compounds, reference to "an additional chemotherapy agent" includes mixtures of two or more such agents, reference to "the composition" includes mixtures of two or more of such compositions, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

The term "cryoprotective," as used herein, refers to the ability of an agent to protect biological material (e.g., a cell, tissue or organ) such that when the biological material is frozen or otherwise exposed to a lower, normally destructive, temperature, the post-thaw viability of the biological material will be increased relative to biological material frozen or otherwise exposed to a lower, normally destructive, temperature.

Chemical Definitions

The term "alkyl," as used herein, refers to saturated straight, branched, cyclic, primary, secondary or tertiary hydrocarbons, including those having 1 to 20 atoms. In some embodiments, alkyl groups will include $C_1$-$C_{12}$, $C_1$-$C_{10}$, $C_1$-$C_8$, $C_1$-$C_6$, $C_1$-$C_5$, $C_1$-$C_4$, $C_1$-$C_3$, $C_1$-$C_2$, or $C_1$ alkyl groups. Examples of $C_1$-$C_{10}$ alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl and decyl groups, as well as their isomers. Examples of $C_1$-$C_4$-alkyl groups include, for example, methyl, ethyl, propyl, 1-methylethyl, butyl, 1-methylpropyl, 2-methylpropyl and 1,1-dimethylethyl groups.

Cyclic alkyl groups or "cycloalkyl" groups, which are encompassed alkyl, include cycloalkyl groups having from 3 to 10 carbon atoms. Cycloalkyl groups can include a single ring, or multiple condensed rings. In some embodiments, cycloalkyl groups include $C_3$-$C_4$, $C_4$-$C_7$, $C_5$-$C_7$, $C_4$-$C_6$, or $C_5$-$C_6$ cyclic alkyl groups. Non-limiting examples of cycloalkyl groups include adamantyl, cyclopropyl, cyclobutyl, cyclopentyl, cyclohexyl, cycloheptyl, cyclooctyl and the like.

Alkyl groups can be unsubstituted or substituted with one or more moieties selected from the group consisting of alkyl, halo, haloalkyl, hydroxyl, carboxyl, acyl, acyloxy, amino, alkyl- or dialkylamino, amido, arylamino, alkoxy, aryloxy, nitro, cyano, azido, thiol, imino, sulfonic acid, sulfate, sulfonyl, sulfanyl, sulfinyl, sulfamonyl, ester, phosphonyl, phosphinyl, phosphoryl, phosphine, thioester, thioether, acid halide, anhydride, oxime, hydrazine, carbamate, phosphoric acid, phosphate, phosphonate, or any other viable functional group that does not inhibit the biological activity of the compounds of the invention, either unprotected, or protected as necessary, as known to those skilled in the art, for example, as described in Greene, et al., *Protective Groups in Organic Synthesis*, John Wiley and Sons, Third Edition, 1999, hereby incorporated by reference.

Terms including the term "alkyl," such as "alkylcycloalkyl," "cycloalkylalkyl," "alkylamino," or "dialkylamino," will be understood to comprise an alkyl group as defined above linked to another functional group, where the group is linked to the compound through the last group listed, as understood by those of skill in the art.

The term "alkenyl," as used herein, refers to both straight and branched carbon chains which have at least one carbon-carbon double bond. In some embodiments, alkenyl groups can include $C_2$-$C_{20}$ alkenyl groups. In other embodiments, alkenyl can include $C_2$-$C_{12}$, $C_2$-$C_{10}$, $C_2$-$C_8$, $C_2$-$C_6$ or $C_2$-$C_4$ alkenyl groups. In one embodiment of alkenyl, the number of double bonds is 1-3, in another embodiment of alkenyl, the number of double bonds is one or two. Other ranges of carbon-carbon double bonds and carbon numbers are also contemplated depending on the location of the alkenyl moiety on the molecule. "$C_2$-$C_{10}$-alkenyl" groups may include more than one double bond in the chain. The one or more unsaturations within the alkenyl group may be located at any position(s) within the carbon chain as valence permits. In some embodiments, when the alkenyl group is covalently bound to one or more additional moieties, the carbon atom(s) in the alkenyl group that are covalently bound to the one or more additional moieties are not part of a carbon-carbon double bond within the alkenyl group. Examples of alkenyl groups include, but are not limited to, ethenyl, 1-propenyl, 2-propenyl, 1-methyl-ethenyl, 1-butenyl, 2-butenyl, 3-butenyl, 1-methyl-1-propenyl, 2-methyl-1-propenyl, 1-methyl-2-propenyl, 2-methyl-2-propenyl; 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl- 2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-l-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl groups.

The term "alkynyl," as used herein, refers to both straight and branched carbon chains which have at least one carbon-carbon triple bond. In one embodiment of alkynyl, the number of triple bonds is 1-3; in another embodiment of alkynyl, the number of triple bonds is one or two. In some embodiments, alkynyl groups include from $C_2$-$C_{20}$ alkynyl groups. In other embodiments, alkynyl groups may include $C_2$-$C_{12}$, $C_2$-$C_{10}$, $C_2$-$C_8$, $C_2$-$C_6$ or $C_2$-$C_4$ alkynyl groups. Other ranges of carbon-carbon triple bonds and carbon numbers are also contemplated depending on the location of the alkenyl moiety on the molecule. For example, the term "$C_2$-$C_{10}$-alkynyl" as used herein refers to a straight-chain or branched unsaturated hydrocarbon group having 2 to 10 carbon atoms and containing at least one triple bond, such as ethynyl, prop-1-yn-1-yl, prop-2-yn-1-yl, n-but-1-yn-1-yl, n-but-1-yn-3-yl, n-but-1-yn-4-yl, n-but-2-yn-1-yl, n-pent-1-yn-1-yl, n-pent-1-yn-3-yl, n-pent-1-yn-4-yl, n-pent-1-yn-5-yl, n-pent-2-yn-1-yl, n-pent-2-yn-4-yl, n-pent-2-yn-5-yl, 3-methylbut-1-yn-3-yl, 3-methylbut-1-yn-4-yl, n-hex-1-yn-1-yl, n-hex-1-yn-3-yl, n-hex-1-yn-4-yl, n-hex-1-yn-5-yl, n-hex-1-yn-6-yl, n-hex-2-yn-1-yl, n-hex-2-yn-4-yl, n-hex-2-yn-5-yl, n-hex-2-yn-6-yl, n-hex-3-yn-1-yl, n-hex-3-yn-2-yl, 3-methylpent-1-yn-1-yl, 3-methylpent-1-yn-3-yl, 3-methylpent-1-yn-4-yl, 3-methylpent-1-yn-5-yl, 4-methylpent-1-yn-1-yl, 4-methylpent-2-yn-4-yl, and 4-methylpent-2-yn-5-yl groups.

The term "haloalkyl" or "alkylhalide," as used herein refers to an alkyl group, as defined above, which is substituted by one or more halogen atoms. In some instances, the haloalkyl group can be an alkyl group substituted by one or more fluorine atoms. In certain instances, the haloalkyl group can be a perfluorinated alkyl group. For example $C_1$-$C_4$-haloalkyl includes, but is not limited to, chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, and pentafluoroethyl.

The term "alkoxy," as used herein, refers to alkyl-O—, wherein alkyl refers to an alkyl group, as defined above. Similarly, the terms "alkenyloxy," "alkynyloxy," "haloalkoxy," "haloalkenyloxy," "haloalkynyloxy," "cycloalkoxy," "cycloalkenyloxy," "halocycloalkoxy," and "halocycloalkenyloxy" refer to the groups alkenyl-O—, alkynyl-O—, haloalkyl-O—, haloalkenyl-O—, haloalkynyl-O—, cycloalkyl-O—, cycloalkenyl-O—, halocycloalkyl-O—, and halocycloalkenyl-O—, respectively, wherein alkenyl, alkynyl, haloalkyl, haloalkenyl, haloalkynyl, cycloalkyl, cycloalkenyl, halocycloalkyl, and halocycloalkenyl are as defined above. Examples of $C_1$-$C_6$-alkoxy include, but are not limited to, methoxy, ethoxy, $C_2H_5$—$CH_2O$—, $(CH_3)_2CHO$—, n-butoxy, $C_2H_5$—$CH(CH_3)O$—, $(CH_3)_2CH$—$CH_2O$—, $(CH_3)_3CO$—, n-pentoxy, 1-methylbutoxy, 2-methylbutoxy, 3-methylbutoxy, 1,1-dimethylpropoxy, 1,2-dimethylpropoxy, 2,2-dimethyl-propoxy, 1-ethylpropoxy, n-hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy, and 1-ethyl-2-methylpropoxy.

The terms "alkylamino" and "dialkylamino," as used herein, refer to alkyl-NH— and $(alkyl)_2N$— groups, where alkyl is as defined above. Similarly, the terms "haloalkylamino" and "halodialkylamino" refer to haloalkyl-NH— and $(haloalkyl)_2$-NH—, where haloalkyl is as defined above.

The term "aryl," as used herein, refers to a monovalent aromatic carbocyclic group of from 6 to 14 carbon atoms. Aryl groups can include a single ring or multiple condensed rings. In some embodiments, aryl groups include $C_6$-$C_{10}$ aryl groups. Aryl groups include, but are not limited to, phenyl, biphenyl, naphthyl, tetrahydronaphtyl, phenylcyclopropyl and indanyl. Aryl groups may be unsubstituted or substituted by one or more moieties selected from halogen, cyano, nitro, hydroxy, mercapto, amino, alkyl, alkenyl, alkynyl, cycloalkyl, cycloalkenyl, haloalkyl, haloalkenyl, haloalkynyl, halocycloalkyl, halocycloalkenyl, alkoxy, alkenyloxy, alkynyloxy, haloalkoxy, haloalkenyloxy, haloalkynyloxy, cycloalkoxy, cycloalkenyloxy, halocycloalkoxy, halocycloalkenyloxy, alkylthio, haloalkylthio, cycloalkylthio, halocycloalkylthio, alkylsulfinyl, alkenylsulfinyl, alkynylsulfinyl, haloalkylsulfinyl, haloalkenylsulfinyl, haloalkynylsulfinyl, alkylsulfonyl, alkenyl sulfonyl, alkynylsulfonyl, haloalkyl-sulfonyl, haloalkenylsulfonyl, haloalkynylsulfonyl, alkylamino, alkenylamino, alkynylamino, di(alkyl)amino, di(alkenyl)-amino, di(alkynyl)amino, or trialkylsilyl.

The term "alkylaryl," as used herein, refers to an aryl group that is bonded to a parent compound through a diradical alkylene bridge, $(—CH_2—)_n$, where n is 1-12 and where "aryl" is as defined above.

The term "alkylcycloalkyl," as used herein, refers to a cycloalkyl group that is bonded to a parent compound through a diradical alkylene bridge, $(—CH_2—)_n$, where n is 1-12 and where "cycloalkyl" is as defined above. The term "cycloalkylalkyl," as used herein, refers to a cycloalkyl group, as defined above, which is substituted by an alkyl group, as defined above.

The term "heteroaryl," as used herein, refers to a monovalent aromatic group of from 1 to 15 carbon atoms (e.g., from 1 to 10 carbon atoms, from 2 to 8 carbon atoms, from 3 to 6 carbon atoms, or from 4 to 6 carbon atoms) having one or more heteroatoms within the ring. The heteroaryl group can include from 1 to 4 heteroatoms, from 1 to 3 heteroatoms, or from 1 to 2 heteroatoms. In some cases, the heteroatom(s) incorporated into the ring are oxygen, nitrogen, sulfur, or combinations thereof. When present, the nitrogen and sulfur heteroatoms may optionally be oxidized. Heteroaryl groups can have a single ring (e.g., pyridyl or furyl) or multiple condensed rings provided that the point of attachment is through a heteroaryl ring atom. Preferred heteroaryls include pyridyl, pyridazinyl, pyrimidinyl, pyrazinyl, triazinyl, pyrrolyl, indolyl, quinolinyl, isoquinolinyl, quinazolinyl, quinoxalinyl, furanyl, thiophenyl, furyl, pyrrolyl, imidazolyl, oxazolyl, isoxazolyl, isothiazolyl, pyrazolyl, benzofuranyl, and benzothiophenyl. Heteroaryl rings may be unsubstituted or substituted by one or more moieties as described for aryl above.

The term "alkylheteroaryl," as used herein, refers to a heteroaryl group that is bonded to a parent compound through a diradical alkylene bridge, $(-CH_2-)_n$, where n is 1-12 and where "heteroaryl" is as defined above.

The terms "cycloheteroalkyl," "heterocyclyl," "heterocyclic," and "heterocyclo" are used herein interchangeably, and refer to fully saturated or unsaturated, cyclic groups, for example, 3 to 7 membered monocyclic or 4 to 7 membered monocyclic; 7 to 11 membered bicyclic, or 10 to 15 membered tricyclic ring systems, having one or more heteroatoms within the ring. The heterocyclyl group can include from 1 to 4 heteroatoms, from 1 to 3 heteroatoms, or from 1 to 2 heteroatoms. In some cases, the heteroatom(s) incorporated into the ring are oxygen, nitrogen, sulfur, or combinations thereof. When present, the nitrogen and sulfur heteroatoms may optionally be oxidized, and the nitrogen heteroatoms may optionally be quaternized. The heterocyclyl group may be attached at any heteroatom or carbon atom of the ring or ring system and may be unsubstituted or substituted by one or more moieties as described for aryl groups above.

Exemplary monocyclic heterocyclic groups include, but are not limited to, pyrrolidinyl, pyrrolyl, pyrazolyl, oxetanyl, pyrazolinyl, imidazolyl, imidazolinyl, imidazolidinyl, oxazolyl, oxazolidinyl, isoxazolinyl, isoxazolyl, thiazolyl, thiadiazolyl, thiazolidinyl, isothiazolyl, isothiazolidinyl, furyl, tetrahydrofuryl, thienyl, oxadiazolyl, piperidinyl, piperazinyl, 2-oxopiperazinyl, 2-oxopiperidinyl, 2-oxopyrrolodinyl, 2-oxoazepinyl, azepinyl, 4-piperidonyl, pyridinyl, pyrazinyl, pyrimidinyl, pyridazinyl, tetrahydropyranyl, morpholinyl, thiamorpholinyl, thiamorpholinyl sulfoxide, thiamorpholinyl sulfone, 1,3-dioxolane and tetrahydro-1,1-dioxothienyl, triazolyl, triazinyl, and the like.

The term "alkylheterocyclyl" and "alkylcycloheteroalkyl" are used herein interchangeably, and refer to a heterocyclyl group that is bonded to a parent compound through a diradical alkylene bridge, $(-CH_2-)_n$, where n is 1-12 and where "heterocyclyl" is as defined above. The term "heterocyclylalkyl," as used herein, refers to a heterocyclyl group, as defined above, which is substituted by an alkyl group, as defined above.

The term "halogen," as used herein, refers to the atoms fluorine, chlorine, bromine and iodine. The prefix halo- (e.g., as illustrated by the term haloalkyl) refers to all degrees of halogen substitution, from a single substitution to a perhalo substitution (e.g., as illustrated with methyl as chloromethyl $(-CH_2C_1)$, dichloromethyl $(-CHCl_2)$, trichloromethyl $(-CCl_3)$).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

Cryoprotective Polymers

Provided herein are cryoprotective polymers. The cryoprotective polymers can include one or more sulfoxide-containing repeat units, one or more sulfone-containing repeat units, or a combination thereof.

In some embodiments, the cryoprotective polymer can comprise one or more sulfoxide-containing repeat units (e.g., one or more methyl sulfoxide-containing repeat units). In some embodiments, the cryoprotective polymer can comprise one or more sulfone-containing repeat units (e.g., one or more methylsulfone-containing repeat units). In some embodiments, the cryoprotective polymer can comprise one or more sulfoxide-containing repeat units (e.g., one or more methylsulfoxide-containing repeat units) and one or more sulfone-containing repeat units (e.g., one or more methylsulfone-containing repeat units).

The cryoprotective polymer can be water soluble. The cryoprotective polymer can be of varying compositions, structures, and molecular weights. In some embodiments, the cryoprotective polymer comprises a linear polymer. In other embodiments, the cryoprotective polymer comprises a branched polymer. The polymer can also be, for example, a hyperbrached polymer, a star polymer, a graft copolymer, a comb polymer, or a brush polymer.

In some embodiments, the cryoprotective polymer comprises a homopolymer. In other embodiments, the cryoprotective polymer comprises a copolymer. The copolymer can be a random copolymer, a block copolymer, or a combination thereof (e.g., a block copolymer comprising one or more random copolymer blocks).

In some embodiments, the cryoprotective polymer can comprise a copolymer that comprises one or more sulfoxide-containing repeat units (e.g., one or more methylsulfoxide-containing repeat units) and one or more sulfone-containing repeat units (e.g., one or more methylsulfone-containing repeat units). In these embodiments, the ratio of the ratio of the one or more sulfone-containing repeat units to the one or more sulfoxide-containing repeat units can vary. For example, the ratio of the ratio of the one or more sulfone-containing repeat units to the one or more sulfoxide-containing repeat units can be from 5:1 to 1:5.

In some embodiments, the cryoprotective polymer can comprise a copolymer that comprises (1) one or more sulfoxide-containing repeat units (e.g., one or more methyl sulfoxide-containing repeat units), one or more sulfone-containing repeat units (e.g., one or more methylsulfone-containing repeat units), or a combination thereof; and (2) one or more additional monomers. When present, the one or more additional monomers can comprise any suitable monomers. In some embodiments, the one or more additional monomers can include a monomer which enhances the water solubility of the cryoprotective polymer. A monomer can be said to enhance the water solubility of the cryoprotective polymer when the monomer has a higher solubility in water than the one or more sulfoxide-containing repeat units (e.g., one or more methylsulfoxide-containing repeat units) and/or the one or more sulfone-containing repeat units (e.g., one or more methylsulfone-containing repeat units). In certain embodiments, the one or more additional monomers can comprise neutrally charged monomers (e.g., monomers that are uncharged in aqueous solution at pH 7. In certain embodiments, the one or more additional monomers can comprise one or more charged monomers (e.g., one or more monomers that are negatively charged in aqueous solution at pH 7, one or more monomers that are positively charged in aqueous solution at pH 7, or a combination thereof).

In some embodiments, the cryoprotective polymer can comprise a copolymer that comprises (1) one or more sulfoxide-containing repeat units (e.g., one or more methyl sulfoxide-containing repeat units), one or more sulfone-containing repeat units (e.g., one or more methylsulfone-containing repeat units), or a combination thereof; and (2) one or more alkylene oxy repeat units (e.g., one or more ethylene oxy repeat units, one or more propylene oxy repeat units, or a combination thereof). The copolymer can comprise a random copolymer or a block copolymer. In some embodiments, the copolymer can comprise a block copolymer comprising a first block comprising one or more sulfoxide-containing repeat units (e.g., one or more methyl sulfoxide-containing repeat units), one or more sulfone-containing repeat units (e.g., one or more methylsulfone-containing repeat units), or a combination thereof; and a second block comprising one or more alkylene oxy repeat units (e.g., one or more ethylene oxy repeat units, one or more propylene oxy repeat units, or a combination thereof).

In some embodiments, the cryoprotective polymer can comprise a copolymer that comprises (1) one or more sulfoxide-containing repeat units (e.g., one or more methyl sulfoxide-containing repeat units), one or more sulfone-containing repeat units (e.g., one or more methylsulfone-containing repeat units), or a combination thereof; and (2) one or more glycidol repeat units as shown below.

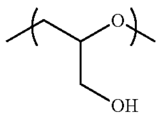

The copolymer can comprise a random copolymer or a block copolymer. In some embodiments, the copolymer can comprise a block copolymer comprising a first block comprising one or more sulfoxide-containing repeat units (e.g., one or more methylsulfoxide-containing repeat units), one or more sulfone-containing repeat units (e.g., one or more methylsulfone-containing repeat units), or a combination thereof; and a second block comprising one or more glycidol repeat units.

In some embodiments, the cryoprotective polymer can comprise a copolymer that comprises (1) one or more sulfoxide-containing repeat units (e.g., one or more methyl sulfoxide-containing repeat units), one or more sulfone-containing repeat units (e.g., one or more methylsulfone-containing repeat units), or a combination thereof; and (2) one or more carboxylate-containing repeat units. In some embodiments, the one or more carboxylate-containing repeat units can comprise the carboxylate-containing repeat unit shown below.

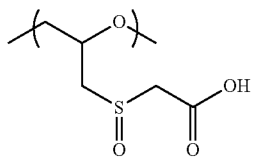

The copolymer can comprise a random copolymer or a block copolymer. In some embodiments, the copolymer can comprise a block copolymer comprising a first block comprising one or more sulfoxide-containing repeat units (e.g., one or more methylsulfoxide-containing repeat units), one or more sulfone-containing repeat units (e.g., one or more methylsulfone-containing repeat units), or a combination thereof; and a second block comprising one or more carboxylate-containing repeat units.

In some embodiments, the cryoprotective polymer can comprise a polymer backbone bearing one or more sulfoxide-containing sidechains, one or more sulfone-containing sidechains, or a combination thereof. In these embodiments, the cryoprotective polymer can comprise one or more pendant DMSO-like moieties (e.g., one or more sulfoxide moieties, one or more sulfone moieties, or a combination thereof) decorating a polymer backbone. In one example, the polymer backbone can comprise a poly(alkylene oxy) backbone, such as a poly(ethylene oxy) backbone.

For example, in some embodiments, the cryoprotective polymer can comprise a polymer or copolymer comprising repeat units defined by the general formula below

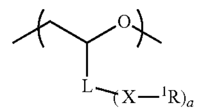

wherein

- L is, individually for each occurrence, absent or represents a linking group;
- X represents, individually for each occurrence, S(═O) or $S(═O)_2$;
- $^1H$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl; and
- a represents an integer of from 1 to 6.

In some embodiments, $^1R$ can be, individually for each occurrence, a substituted or unsubstituted C1-C8 alkyl group. In some embodiments, $^1H$ can be, individually for each occurrence, a substituted or unsubstituted C1-C6 alkyl group. In some embodiments, $^1R$ can be, individually for each occurrence, a substituted or unsubstituted C1-C4 alkyl group. In certain embodiments, $^1R$ can be a methyl group. In certain embodiments, $^1R$ can be an ethyl group. In certain embodiments, $^1R$ can comprise a branched alkyl group, such as an isopropyl group or a tert-butyl group.

In some embodiments, L can be absent. In other embodiments, L is present. When present, the linking group can be any suitable group or moiety which is at minimum bivalent, and connects the one or more X groups to the polymer backbone. The linking group can be composed of any assembly of atoms, including oligomeric and polymeric chains. In some cases, the total number of atoms in the linking group can be from 3 to 200 atoms (e.g., from 3 to 150 atoms, from 3 to 100 atoms, from 3 and 50 atoms, from 3 to 25 atoms, from 3 to 15 atoms, or from 3 to 10 atoms).

In some embodiments, the linking group can be, for example, an alkylene, heteroalkylene (e.g., alkoxylene), alkylarylene, alkylheteroarylene, alkylcycloalkylene, or alkylheterocycloalkylene group. In some embodiments, the linking group can comprise one of the groups above joined to one or both of the moieties to which it is attached by a functional group. Examples of suitable functional groups include, for example, secondary amides (—CONH—), tertiary amides (—CONR—), secondary carbamates (—OCONH—; —NHCOO—), tertiary carbamates (—OCONR—; —NRCOO—), ureas (—NHCONH—; —NRCONH—; —NHCONR—, or —RCONR—), carbinols (—CHOH—, —CROH—), ethers (—O—), and esters (—OO—, —$CH_2O_2C$—, $CHRO_2C$—), wherein R is an alkyl group, an aryl group, or a heterocyclic group. For example, in some embodiments, the linking group can comprise an alkylene group (e.g., a $C_1$-$C_{12}$ alkylene group, a $C_1$-$C_8$ alkylene group, or a $C_1$-$C_6$ alkylene group) bound to one or both of the moieties to which it is attached via an ether, a thioether, an ester (—COO—, —$CH_2O_2C$—, $CHRO_2C$—), a secondary amide (—CONH—), or a tertiary amide (—CONR—), wherein R is an alkyl group, an aryl group, or a heterocyclic group.

In certain embodiments, L is present, and represents a C1-C12 alkylene group or a C1-C12 heteroalkylene group.

In certain embodiments, the cryoprotective polymer or copolymer can comprise one or more of the repeat units below

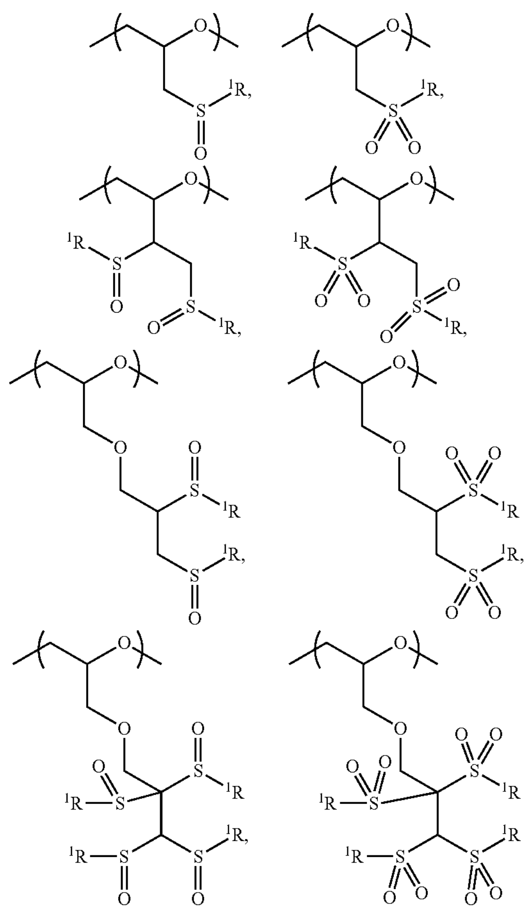

wherein $^1H$ represents, individually for each occurrence, substituted or unsubstituted C1-C6 alkyl. In certain embodiments, $^1R$ is —$CH_3$. In certain embodiments, $^1R$ is ethyl. In certain embodiments, $^1R$ can comprise a branched alkyl group, such as an isopropyl group or a tert-butyl group.

In certain embodiments, the cryoprotective polymer can comprise a polymer defined by the general formula below

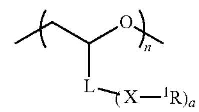

or a blend or copolymer thereof, wherein

L is, individually for each occurrence, absent or represents a linking group;

X represents, individually for each occurrence, S(═O) or S(═O)$_2$;

R represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

n represents an integer from 2 to 500; and a represents an integer of from 1 to 6.

L and $^1R$ can represent any of the possible L and $^1R$ groups discussed above.

In some embodiments, L can, individually for each occurrence, represent a C1-C12 alkylene group or a C1-C12 heteroalkylene group. In some embodiments, $^1R$ can represent, individually for each occurrence, substituted or unsubstituted C1-C8 alkyl (e.g., a methyl group).

In certain embodiments, the cryoprotective polymer can comprise one of the following

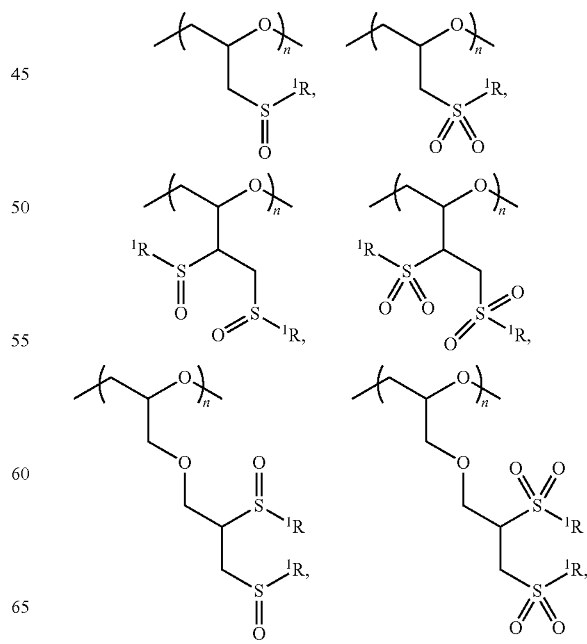

-continued

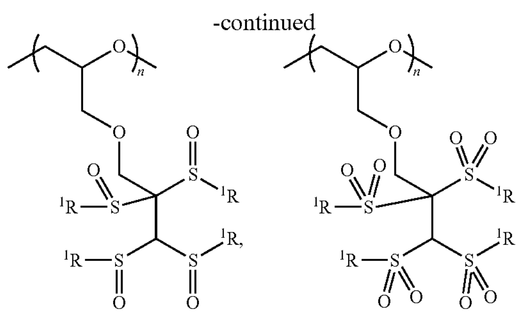

or a copolymer (e.g., a random copolymer or a block copolymer) or blend thereof, wherein n represents an integer from 2 to 500; and $^1R$ represents, individually for each occurrence, substituted or unsubstituted C1-C6 alkyl (e.g., methyl, ethyl, isopropyl, or tert-butyl).

In some embodiments, the cryoprotective polymer can comprise a block copolymer comprising a first block comprising one or more sulfoxide-containing repeat units (e.g., one or more methyl sulfoxide-containing repeat units), one or more sulfone-containing repeat units (e.g., one or more methylsulfone-containing repeat units), or a combination thereof; and a second block comprising one or more alkylene oxy repeat units (e.g., one or more ethylene oxy repeat units, one or more propylene oxy repeat units, or a combination thereof). For example, the cryoprotective polymer can comprise a polymer defined by the general formula below

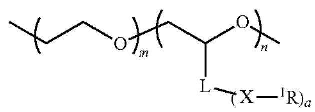

wherein

L is, individually for each occurrence, absent or represents a linking group;

X represents, individually for each occurrence, S(═O) or $S(═O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

m represents an integer from 2 to 500;

n represents an integer from 2 to 500; and a represents an integer of from 1 to 6.

L and $^1R$ can represent any of the possible L and $^1R$ groups discussed above.

In certain embodiments, L can represent a C1-C12 alkylene group or a C1-C12 heteroalkylene group.

In certain embodiments, $^1R$ can represent, individually for each occurrence, C1-C8 alkyl. In certain embodiments, $^1R$ can represent a methyl group. In certain embodiments, $^1R$ can represent an ethyl group. In certain embodiments, $^1R$ can comprise a branched alkyl group, such as an isopropyl group or a tert-butyl group.

In certain embodiments, the cryoprotective polymer can comprise one of the following

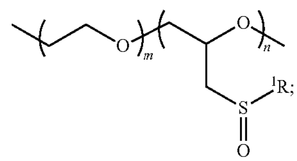

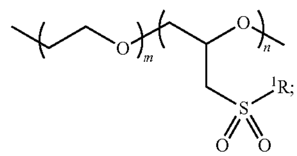

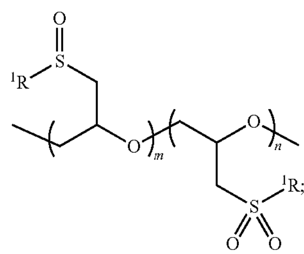

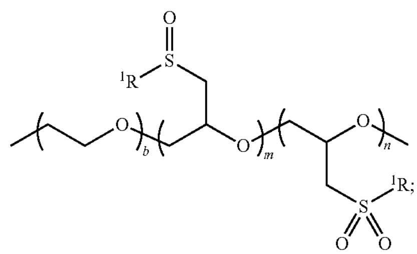

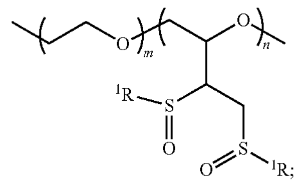

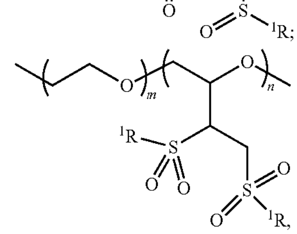

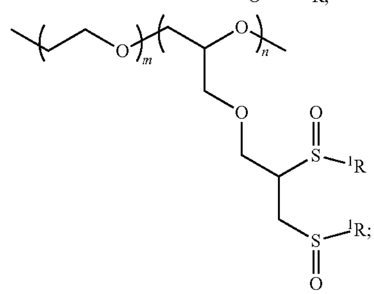

-continued

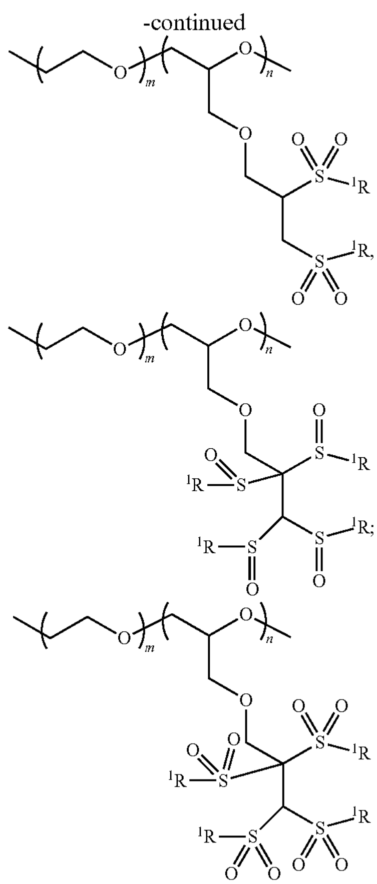

a copolymer or blend thereof, wherein n represents an integer from 2 to 500; m represents an integer from 2 to 500; b represents an integer from 2 to 500; and $^1R$ represents, individually for each occurrence, substituted or unsubstituted C1-C6 alkyl (e.g., methyl).

In some embodiments, the cryoprotective polymer can comprise a block copolymer comprising a first block comprising one or more sulfoxide-containing repeat units (e.g., one or more methylsulfoxide-containing repeat units), one or more sulfone-containing repeat units (e.g., one or more methylsulfone-containing repeat units), or a combination thereof; and a second block comprising one or more glycidol repeat units as shown below.

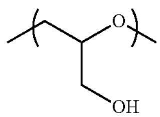

For example, the cryoprotective polymer can comprise a polymer defined by the general formula below

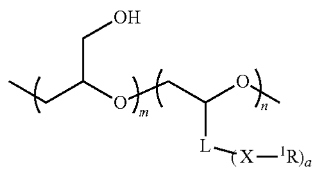

wherein

L is, individually for each occurrence, absent or represents a linking group;

X represents, individually for each occurrence, S(=O) or $S(=O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

m represents an integer from 2 to 500;

n represents an integer from 2 to 500; and a represents an integer of from 1 to 6.

L and $^1R$ can represent any of the possible L and $^1R$ groups discussed above.

In certain embodiments, L can represent a C1-C12 alkylene group or a C1-C12 heteroalkylene group.

In certain embodiments, $^1R$ can represent, individually for each occurrence, C1-C8 alkyl. In certain embodiments, $^1R$ can represent a methyl group. In certain embodiments, $^1R$ can represent an ethyl group. In certain embodiments, $^1R$ can comprise a branched alkyl group, such as an isopropyl group or a tert-butyl group.

In certain embodiments, the cryoprotective polymer can comprise one of the following

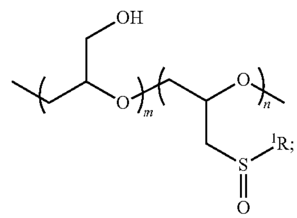

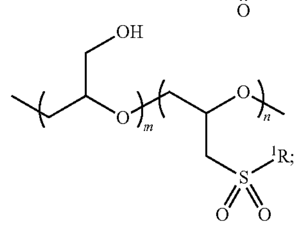

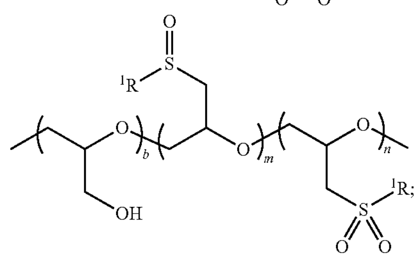

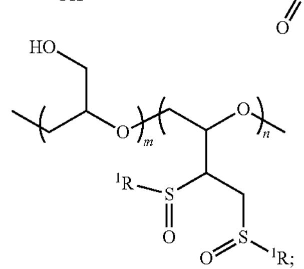

-continued

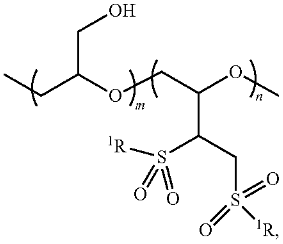

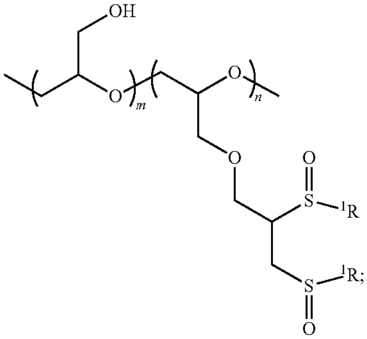

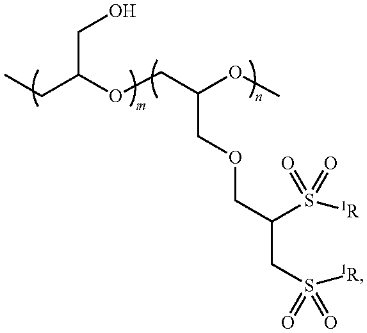

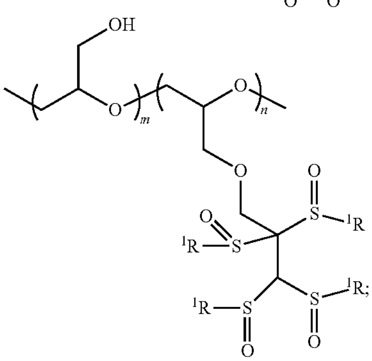

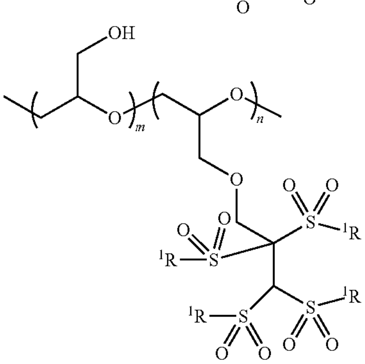

or a copolymer or blend thereof, wherein n represents an integer from 2 to 500; m represents an integer from 2 to 500; b represents an integer from 2 to 500; and $^{1}R$ represents, individually for each occurrence, substituted or unsubstituted C1-C6 alkyl (e.g., methyl).

In other examples the polymer backbone can comprise a poly(alkylene) backbone, such as a poly(ethylene) backbone. For example, in some embodiments, the cryoprotective polymer can comprise a polymer or copolymer comprising repeating monomer units defined by the general formula below

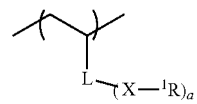

wherein

L is, individually for each occurrence, absent or represents a linking group;

X represents, individually for each occurrence, S(═O) or S(═O)$_2$;

$^{1}R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl; and a represents an integer of from 1 to 6.

L and $^{1}R$ can represent any of the possible L and $^{1}R$ groups discussed above.

In certain embodiments, L can represent a C1-C12 alkylene group or a C1-C12 heteroalkylene group.

In certain embodiments, $^{1}R$ can represent, individually for each occurrence, C1-C8 alkyl. In certain embodiments, $^{1}R$ can represent a methyl group.

In certain embodiments, the cryoprotective polymer can comprise a polymer defined by the general formula below

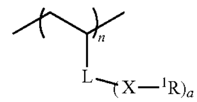

wherein

L is, individually for each occurrence, absent or represents a linking group;

X represents, individually for each occurrence, S(═O) or S(═O)$_2$;

$^{1}R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

n represents an integer from 2 to 500; and a represents an integer of from 1 to 6.

L and $^{1}R$ can represent any of the possible L and $^{1}R$ groups discussed above.

In certain embodiments, L can represent a C1-C12 alkylene group or a C1-C12 heteroalkylene group.

In certain embodiments, $^1R$ can represent, individually for each occurrence, C1-C8 alkyl. In certain embodiments, $^1R$ can represent a methyl group.

In other examples, the cryoprotective polymer can comprise a polymer backbone comprising one or more sulfoxide moieties, one or more sulfone moieties, or a combination thereof. By way of example, in some embodiments, the cryoprotective polymer can comprise a polymer defined by the general formula below

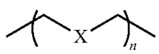

wherein

X represents, individually for each occurrence, S(=O) or $S(=O)_2$; and n represents an integer of from 2 to 500.

Cryoprotective Solutions

Also provided are cryoprotection solution for the preservation of a biological material. The cryoprotective solutions can comprise (i) water and (ii) a cryoprotective polymer derived from one or more sulfoxide-containing repeat units, one or more sulfone-containing repeat units, or a combination thereof. The cryoprotective polymer can comprise any of the cryoprotective polymers described above. In some embodiments, the solution can be buffered at a physiologically acceptable pH (e.g., at a pH of from 6.0 to 8.0, such as a pH of from 6.5 to 7.5).

The amount of cryoprotective polymer in the cryoprotective solution can be varied. In some embodiments, the cryoprotective polymer can be present in the cryoprotective solution in an amount of at least 0.1% by weight (e.g, at least 0.5% by weight, at least 1% by weight, at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, or at least 65% by weight), based on the total weight of the cryoprotective solution. In some embodiments, the cryoprotective polymer can be present in the cryoprotective solution in an amount of 70% by weight or less (e.g., 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 5% by weight or less, 1% by weight or less, or 0.5% by weight or less), based on the total weight of the cryoprotective solution.

The concentration of cryoprotective polymer in the cryoprotective solution can range from any of the minimum values described above to any of the maximum values described above. For example, in some embodiments, the cryoprotective polymer is present in the cryoprotective solution in an amount of from 0.1% by weight to 70% by weight (e.g., from 0.1% by weight to 30% by weight, from 0.1% by weight to 20% by weight, from 0.1% by weight to 15% by weight, or from 0.1% by weight to 10% by weight), based on the total weight of the cryoprotective solution.

Optionally, the cryoprotective solution can further comprise one or more additional cryoprotective agents. A variety of cryoprotective agents are known in the art. Examples of cryoprotective agents include acetamide, agarose, alginate, 1-alanine, albumin, ammonium acetate, butanediol, chondroitin sulfate, chloroform, choline, dextrans, diethylene glycol, dimethyl acetamide, dimethyl formamide, dimethyl sulfoxide (DMSO), erythritol, ethanol, ethylene glycol, formamide, glucose, glycerol, α-glycerophosphate, glycerol monoacetate, glycine, hydroxyethyl starch, inositol, lactose, magnesium chloride, magnesium sulfide, maltose, mannitol, mannose, methanol, methyl acetamide, methylformamide, methyl ureas, phenol, pluronic polyols, polyethylene glycol, polyvinylpyrrolidone, proline, propylene glycol, pyridine N-oxide, nbose, serine, sodium bromide, sodium chloride, sodium iodide, sodium nitrate, sodium sulfate, sorbitol, sucrose, trehalose, triethylene glycol trimethylamine acetate, urea, valine, xylose, etc. The one or more additional cryoprotective can be present in the cryoprotective solution at a concentration of, for example, 0.1 M to 10.0 M (e.g., 0.1 to 2.0 M).

In some embodiments, the cryoprotective solution can further comprise a penetrating cryoprotective agent, such as dimethyl sulfoxide (DMSO), glycerol, ethylene glycol, propylene glycol (PG), or a combination thereof.

In some embodiments, the cryoprotective solution can further comprise a non-penetrating cryoprotective agent, such as polyvinylpyrrolidone (PVP), hydroxyethyl starch (HES), polygeline, maltodextrins, sucrose, or a combination thereof.

In some embodiments, the cryoprotective solution can further comprise a toxicity reducing agent (e.g., an agent that reduces the toxicity of other cryoprotective agents such as DMSO in the cryoprotective solutions), such as acetamide, sulfamide, glycineamide, formamide, urea, or combinations thereof.

In some embodiments, the cryoprotective solution can further comprise both a penetrating cryoprotective agent and a non-penetrating cryoprotective agent.

In some embodiments, the cryoprotective solution can further comprise a penetrating cryoprotective agent, a non-penetrating cryoprotective agent, and a toxicity reducing agent.

Methods of Use

Also provided are methods of using the cryoprotective polymers and cryoprotective solutions described herein. These methods can comprise contacting the biological material with a cryoprotectant solution described herein; and freezing the biological material in contact with the cryoprotectant solution. Optionally, the method can further include thawing the biological material in contact with the cryoprotectant solution to afford a thawed biological material, and removing the cryoprotectant solution from the thawed biological material. In some cases, the thawed biological material can comprise cells having a viability of at least 70% (e.g., at least 75%, at least 80%, at least 85%, at least 90%, at least 95%, at least 98% or at least 99%), as measured using a proliferation assay.

The cryopreservation (and subsequent warming of the biological material) can be conducted in any manner, and may utilize any additional materials, well known in the art. Example embodiments are described in the following discussion and the Examples set forth below.

The cooling (freezing) protocol for cryopreservation can take any suitable form. Many types of cooling protocols are well known to practitioners in the art. Most typically, the cooling protocol calls for continuous rate cooling from the point of ice nucleation to −80° C., with the rate of cooling depending on the characteristics of the biological material being frozen as understood in the art. The cooling rate can be, for example, from −0.1° C. to −10° C. per minute (e.g., from −1° C. to −2° C. per minute). Once the biological material is cooled to about −80° C. by this continuous rate cooling, the material can be transferred to liquid nitrogen or the vapor phase of liquid nitrogen for further cooling to the cryopreservation temperature, which is below the glass transition temperature of the freezing solution (again, typically −130° C. or less).

Once cryopreserved, the biological material can subsequently be rewarmed for removal of the cryopreserved biological material from the cryopreserved state. The warming protocol for taking the biological material out of the frozen state may be any type of warming protocol, which are well known to practitioners in the art. Typically, the warming is done in a one-step procedure in which the cryopreserved specimen is placed into a water bath (temperature of about 37-42° C.) until complete rewarming is effected. More rapid warming is also known.

The biological material can comprise any suitable biological sample, including cells as well as cells integrated into multicellular systems (e.g., tissues, organs, embryos, and complete organisms). The biological material can comprise bacterial cells, fungal cells, yeast cells, animal cells, plant cells, or any combination thereof. In certain embodiments, the biological material can comprise mammalian cells, such as human cells. By way of example, in some embodiments, the biological material can comprise red blood cells, mammalian cultured cells, platelets, leukocytes, Factor VIII, sperm, pancreatic islets, and/or marrow cells.

By way of non-limiting illustration, examples of certain embodiments of the present disclosure are given below.

EXAMPLES

Example 1: Sulfoxide-Functional Polymer Cryoprotectants for the Frozen Storage of Mammalian Cells The development of new cryoprotectants and advancements in understanding their mechanisms of action can help address the need for long-term frozen storage of cells, tissues, and eventually organs. In this example, the synthesis of poly(methyl glycidyl sulfoxide) (PMGS) is described and its promise as a polymer cryoprotectant is demonstrated. Normal human dermal fibroblast cells frozen in a 10 wt % solution of PMGS in PBS exhibited a >90% post-thaw cell survival rate, significantly higher than that of cells in 10 wt % DMSO solutions. DSC studies showed that PMGS limited ice formation in aqueous solutions, facilitating vitrification at a concentration of 60 wt %. The $T_g$ of PMGS in phosphate buffer solution (PBS) increased with increasing PMGS concentration, suggesting that PMGS increases solution viscosity. To investigate the effect of polymer pendant hydrophobicity on macroscopic solution properties, poly(ethyl glycidyl sulfoxide) (PEGS) and poly(isopropyl glycidyl sulfoxide) (PiPGS) were synthesized. The relationship between $T_g$ and concentration of polymer in solution was very similar regardless of pendant hydrophobicity. Therefore, in future studies of these systems, any variations in cell viability are unlikely to be due to macroscopic solution properties alone.

BACKGROUND

The World Health Organization (WHO) estimates that only 10% of the global need for organ transplantation is being met. In the U.S. alone, 730,000 annual deaths can be attributed to end-stage organ disease. Achieving an organ and tissue supply that meets demands depends not only on the sheer number of organs and tissues available but also on the means we have to store and transport them for their end applications. Advances in long-term organ and tissue storage could eventually enable organ and tissue banking, which would increase access to organs by enabling transport over long distances and allow them to be saved until needed. Furthermore, the same technology that enables the effective preservation of organs for transplants can translate to other applications that benefit from preserved cells and tissues such as drug testing and development, tissue engineering, and regenerative medicine.

Cryopreservation, a process by which very low temperatures (often that of liquid nitrogen, −196° C.) are used to preserve living cells and tissues for a prolonged time, can help address the need for long-term storage. To preserve their viability during the extreme freezing and thawing process of cryopreservation, cells and tissues are often frozen in a water-based media containing a cryoprotective solute. Because cryoprotectants are essential to cell survival during cryopreservation, research on understanding their mechanisms of action and the development of new and improved cryoprotectant materials is an ongoing effort.

Cell Injury Caused by Freezing

During the cryopreservation process, cells can experience mechanical and osmotic stresses, both of which affect their survival rates. At high cooling rates, ice crystals can nucleate and grow within the cell, physically piercing organelles or the cell membrane. At lower cooling rates, extracellular ice can form. Because ice crystals exclude solutes, the concentration of solutes in the channels between ice crystals progressively increases, thereby increasing osmotic pressure. To reestablish equilibrium, water leaves the cells, resulting in cell dehydration and shrinkage. If the cells experience excessive dehydration during cooling, the electrolytes that inherently exist inside and outside of the cells can reach lethal concentrations and result in cell death. Others have proposed that the excessive cell shrinkage can result in irreparable damage to the cell membrane.

When the cells are warmed to physiological temperatures, the cells can lyse if they rehydrate too quickly. Additionally, ice can recrystallize as the cells thaw, potentially growing to the point where they puncture the cell membrane. Finally, cells can become densely packed as they are sequestered to the channels between growing ice crystals, causing adverse cell-cell interactions that affect their survival.

Common Cryopreservation Approaches

The post-thaw viability of cryopreserved cells depends on many factors: cell type, cooling rate, thawing rate, overall temperatures, cryoprotectant type, and cryoprotectant concentration. Thus, a set of optimal conditions must be found for each cell type to ensure that the cells not only survive but retain full function after freezing and thawing. The slow-freezing method and vitrification method are two common approaches to cryopreservation.

Slow-Freezing Method. Traditionally, cells and tissues are preserved by the slow-freezing method. Permeating (small-molecule) cryoprotectants are introduced to the cells in lower concentrations ranging from 5-10% w/v, and ice forms as water undergoes the phase transition during cooling. The cells are typically cooled at a rate of ~1° C./min. Theoretically, at such a slow cooling rate, cells should dehydrate rapidly enough to avoid supercooling and intracellular ice formation, thereby protecting the cell membrane and organelles. As the cells cool, extracellular ice forms, causing cells to dehydrate to maintain osmotic equilibrium. The permeating cryoprotectant then enters the cells and replaces the lost water. Because cytoplasm water content is reduced, intracellular ice is less likely to form, thereby reducing the potential for cell damage. Ultimately, the formation of extracellular ice increases the solute concentration inside and outside of the cell, resulting in vitrified cells.

Once the cells are thawed to physiological temperatures, the cryoprotectants must be removed from the cells. Permeating cryoprotectants are removed by exposing the cells to an environment with a lower concentration of the solute. Because the osmotic pressure is higher inside the cell, the cells uptake water and swell above their initial volume. Then, cryoprotectant and water leaves the cells, resulting in shrinkage. The equilibrium cell volume depends on the solute concentrations within and outside of the cell. Because cells are more sensitive to swelling than shrinkage, the impact of solute concentrations on final volume and rate of volume change are important considerations.

Slow freezing is advantageous in that the process is at low-risk of contamination, and the procedures are relatively low-maintenance. However, slow freezing introduces the risk of extracellular ice formation, which can mechanically damage the cells and exert excess osmotic stress on the cells. Moreover, because the cryoprotectant permeates into the cell during the cryopreservation process, the toxicity of the cryoprotectant must be taken into consideration. Excessively high concentrations of permeating cryoprotectant during the thawing process can affect biochemical processes within the cell, in some cases affecting cell differentiation.

Finally, because the optimum cooling rates required by the slow-cooling method are specific to cell type, slow-cooling inhibits the ability to cryopreserve multicellular tissues composed of different kinds of cells. The need to find a compromise rate for each cell type is cited as a limiting factor to preserving more complex systems such as organs.

Vitrification. Rapatz and Luyet were the first to successfully use vitrification to preserve biological viability in cells. They were able to vitrify human erythrocytes by rapidly cooling an aqueous solution of 8.6 M glycerol and successfully rewarm them to physiological temperatures. Since then, vitrification, wherein cells are cooled to cryogenic temperatures without the formation of ice, has continued to be explored as an alternative approach to cryopreservation. To achieve vitrification, cells are exposed to high cryoprotectant concentrations (40-60% w/v) and high cooling rates. In this way, the cell suspensions are cooled directly from the aqueous state to an amorphous glassy state below the glass-transition temperature ($T_g$) instead of being frozen in the presence of ice crystals.

The cell solution's propensity to vitrify depends heavily on solution viscosity and $T_g$. More viscous solutions are more likely to vitrify, and a higher $T_g$ makes vitrification more accessible. The warming rate is also crucial; if the cells are warmed too slowly, ice can nucleate and grow, imparting mechanical damage to the cells. Thus, the cells must be warmed back to physiological temperatures at a sufficiently high rate. The third factor to consider in vitrification is the sample volume. Samples of smaller volumes are easier to cool quickly, while samples of larger volumes experience nonuniform cooling due to sheer size.

The major advantage of vitrification is that it eliminates the risk of mechanical damage on the cells from ice formation, thereby maximizing cell survival potential. Moreover, vitrification simplifies cryopreservation because it eliminates the need to find optimal cooling and warming rates for each kind of cell to mitigate osmotic stresses and intracellular ice formation. This allows vitrification to be a more nonspecific preservation method, so it could potentially enable the successful cryopreservation of organs for transplants.

The main disadvantage of vitrification is its need for high solute concentrations. At such high concentrations (>30 wt %), the solute can become toxic to the cell during the cryopreservation process. The high solute concentrations also complicate the cryoprotectant addition and removal process, requiring more sophisticated methods to maintain cell viability.

Permeating, Small-Molecule Cryoprotectants

Permeating cryoprotectants are those that can cross the cell membrane during freezing. Permeating cryoprotectants enter the cell and replace some of the water lost during cooling, lowering the risk of excessive cell shrinkage. By entering the cell, permeating cryoprotectants also prevent the intracellular salt concentration from reaching lethal levels as the cell dehydrates. Thus, permeating cryoprotectants address two of the main causes of cell damage during the slow-cooling process.

Dimethyl sulfoxide (DMSO) is one of the most commonly used permeating, small-molecule cryoprotectants. DMSO decreases electrolyte concentration and the amount of ice that is formed during freezing, but it is lethal to cells at high concentrations due to its toxicity. DMSO can also facilitate vitrification at high concentrations, but again at concentrations that are toxic to cells.

DMSO is also known to interact with water and affect cell lipid membranes, which lend to its ability to act as a cryoprotectant. While it is established that DMSO hydrogen bonds with water, it has been quantitatively demonstrated that the presence of free DMSO, singly hydrogen-bonded water, doubly hydrogen-bonded water, and DMSO aggregates varies with DMSO concentration in solution with the strongest DMSO-water interactions occurring ca. 35 mole % DMSO. By hydrogen bonding with water, DMSO affects the ability of water to interact with itself and thus form ice during freezing. DMSO also affects membrane hydration; DMSO anisotropically orients at the surface of lipid membranes and decouples water from the lipid surface entirely. By orienting itself at the membrane-water interface, DMSO effectively stabilizes the lipid membrane, protecting the cell from water and ice.

Glycerol is the other most common permeating cryoprotectant. Glycerol was first discovered as an effective cryoprotectant by Polge in 1949 when they determined it was an essential solute in successfully freezing and reviving spermatozoa. Glycerol is also considered a neutral solute due to its low toxicity to cells. Lovelock demonstrated that glycerol induces a "salt buffering" effect; it can be added in sufficiently high concentrations to lower the freezing point, thus avoiding harmful electrolyte concentrations, and cross the cell membrane while remaining below the toxicity threshold. More recently, it has been demonstrated that glycerol also interacts with the cell membrane, altering the hydrogen bonding structure of water such that the membrane is not strained upon ice crystallization. While glycerol is less toxic than DMSO, DMSO is relatively more effective as a cryoprotectant.

Polymer Cryoprotectants

Polymers serve as non-permeating cryoprotectants. They help protect cells during freezing by increasing the viscosity and $T_g$ of the aqueous solution, which helps promote vitrification. Moreover, an increase in solution viscosity can slow water transport into and out of the cells, mitigating osmotic stress. Compared to solutions of small molecules, polymer solutions have lower osmotic pressures, enabling the use of higher concentrations without damaging cells. They can also serve as a "bulking agent" during freezing, effectively decreasing the amount of ice that can form by taking up space that would otherwise be ice. Finally, the major advantage of polymers is that they have low toxicities; due to their larger size, they are less likely to permeate the cell membrane and affect cellular activities. Poly(vinylpyrrolidone) (PVP) and hydroxyethyl starch (HES) were two of the earliest polymer cryoprotectants, and both were used to cryopreserve blood cells. Doebbler first demonstrated PVP's efficacy as a cryoprotectant in 1961; they achieved greater than 90% recovery after freezing and thawing rabbit blood in the presence of 7% PVP solutions. Around the same time, Garzon and Knorpp pioneered the use of HES as a cryoprotectant, achieving 98% cell survival in cryopreserving human erythrocytes. HES increases the viscosity of the solution, decreasing the cooling rate required for vitrification. Additionally, an increased extracellular solution viscosity reduces the rate at which the cell can dehydrate, mitigating osmotic damage to the cell.

Poly(vinyl alcohol)'s (PVA) ability to serve as a cryoprotectant is attributed to its ice recrystallization inhibition (IRI) activity, wherein the growth of already-formed ice crystals is inhibited, upon thawing cryopreserved material. The IRI activity is the same as that exhibited by the antifreeze peptides that protect fish from freezing in cold waters, which was first observed by Knight and coworkers in 1995. Efforts to understand the mechanisms are ongoing; it has been demonstrated that a minimum chain length and an unbroken sequence of hydroxyl units is necessary for IRI activity in PVA, and that hydrogen bonding is crucial to its IRI activity even though PVA interacts weakly with ice crystals.

Polyampholytes, polymers with both positive and negative charges along the chain, can also act as cryoprotectants. The cryoprotectant activity of polyampholytes is attributed to their dual ability to inhibit ice recrystallization (IRI activity) and protect cell membranes. Rajan showed that polyampholytes with a higher degree of hydrophobicity interacted more with lipid membranes, which enabled them to protect the membranes from freeze damage. Such polyampholytes exhibited higher cryoprotective properties and exhibited higher IRI activity.

Design and Synthesis of Sulfoxide-Functional Polymer Cryoprotectants

Despite the increasing prevalence of cryopreservation in medicine and biology, the mechanisms and structures governing the functions of cryoprotectants are still not thoroughly-understood. In this example, a new polymer was designed. The structure of this polymer was then varied to investigate how polymer structure impacts ice formation during the freezing and thawing process, the propensity for vitrification upon cooling, and post-thaw cell viability. We synthesized a series of polymers in-house, verified their structure by nuclear magnetic resonance spectroscopy ($^1H$ NMR), and evaluated the efficacy of our materials using differential scanning calorimetry (DSC) to understand ice formation during freezing and cooling. We also conducted cell-viability studies to quantify the polymer's ability to facilitate cell survival during cryopreservation.

Poly(Methyl Glycidyl Sulfoxide) (PMGS)

We aimed to improve upon contemporary cryoprotectants by designing a material that limited the total amount of ice formation during cryopreservation. As previously mentioned, the small-molecule cryoprotectant DMSO hydrogen bonds extensively with water. Thus, by interfering with the water-water interactions necessary to form ice, DMSO can help prevent ice formation during freezing. DMSO can also be used to facilitate vitrification at high concentrations because it increases solution viscosity. However, at the high concentrations necessary for vitrification, DMSO is toxic to cells and negatively impacts cellular functions upon rewarming. On the other hand, polymer cryoprotectants are typically too large to cross the cell membrane and therefore boast low cell toxicities. Thus, we designed a polymer, poly(methyl glycidyl sulfoxide) (PMGS), that includes a DMSO molecule attached to a polyether polymer backbone (FIG. 1). We hypothesized that a polymer with DMSO-like moieties, along with an inherently higher viscosity, would limit ice formation during the cooling process.

Experimental

Materials. Epichlorohydrin (TCI), sodium thiomethoxide solution (Sigma-Aldrich, 21% in $H_2O$), tetrabutylammonium bromide (Matrix Scientific, 95+%), n-methyl-2-pyrrolidone (Fisher), hydrogen peroxide (Acros Organics, 30 wt % solution in water), and methylene chloride (Fisher, Certified ACS/Stabilized) were used as received.

Differential Scanning calorimetry (DSC). DSC was used to determine the $T_g$ of pure polymer and aqueous polymer solutions. PMGS is hygroscopic, so PMGS batches were dried in vacuo for at least four hours prior to sample preparation. Polymer solutions were made by mixing dry PMGS with phosphate buffer solution (PBS) and hand-mixing until a homogeneous solution was achieved. DSC samples were prepared by loading TZero pans with at least 5 mg of each solution and sealing them with hermetic lids to prevent evaporation. DSC samples of pure polymer were typically scanned from −20 to 120° C. four times, and the $T_g$ was determined from the last heating cycle. DSC samples of polymer solutions were cooled to −90 and heated to 20° C., and the $T_g$ was determined on the heating cycle.

Synthesis of PMGS. Epichlorohydrin was polymerized catalytically to yield 30 kDa poly(epichlorohydrin) (PECH). In a round-bottom flask, PECH (2.14 g) and tetrabutylammonium bromide (TBAB) (0.16 g) were sequentially dissolved in n-methyl-2-pyrrolidone (NMP) (90 mL). Sodium thiomethoxide solution (12 mL, 1.5× mol equivalent relative to PECH) was added slowly, ensuring the reaction mixture did not overheat, and the mixture reacted overnight at room temperature (20° C.). The resulting poly(methyl glycidyl thioether) (PMGT) was precipitated by the addition of deionized (DI) water, and the supernatant was decanted. Any residual thiol was neutralized with a 0.8 wt % aqueous bleach solution. The PMGT was then dissolved in methylene chloride (DCM) and washed with DI water three times. The aqueous phase was decanted, and the DCM was evaporated. The resulting PMGT was then dissolved in 5 mL DCM, and hydrogen peroxide solution ($H_2O_2$) (4 mL, 1.5× mol equiv.) was added, and the mixture was left to react at room temperature overnight. Excess $H_2O_2$ was neutralized using $MnO_2$, and excess DCM was evaporated. The resulting PMGS-water solution was diluted with DI water, and the $MnO_2$ was removed by centrifugation (two cycles, 1000 rpm, 10 min). PMGS product was then purified by dialysis in DI water for 2-3 days and then Millipore water for at least one day. Finally, dry PMGS was obtained by lyophilizing for two days.

Results and Discussion

Figure 2A:
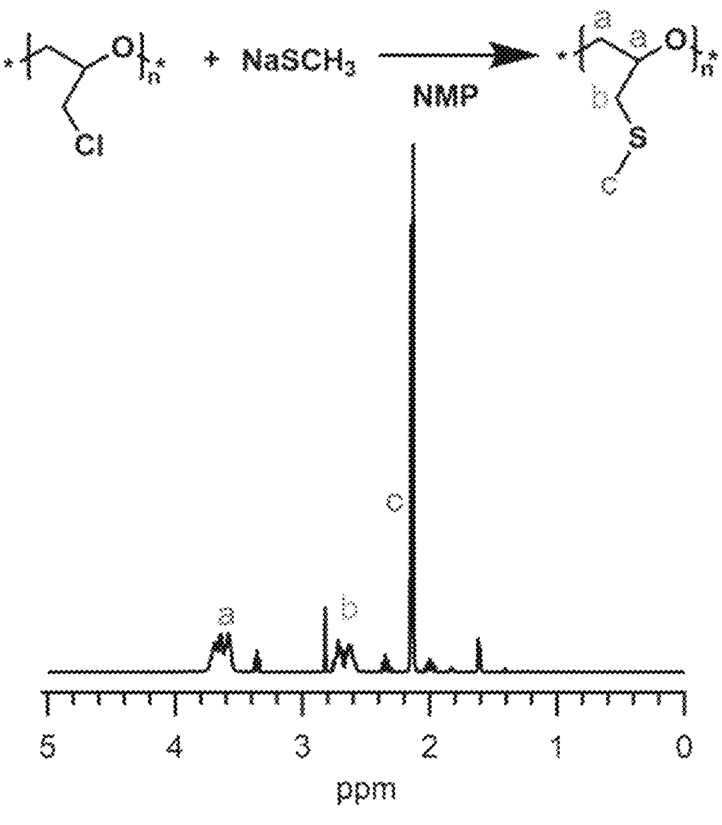
FIGS. 2A and 2B illustrate the successful synthesis of PMGT (FIG. 2A) and PMGS (FIG. 2B), as verified by $^1H$ NMR. The $^1H$ NMR spectrum for PMGT was acquired in $CDCl_3$, and the spectrum for PMGS was acquired in $D_2O$.
Figure 2B:
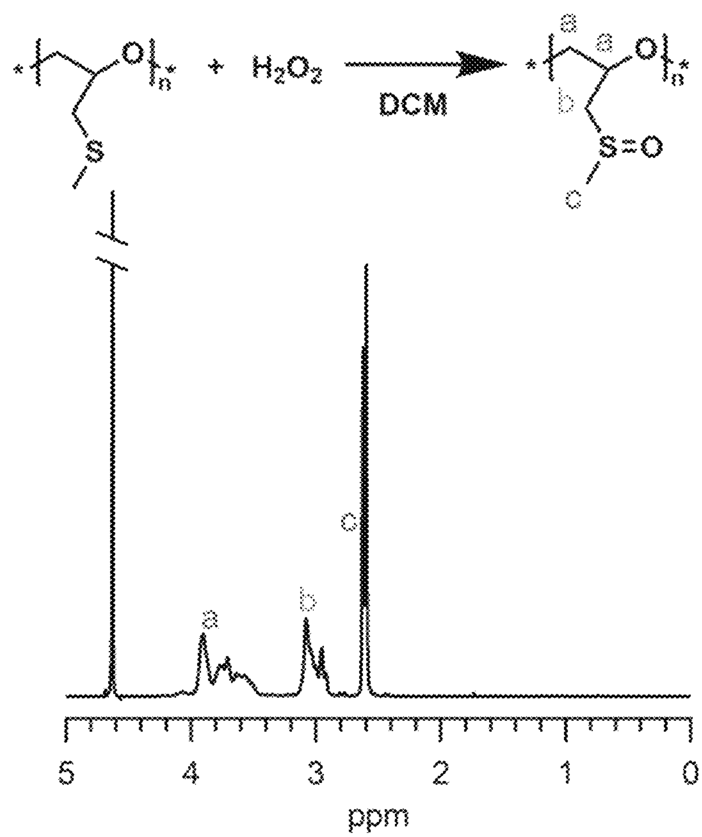

The initial procedure to synthesize PMGS used sodium thiomethoxide ($NaSCH_3$) in the presence of tetrabutylammonium bromide (TBAB) to substitute the chlorine on PECH with a methanethiolate, resulting in poly(methyl glycidyl thioether) (PMGT). Then, hydrogen peroxide was used to oxidize the thioether and yield a sulfoxide, resulting in PMGS (FIG. 2). To minimize reagents, we first tried to eliminate TBAB. However, we discovered that it facilitated the thiol substitution reaction. Then, we addressed the high solvent demand of the substitution reaction. Initially, our procedure required ~100 mL of NMP solvent for every gram of PECH polymer. Scaling up at this concentration would be problematic because (1) the required reaction volumes would be unreasonably high and (2) NMP is relatively expensive. We cut the volume of NMP by ~50% without affecting the reagents' ability to dissolve and the reaction conversion, thereby reducing reaction volumes and NMP use.

Using the improved synthesis procedure, we synthesized PMGS from PECH with molecular weights ranging from 1-90 kDa. We also attempted to synthesize PMGS from 700 kDa PECH, but polymer progressively precipitated during the reaction, and the product was not soluble in acetone, DMSO, or chloroform, even after three days of vigorous stirring. Perhaps the high-molecular weight PECH was already on the cusp of solubility, and a small degree of chemical modification was enough to make the polymer insoluble. Studies on the effects of molecular weight on properties relevant to cryopreservation are ongoing.

Figure 3A:
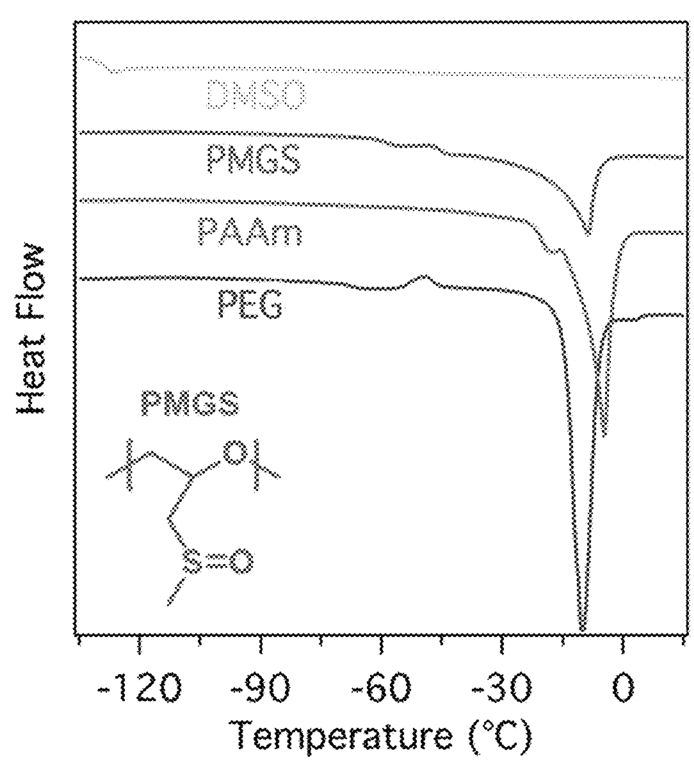
FIG. 3A demonstrates that less ice formed in 50 wt % aqueous PMGS solutions than in 50 wt % poly(acrylamide) (PAAm) and 50 wt % poly(ethylene glycol) (PEG) solutions. No ice formed in the 50 wt % DMSO solution.
Figure 3B:
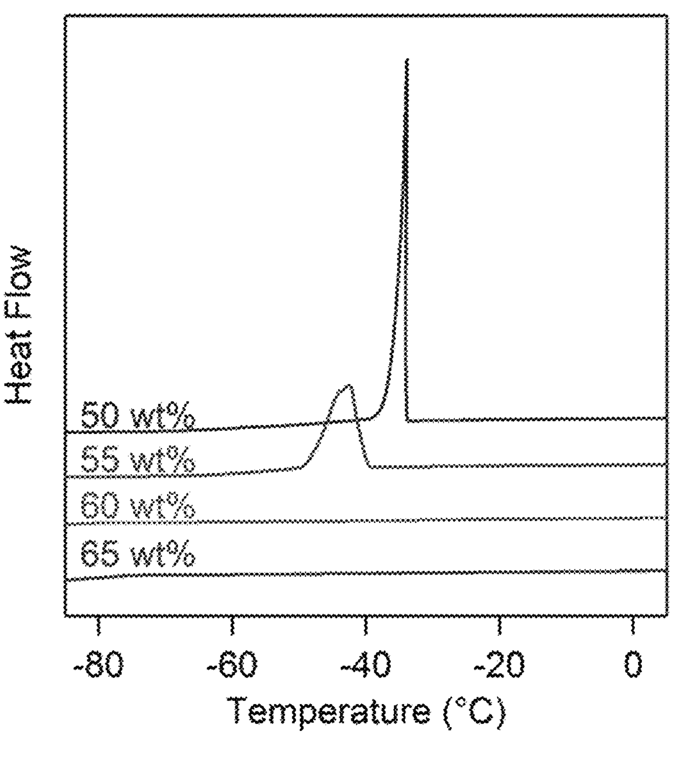
FIG. 3B illustrates that the incorporation of 60 wt % PMGS results in vitrification.

We quantified the percentage of ice that formed in aqueous solutions of 50 wt % DMSO, PMGS, poly(acrylamide) (PAAm), and poly(ethylene glycol) (PEG) by integrating the sharp ice melting peaks in DSC traces (FIG. 3A). As signified by the lack of an ice crystallization peak in the DSC trace, 50 wt % DMSO was enough to arrest ice formation in solution. Only ~30% of the total water in the 50 wt % solution of PMGS froze into ice, which was the lowest fraction compared to the polymers PEG and PAAm. After increasing the PMGS concentration to 60 wt %, we were able to achieve vitrification as indicated by the lack of a sharp crystallization peak in the DSC curves (FIG. 3B). PMGS indeed limited ice formation in our cryopreservation experiments, but higher concentrations were required to achieve total vitrification.

Figure 4:
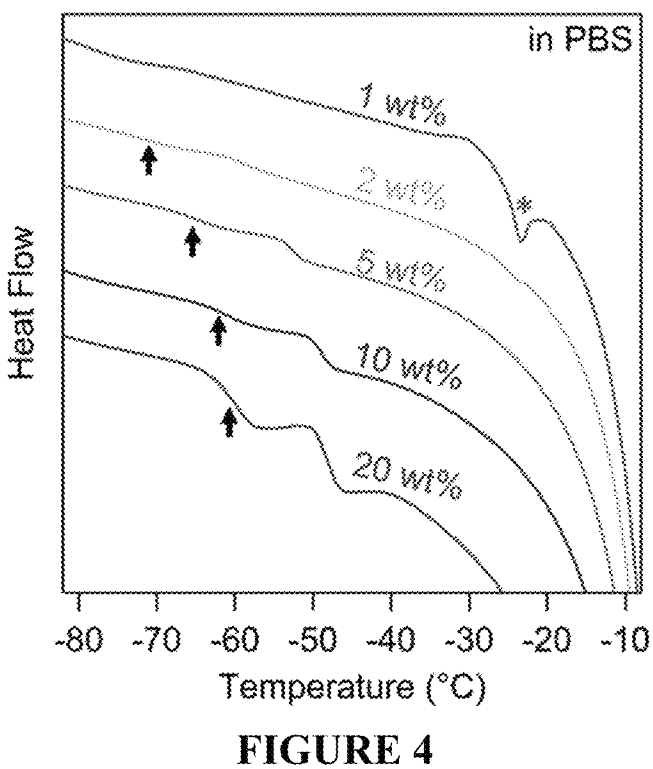
FIG. 4 illustrates that solution $T_g$ increases as PMGS wt % in PBS increases, implying that higher PMGS concentrations increase solution viscosity.

Also using DSC, we found that increasing the concentration of PMGS in phosphate buffer solution (PBS) resulted in a slight increase in $T_g$ (FIG. 4). From 2 wt % to 20 wt %, the solution $T_g$ increased less than 10° C. The weak dependence of $T_g$ on PMGS concentration contrasts the stronger dependence reported in HES systems, wherein the $T_g$ of HES in Hank's balanced salt solution (HBSS) increased by ~14° C. from 5 wt % to 20 wt % HES. The increase in $T_g$ suggests that PMGS increases solution viscosity, which likely contributes to the ability of PMGS to limit ice formation and facilitate vitrification above the $T_g$ of pure water (−138° C.).

Figure 5:
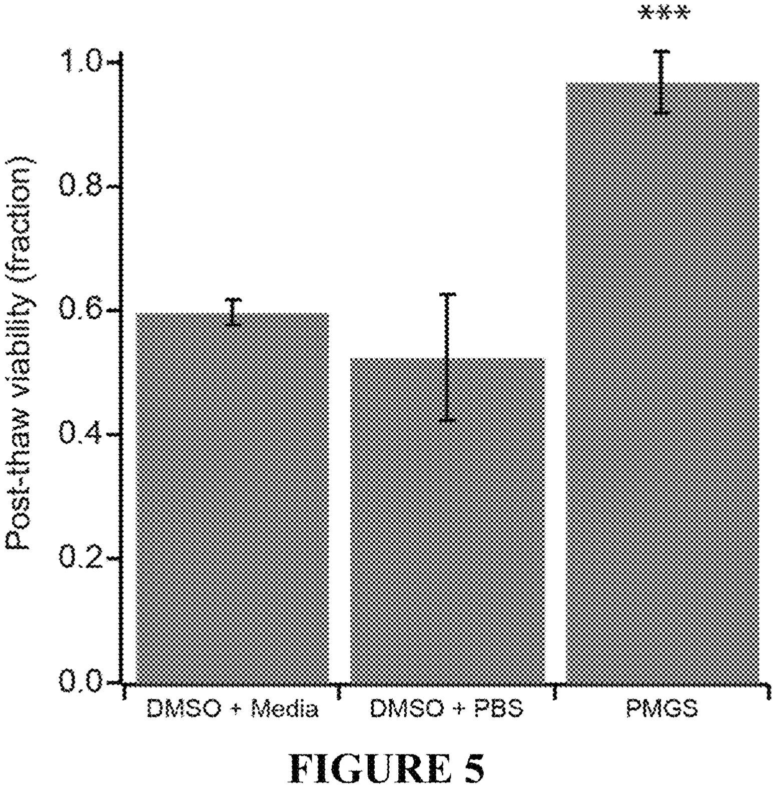
FIG. 5 is a plot illustrating that cells frozen in 10 wt % PMGS in PBS had higher-post-thaw viabilities than those frozen in 10 wt % DMSO solutions.

The post-thaw viability of normal human dermal fibroblasts (NHDF) cells frozen in the presence of 10 wt % DMSO in cell media, 10 wt % DMSO in PBS, and 10 wt % PMGS solution was evaluated. As shown in FIG. 5, the cells preserved in PMGS solution exhibited a post-thaw survival rate of >90%, significantly higher than the cells preserved in DMSO solutions. This data demonstrates that even though PMGS still allows ice to form during cooling, it shows promise as a cryoprotectant. Studies on cellular dehydration and liposome phase transitions in the presence of PMGS are ongoing to better understand how PMGS acts as a cryoprotectant.

Synthesis of Polymers with Varying Mass Percent Sulfoxide Moieties

Figure 6:
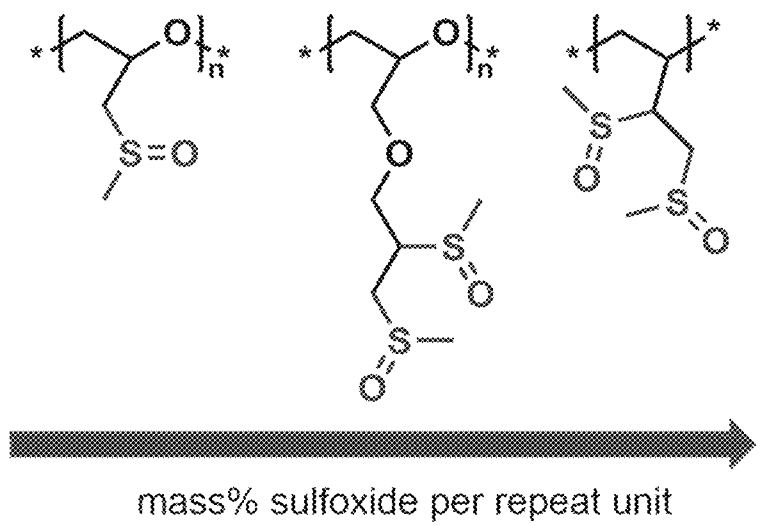
FIG. 6 illustrates a representative series of sulfoxide polymers with increasing mass % sulfoxide moieties per repeat unit.

To evaluate the effect of polymer structure on cryoprotectant activity, we first proposed to vary the number of sulfoxide moieties per repeat unit (FIG. 6). We hypothesized that increasing the mass percent of sulfoxides per repeat unit would decrease the overall amount of polymer necessary to reduce the amount of ice formed during the cryopreservation process.

Figure 7:
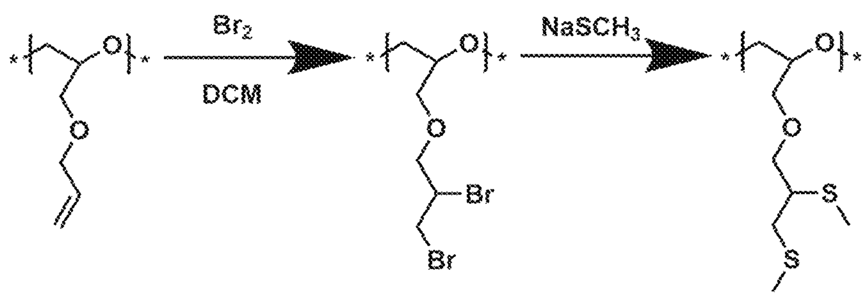
FIG. 7 illustrates the reaction scheme for bromine-catalyzed di-sulfidation of PAGE.
Figure 8:
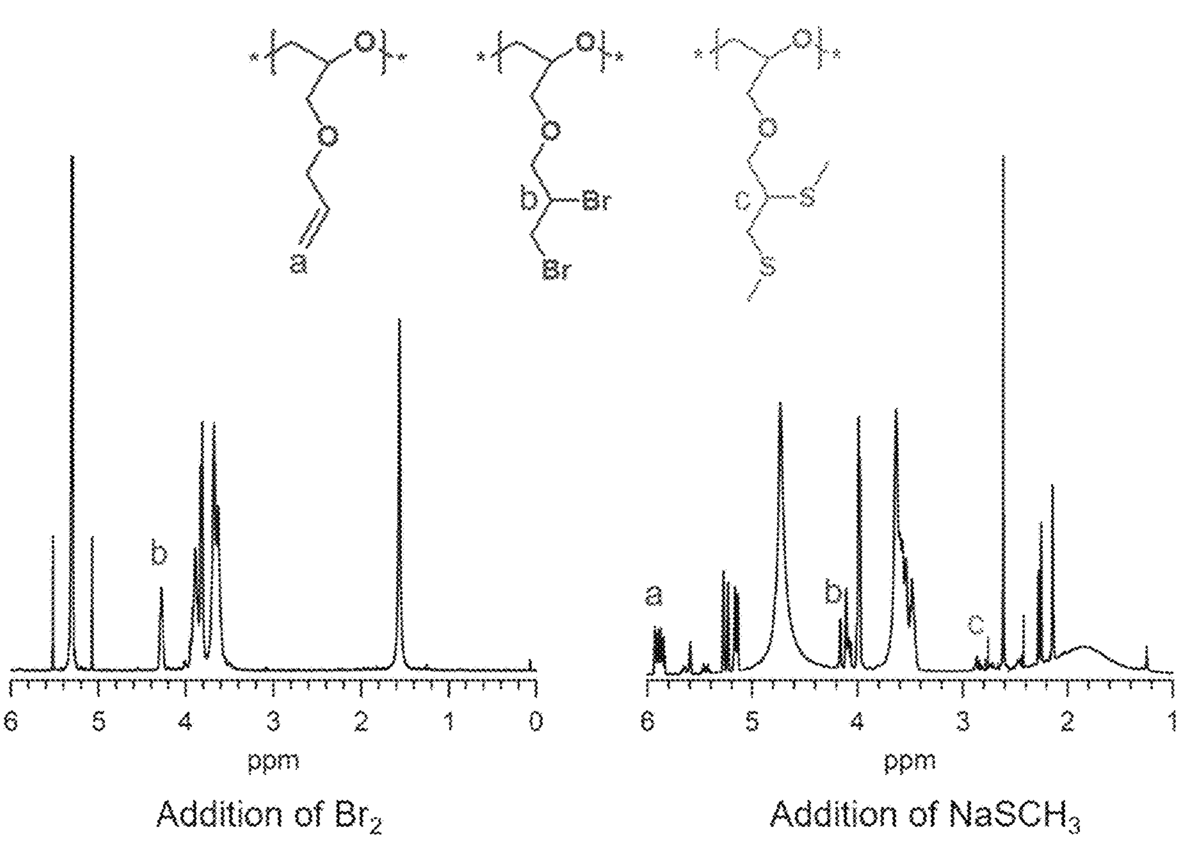
FIG. 8 illustrates the successful bromination of PAGE (left) as verified by $^1H$ NMR. The addition of methylthiolate produces an undesired mixture of species (right).

Proposed Synthetic Schemes. We first attempted a bromine-catalyzed reaction to functionalize poly(allyl glycidyl ether) (PAGE), shown in FIG. 7. Solid bromine (1× molar equivalent relative to PAGE) was added to a solution of PAGE in DCM and stirred until the reaction mixture was homogeneous. Then, approximately five molar equivalents of $NaSCH_3$ were added to the reaction mixture and stirred vigorously overnight. A mid-reaction $^1H$ NMR spectrum showed successful bromination of PAGE. However, an NMR of the precipitated polymer showed that the addition of the thiolate did not work and reproduced alkenes (FIG. 8). Perhaps the bromine was too labile, or DCM was a poor reaction solvent.

Figure 9:
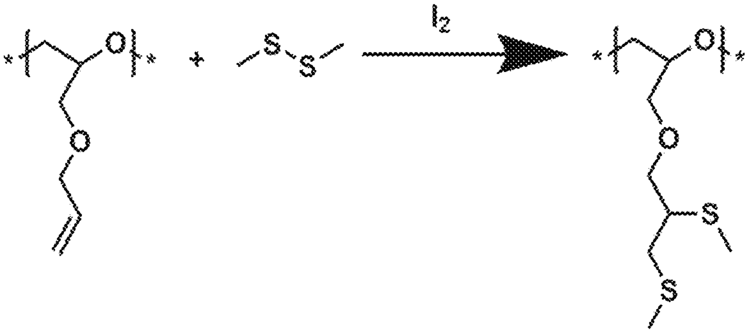
FIG. 9 illustrates a reaction scheme for iodine-catalyzed di-sulfidation of PAGE.
Figure 10:
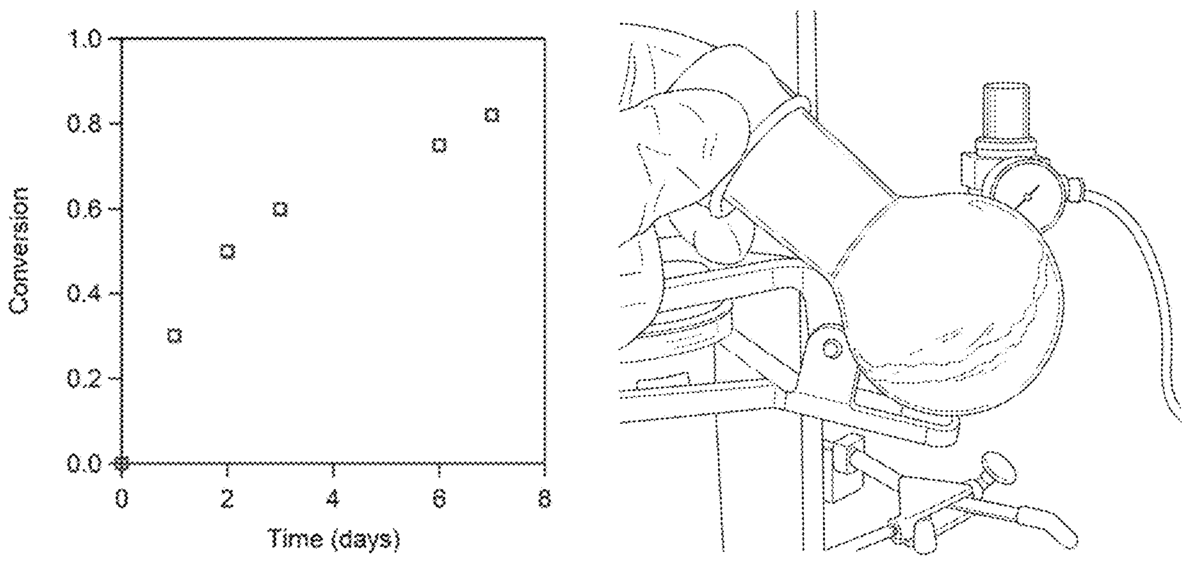
FIG. 10 illustrates that the PAGE-I2 reaction took 7 days to surpass 80% conversion and eventually assumed a jelly-like consistency.

We then attempted an iodine-catalyzed reaction (FIG. 9). Table 1 summarizes the various reaction conditions we explored. We encountered multiple challenges. When the iodine concentration was too high (>0.5 molar equivalents), the polymer crashed out of solution and became virtually insoluble. When PAGE was dissolved in DCM, the reaction rates and conversions were extremely low. Even when the reactions ran in neat DMDS to increase the concentration of reagents, reaction times were still on the order of days. The reaction mixture would also develop a jelly-like consistency after a few days, which was the largest obstacle (FIG. 10). When the reaction mixture changed consistency, the polymer could no longer be isolated. We speculated that the PAGE could be cross-linking, so we tried adding butylated hydroxytoluene (BHT), an agent commonly used to prevent cross-linking among polymers, to no avail. The most successful reaction resulted when we dissolved PAGE in DMDS and added 0.1 molar equivalents of iodine (relative to PAGE). Even then, the reaction took 6 days to reach >80% conversion (FIG. 10), an unreasonably long period of time required to reach insufficient conversions. Moreover, the reaction never reached 100% conversion before cross-linking.

TABLE 1

Trials for iodine-catalyzed di-sulfidation of PAGE. The highest conversion was achieved in neat DMDS. PAGE, $I_2$, and DMDS are denoted as molar equivalents.

| PAGE | $I_2$ | DMDS | Solvent | Temperature (° C.) | Reaction Time (hr) | Conversion |
|---|---|---|---|---|---|---|
| 1 | 1 | 5 | DCM | 20 | 22 | 0 |
| 1 | 1 | 5 | $CHCl_3$ | 60 | 2.5 | 0 |
| 1 | 0.5 | 2 | DCM | 20 | 48 | 0.25 |
| 1 | 0.2 | 13 | — | 20 | 168 | 0.82 |
| 1 | 0.1 | 5 | DCM | 20 | 20 | 0.10 |
| 1 | 0.1 | 5 | $CHCl_3$ | 60 | 144 | 0.64 |
| 1 | 0.1 | 20 | DCM | 20 | 20 | 0.21 |

Figure 11:
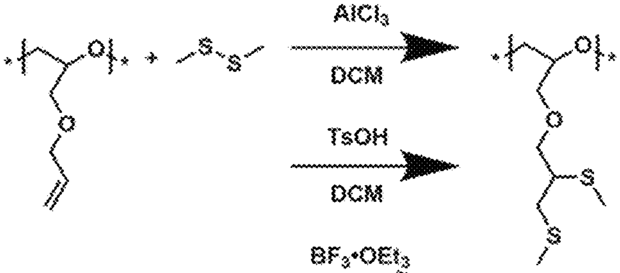
FIG. 11 illustrates an attempted acid-catalyzed disulfidation of PAGE.

Another possible reaction pathway is to use Lewis acids to catalyze the disulfidation of alkenes. Adapting their procedure, we tried using aluminum chloride ($AlCl_3$), p-toluenesulfonic acid (TsOH), and boron trifluoride diethyl etherate ($BF_3.OEt_3$) as Lewis acids (FIG. 11). All reactions achieved 0% conversion after stirring for two days at room temperature. Moreover, $BF_3.OEt_3$ is extremely hazardous; it reacts violently with water to form hydrofluoric acid (HF). Thus, we did not further explore these reaction pathways.

Figure 12:
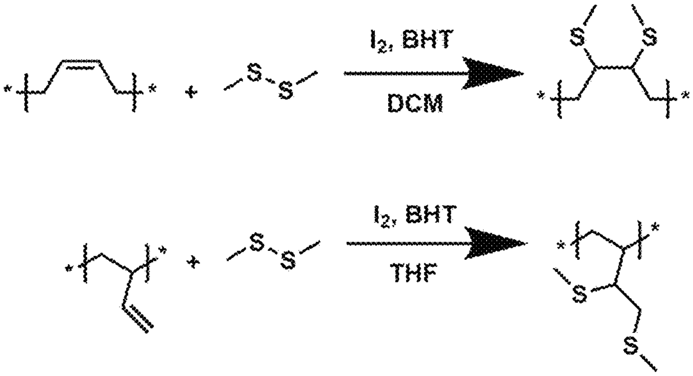
FIG. 12 illustrates an attempted iodine-catalyzed di-sulfidation of PBD.

Finally, we attempted to functionalize two variants of polybutadiene (PBD)—1,2-polybutadiene (Mw=100 kDa)

and cis-polybutadiene (Mw=200 kDa)—by iodine-catalyzed disulfidation (FIG. 12). We first dissolved PBD in solvent and then added DMDS and iodine sequentially. Like the iodine-catalyzed reactions of PAGE, the PBD reactions developed a jelly-like consistency over time and stopped stirring. Additionally, the PBD would occasionally appear to encapsulate the iodine, preventing it from reacting. To address the jelly-like consistency, we tried adding BHT again, which seemed to prevent the jelly-like consistency from developing but appeared to hinder the reaction; the results were inconclusive.

Synthesis of Polymers with Varying Pendant Hydrophobicity

Figure 13:
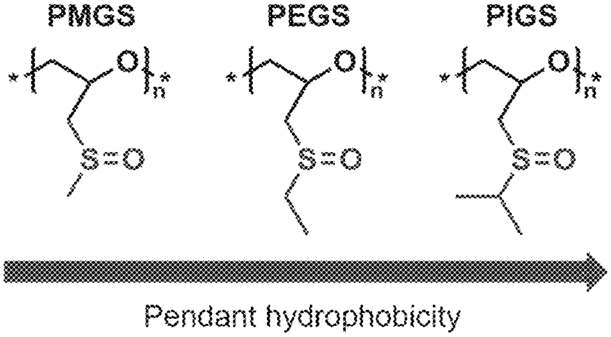
FIG. 13 illustrates a series of sulfoxide-containing polymers in order of increasing pendant hydrophobicity.
Figure 14A:
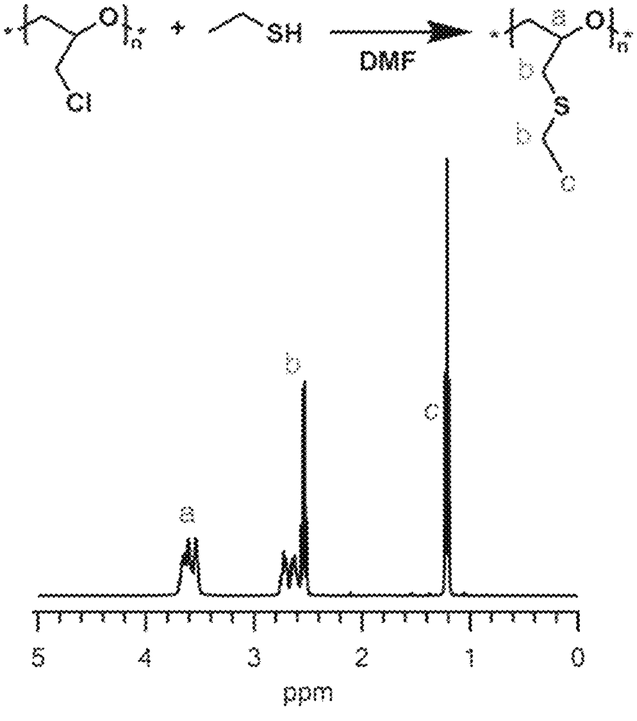
FIGS. 14A-14B illustrate the successful synthesis of PEGT (FIG. 14A) and PEGS (FIG. 14B), as verified by $^1H$ NMR. The spectrum for PEGT was acquired in $CDCl_3$, and the spectrum for PEGS was acquired in D20.
Figure 14B:
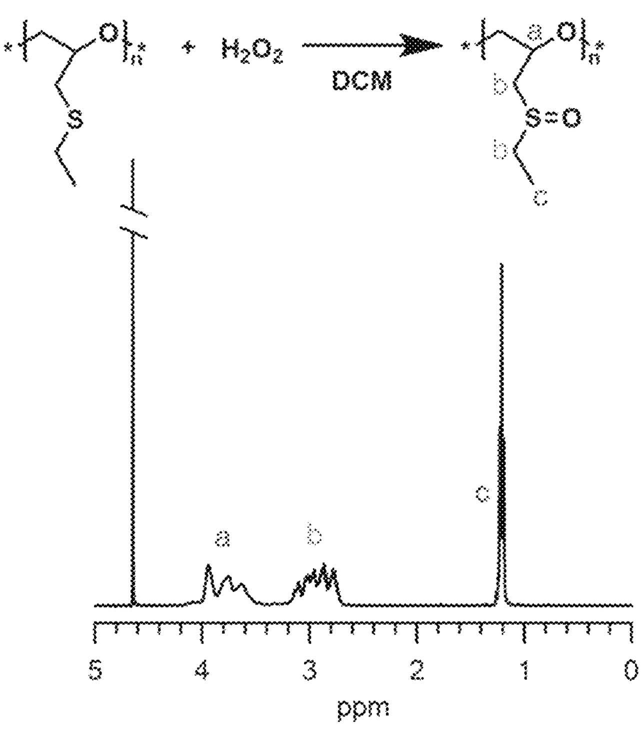
Figure 15A:
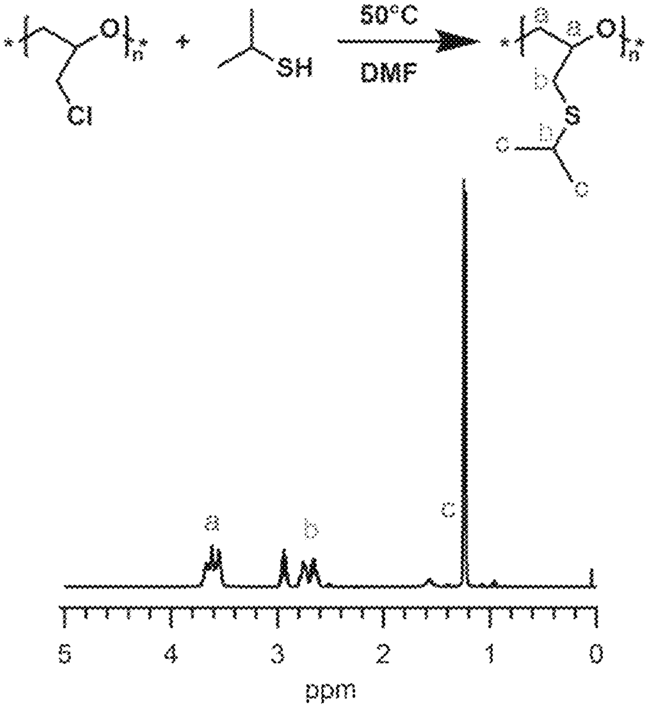
FIGS. 15A-15B illustrate the successful synthesis of PiPGT (FIG. 15A) and PiPGS (FIG. 15B), as verified by $^1$H NMR. The spectrum for PiPGT was acquired in $CDCl_3$, and the spectrum for PiPGS was acquired in D20.
Figure 15B:
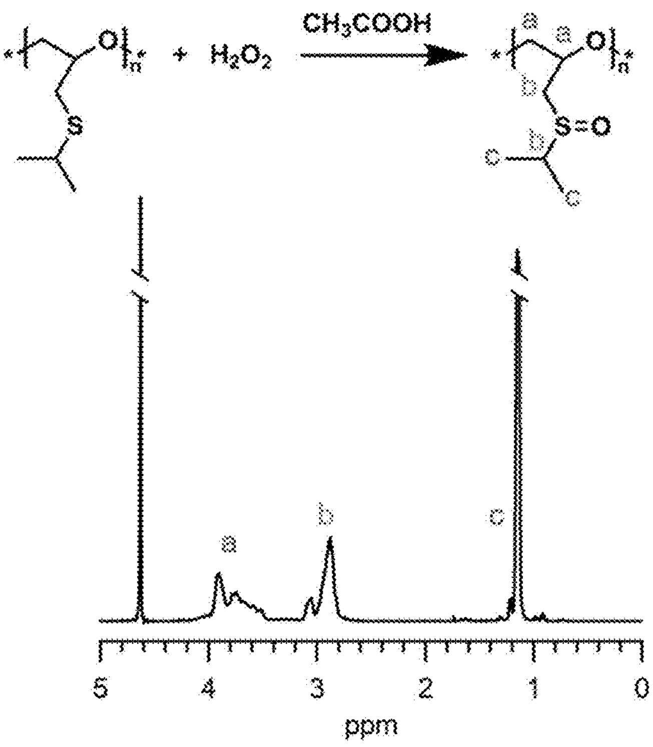

We then proposed a series of PMGS variants with increasing pendant hydrophobicity, depicted in FIG. 13. We hypothesized that increasing the hydrophobicity of the pendant would modulate polymer-membrane interactions and decrease the $T_g$ of the unfrozen fraction. The decrease in $T_g$ could also affect water transport rates, potentially increasing cell dehydration. Understanding such structure-property relationships could give better mechanistic insight into how polymeric cryoprotectants function.

Experimental

Materials. Epichlorohydrin (TCI), ethanethiol (TCI), 2-propanethiol (TCI), 1,8-Diazabicyclo[5.4.0]undec-7-ene (Alfa Aesar, 99%), acetic acid (Sigma-Aldrich, ACS reagent 99.7%) dimethyl formamide (Fisher, Certified ACS), methanol (Fisher), hydrogen peroxide (Acros Organics, 30 wt % solution in water), and methylene chloride (Fisher, Certified ACS/Stabilized) were used as received.

Synthesis of Poly(ethyl glycidyl sulfoxide) (PEGS). In a round-bottom flask, PECH (1.5 g) was dissolved in 20 mL of dimethyl formamide (DMF). Then, ethanethiol (1.8 mL, 1.5× mol equivalents relative to PECH) and 1,8-diazabicyclo[5.4.0]undec-7-ene (DBU) (1× mol equiv.) were added to the flask while stirring. The mixture reacted at room temperature for one day, and the resulting poly(ethyl glycidyl thioether) (PEGT) was precipitated and washed twice using methanol. Residual thiol in the supernatant was neutralized with a 0.8 wt % aqueous bleach solution. PEGT was then dissolved in minimal DCM and reacted with 1.5× molar equivalents of $H_2O_2$ to yield the PEGS. PEGS polymer was minimally diluted with DI water and dialyzed in DI water for at least two days and Millipore water for at least one day. Dry PEGS was obtained after lyophilizing the aqueous polymer solution over two days.

Synthesis of Poly(isopropyl glycidyl sulfoxide) (PiPGS). In a round-bottom flask, PECH (1.5 g) was dissolved in DMF (20 mL). While stirring, 2-propanethiol (2-PT) (7 mL, 5× mol equivalents relative to PECH) and DBU (2.4 mL, 1× mol equiv. rel. to PECH) were added sequentially. The mixture was then heated to 50° C. and allowed to react for at least two days. The resulting poly(isopropyl glycidyl thioether) (PiPGT) was precipitated and washed twice using methanol. Any residual thiol in the supernatant was neutralized with a 0.8 wt % aqueous bleach solution. The polymer was then dissolved in DCM and then dried in vacuo overnight. The purified PiPGT was then dissolved in acetic acid (16 mL), and $H_2O_2$ was added dropwise. A water bath may be helpful to temper the exothermic reaction. After stirring the mixture for ~20 min, the reaction was quenched using an aqueous 10 wt % sodium thiosulfate solution. The aqueous solution was transferred to a separatory funnel, and the PiPGS was extracted with DCM twice. The organic layer was then washed with DI water to remove residual salts, and the aqueous layer was decanted. DCM in the organic layer was evaporated, and the polymer was dried in vacuo overnight. The PiPGS was then dissolved in DI water and dialyzed for two days in DI water and for at least one day in Millipore water. Dry PiPGS was recovered by lyophilizing over two days.

Results and Discussion

PEGS and PiPGS were successfully synthesized, as verified by $^1H$ NMR spectra in FIGS. 14A-14B and 15A-15B. PEGS was synthesized using a procedure analogous to the one used to synthesize PMGS, but the procedure to synthesize PiPGS required some variations. Notably, the addition of 2-propanethiol to PECH needed an elevated temperature of 50° C. over two days to react; the reaction proceeded relatively slowly at room temperature and only reached 75% conversion after two days (Table 2).

TABLE 2

Reaction conditions for the synthesis of PiPGT. The reaction under optimal conditions achieved 98% conversion (highlighted). Reagents are denoted in molar equivalents.

| PECH | 2-PT | DBU | Temperature (° C.) | Reaction Time (hr) | Conversion |
|---|---|---|---|---|---|
| 1 | 1.5 | 1 | 20 | 48 | 0.75 |
| 1 | 5 | 1 | 50 | 72 | 0.99 |
| 1 | 5 | 1 | 50 | 48 | 0.98 |

Figure 16:
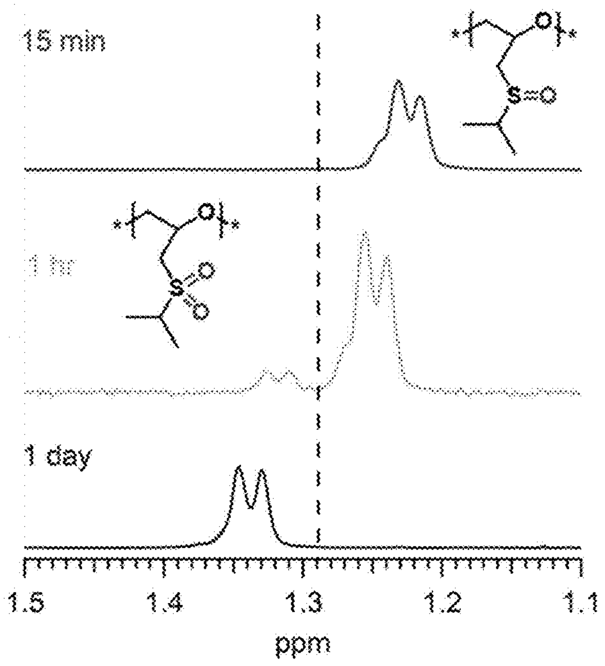
FIG. 16 illustrates that under 15 minutes, the reaction only formed desired sulfoxides and yielded PiPGS. Sulfones began to form after 15 minutes.

Hydrogen peroxide alone was not able to oxidize the thioether of PiPGT. Instead, the reaction required $H_2O_2$ in the presence of acetic acid. Moreover, we found that the oxidation reaction should be terminated after 15 minutes to yield the desired sulfoxide. If left to react any longer, the thioether would begin to over-oxidize and eventually yield sulfones. The formation of sulfone instead of sulfoxide was indicated by the appearance of additional peaks slightly downfield from the sulfoxide peaks in the NMR spectrum for the oxidation reaction that ran for one hour (FIG. 16). When the oxidation reaction ran overnight, all the thioether converted to sulfone. This was indicated by a slight-downfield shift in the peaks ca. 1.25 ppm and a change in solubility; the sulfone was no longer soluble in water.

Figure 17:
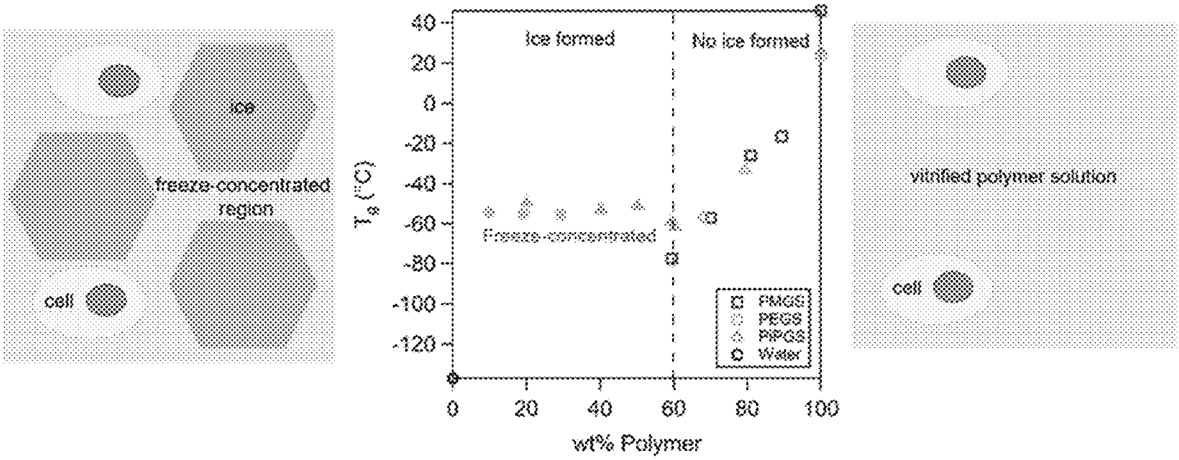
FIG. 17 illustrates the formation of ice in samples below 60 wt % polymer. $T_g$'s of freeze-concentrated solutions (filled markers) remain the same regardless of pendant hydrophobicity. At higher concentrations, water did not freeze, and $T_g$ increased with increasing wt % polymer (open markers).

Using DSC, we investigated how the $T_g$'s of aqueous solutions of PMGS, PEGS, and PiPGS change with polymer concentration (FIG. 17). In PEGS and PiPGS solutions, ice formed in all samples with less than 60 wt % polymer. The observed $T_g$'s were therefore those of the unfrozen fractions between ice crystals, wherein polymer had been concentrated by the formation of ice. For all polymers, no ice formed in solutions with more than 60 wt % polymer, so the observed Tg's were those of the entire vitrified solution. At these higher concentrations, $T_g$ increased with increasing polymer concentration, implying that adding polymer indeed increased the $T_g$ and thus viscosity of the overall solution.

Notably, the $T_g$'s of the freeze-concentrated regions for PEGS and PiPGS were similar for each polymer, suggesting that the concentration of the freeze-concentrated regions did not depend heavily on chain hydrophobicity. The $T_g$'s of polymer solutions above 60 wt % also did not vary much with pendant hydrophobicity even though the $T_g$ of PMGS was ~20° C. higher than that of PEGS and PiPGS. These findings inform future mechanistic studies; given constant polymer molecular weight, the macroscopic solution properties alone are unlikely to explain potential variations in cell viabilities across PMGS, PEGS, and PiPGS solutions. If observed, changes in cell viability may be attributed to polymer-membrane interactions instead, which warrants further study.

Conclusions and Outlook

In this example, we established procedures to synthesize a series of sulfoxide-functional polymers—PMGS, PEGS, and PiPGS—with varying hydrophobicity, which has enabled studies on how polymer structure impacts cryoprotectant activity. In our preliminary studies, we found that PMGS is a promising cryoprotectant; 10 wt % aqueous PMGS solutions yielded higher post-thaw cell viabilities in normal human dermal fibroblasts than aqueous solutions of 10 wt % DMSO. Less water froze in a 50 wt % PMGS solution than in PAAm and PEG solutions, and 60 wt % PMGS was necessary to achieve vitrification. Ice formed in PMGS, PEGS, and PiPGS solutions with concentrations up to ~60 wt % polymer, and the $T_g$ of unfrozen fractions remained relatively constant regardless of pendant hydrophobicity. In solutions more concentrated than 60 wt %, no ice formed, and $T_g$ increased with increasing polymer concentration similarly across all polymers. This suggests that the macroscopic solution properties do not vary much with pendant hydrophobicity and are therefore unlikely to explain variations in cell viability.

These preliminary results have spurred ongoing and future studies on how pendant hydrophobicity and molecular weight affect how the polymers function as cryoprotectants. We are currently conducting studies on how pendant hydrophobicity affects the phase transitions in liposomes. Additionally, we are investigating how pendant hydrophobicity and polymer molecular weight affect the degree of cell dehydration during freezing and thawing. Finally, post-thaw cell viability tests are ongoing for PEGS and PiPGS, and we will compare the results to those we obtained with PMGS. The results suggest and sulfoxide-containing and/or sulfone-containing polymer cryoprotectants offer tremendous promise a cryoprotectants.

Example 2: Sulfoxide-Functional Polymers are Powerful Cryoprotectants of Mammalian Cells Under the right conditions, some living things (e.g., bacteria, gametes) can maintain viability after being frozen and thawed, but many others (e.g., organs, many mammalian cells) cannot. To widen the library of living cells and tissues that can be cryopreserved, improved cryoprotectants are required. In this example, we present a polymeric cryoprotectant, poly(methyl glycidyl sulfoxide) (PMGS), that achieved higher post-thaw viability for fibroblast cells than traditional cryoprotectants. By limiting the amount of water that freezes and facilitating cellular dehydration after ice nucleation, PMGS mitigates the mechanical and osmotic stresses that the freezing of water imparts on cells. The development of PMGS presents a useful tool for anyone who does cell culture, and it is a step towards the long-term preservation of complex cellular networks and donor organs for transplantation.

Experimental

Materials. Epichlorohydrin (TCI, 99%), methane thiolate (Sigma Aldrich, 21 wt % in water), N-methyl-2-pyrrolidone (Fisher), tetrabutylammonium bromide (95%, Matrix Scientific), hydrogen peroxide (Fisher, 30% in water), and dichloromethane (Fisher, 99.5%) were used as received. Mono(μ-oxo)bialuminum (MOB) catalysts were prepared as previously described and stored under nitrogen at ~20° C. (26, 27). Equipment. Size exclusion chromatography (SEC) was carried out on an Agilent system with a 1260 Infinity isocratic pump, degasser, and thermostatted column chamber held at 30° C. containing Agilent 5 μm MIXED-C columns with a combined operating range of 200 –2 000 000 g $mol^{-1}$ relative to polystyrene standards. Chloroform with 50 ppm amylene was used as the mobile phase. SEC system was equipped with an Agilent 1260 Infinity refractometer, dual angle dynamic and static light scattering. $^1H$ NMR spectroscopy was performed on a 400 MHz Agilent MR spectrometer at room temperature and referenced to the residual solvent signal of $CDCl_3$ or $D_2O$ (7.26 and 4.79 ppm, respectively). Differential scanning calorimetry was performed using a DSC250 (TA Instruments) with an RCS90 electric chiller.

Epichlorohydrin polymerization. Poly(epichlorohydrin) (PECH) was synthesized using MOB catalysts as previously described.(26-28) Briefly, 193.0 mg or 96.5 mg of $[(Bn)_2NCH_2CH_2(_{\mu2}\text{-}O)Al(iBu)_2.Al(iBu)_3]$ were dissolved in 5 g of epichlorohydrin monomer in a scintillation vial and left to react for 48 hours at 60° C. under nitrogen atmosphere to achieve $M_w$=25 kg/mol and 30 kg/mol respectively. PECH with $M_w$=70 kg/mol was synthesized the in the same way except 23.8 mg of $[(Me)_2NCH_2CH_2(^{\mu2}\text{-}O)Al(iBu)_2.Al(iBu)_3]$ was used instead of $[(Bn)_2NCH_2CH_2(_{\mu2}\text{-}O)Al(iBu)_2.Al(iBu)_3]$.

Conversion of poly(epichlorohydrin) (PECH) to poly (methyl glycidyl thioether) (PMGT). PMGT was synthesized using the following In a typical procedure, 5 g of PECH were dissolved in 200 mL NMP with 436 mg TBAB. 27.1 mL of $NaSCH_3$ (21 wt % in water) were slowly added to the mixture, which proceeded to turn a deep purple color. The reaction was conducted for 16 h at room temperature. After reacting, 200 mL of water were added to precipitate poly(methyl glycidyl thioether) (PMGT). The polymer was washed twice more with 50 mL of water, then dried under vacuum.

Oxidation of poly(methyl glycidyl thioether) to poly (methyl glycidyl sulfoxide) (PMGS). All PMGT from the previous reaction step was dissolved in 50 mL DCM. 9.2 mL of 30 wt % $H_2O_2$ solution was added, and the reaction was stirred rapidly at room temperature for 16 hours. 10 mg of manganese(II) oxide were added to quench any remaining peroxide. Once the mixture stopped bubbling (about 2-3 hours), DCM was removed by rotary evaporation. The remaining polymer/water mixture was diluted with 40 mL deionized water, then centrifuged to remove the manganese (II) oxide. The resulting polymer was dialyzed against deionized water, then dried by lyophilization. Typical yield (based on amount of epichlorohydrin added) was 70%.

Scheme 1. Synthesis of FITC-tagged PMGS.

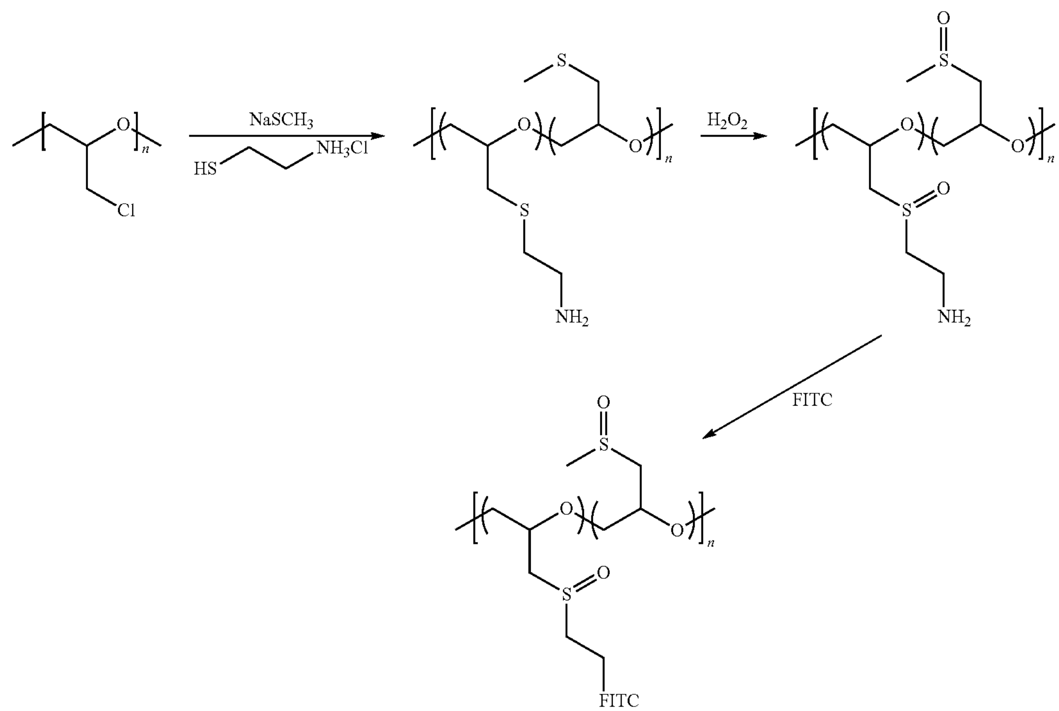

Synthesis of fluorescently-tagged PMGS. 200 mg of PECH were converted to PMGT as described above, except that 3.7 mg of cysteamine hydrochloride were added prior to NaSCH3, as shown in Scheme 1. The resulting polymer was purified and oxidized as described above. Afterwards, the amine-bearing PMGS was dissolved in 0.1 M sodium bicarbonate, and the pH was adjusted to 9 using 2.0 M NaOH. 32 mg of FITC were added, and the mixture was left to react at room temperature in a dark container overnight. Finally, the mixture was dialyzed for 1 week to remove all residual FITC and dried by lyophilization.

Cell culture. 3T3 cells (American Type Culture Collection) and human dermal fibroblasts (Lonza) were cultured up to 12 passages in Dulbecco's modified Eagle's medium (DMEM; Fisher) supplemented with 10% fetal bovine serum (FBS; Fisher) and penicillin/streptomycin (Fisher). Cells were cultured in a humidified incubator at 37° C. with 5% $CO_2$. At 80° A confluence the cells were cleaved with trypsin solution (0.25% trypsin containing 0.02% ethylenediamine tetraacetic acid (EDTA) in PBS), spun down, and seeded onto a new plate.

Cryopreservation experiments. Solid PMGS was weighed and placed in the biological safety cabinet under UV light for 15 min in order to sterilize the polymer for use with cells. PMGS was then dissolved in PBS without calcium or magnesium at the desired concentration (1-20% (w/v)) and the pH was checked to 7.4. Cells were cleaved, counted, and resuspend at a density of $1\times10^6$ cells/mL in either PMGS solution or 10% (v/v) DMSO in PBS. Solution was transferred to 1.9 mL cryovials and frozen at a controlled rate of −1° C./min using Mr. Frosty™ (Nalgene) in a −80° C. freezer overnight. The vials were then transferred into liquid nitrogen for a minimum of 24 hours before thawing. Vials were thawed at 37° C. in a water bath and immediately diluted 10-fold in warm DMEM. After centrifugation the supernatant was removed, and the cell pellet resuspended in 0.5 mL DMEM for counting with an automated cell counter (Invitrogen). Viability was calculated by dividing the post-thaw cell count by the pre-freezing cell count (two replicates per condition per trial).

For the proliferation studies, 10,000 live cells were taken from each condition and plated in a 96 well plate (3 wells of 10,000 per condition). This was done in order to isolate post-thaw cell activity from post-thaw viability. Cells were then cultured for 0, 24, 48, or 72 hours. At the desired time point the media was removed and replaced with phenol free DMEM (no FBS) with 1.2 mM MTT solution. After 4 hours incubation, a solution of 10% (w/v) SDS and 0.01M HCl was added to solubilize the formazan product. Absorbance was then measured at 570 nm using a plate reader (BioTek) as a measure of cell mitochondria activity. Never frozen cells were plated and used as a control in all proliferation studies.

For cytotoxicity studies cells were plated in a 96 well plate at 10,000 cells/well and cultured for 24 hours. Media was then aspirated and replaced with PMGS in DMEM solution (no FBS). After 24 hours incubation PMGS solution was aspirated and replaced with MTT solution. Cell viability was then measured using the same procedure as the proliferation study. For imaging, a 9.9% (w/v) untagged PMGS and 0.1% FITC-PMGS in PBS (10% PMGS total) solution was used. Cells were frozen down as described above and after counting an aliquot was taken and placed on a slide for imaging.

Measurement of cell dehydration kinetics. NHDF cells were suspended at a density of $1\times10^6$ cells/mL in PMGS solution as they normally would be for freezing. Then, 4 μL of cell suspension was placed on a glass slide and covered with #1.5 coverslip. Cells were observed at 20× magnification on a temperature-controlled stage. The slide was cooled from room temperature to −30° C. Nucleation typically occurred in the range of −15° C. to −20° C. The area of each cell was analyzed by manually tracing the perimeter of the cell on ImageJ. Cell volume was estimated assuming the cells were perfectly spherical. At least three independent experiments were performed for each condition. At least three cells were within the field of view in each experiment, and at least 15 cells were observed in total for each condition tested.

Differential scanning calorimetry. For PMGS/water mixtures, 6-8 mg of solution was placed in an aluminum DSC pan. The samples were cooled at 1° C./min to −90° C., held at −90° C. for 1 minute, then heated to 20° C. at 10° C./min. For neat PMGS, the polymer was dried overnight under vacuum, then the polymer was removed from the vacuum and 5-10 mg was immediately transferred to an aluminum DSC pan. The sample was heated to 150° C. at 10° C./min, held for 1 min, then cooled to −10° C. at 10° C./min and held for 1 min. This cycle was repeated 2 more times, and the third heating cycle was used to calculate the glass transition temperature.

Statistical Analysis. All data are expressed as mean±standard deviation. For the post-thaw survival assays, an independent experiment constitutes one freeze/thaw cycle of cells from the same passage on the same day. All experiments were conducted in at least duplicate (at least two technical repeats), and a minimum of three independent experiments were performed for statistical analysis. To compare data among two groups, a two-tailed t-test (assuming unequal variance) was used. Ap value of $<0.05$ was considered statistically significant.

PMGS: The Marriage of Non-Toxic PEO and Cryoprotective DMSO

Our cryoprotectant design aimed to capture the unique hydrogen-bonding properties of DMSO while minimizing toxicity and osmolality. We anchored methyl sulfoxide functional groups to a hydrophilic polyether scaffold. A polyether (—C—C—O) backbone was a natural choice because other structurally-similar polyethers such as poly(ethylene oxide) and poly(glycerol) have been applied to cryopreservation, and have demonstrated low toxicity. A methyl sulfoxide pendant mimicked the chemical functionality of DMSO, the most routinely used cryoprotectant for mammalian cells.

Figure 18A:
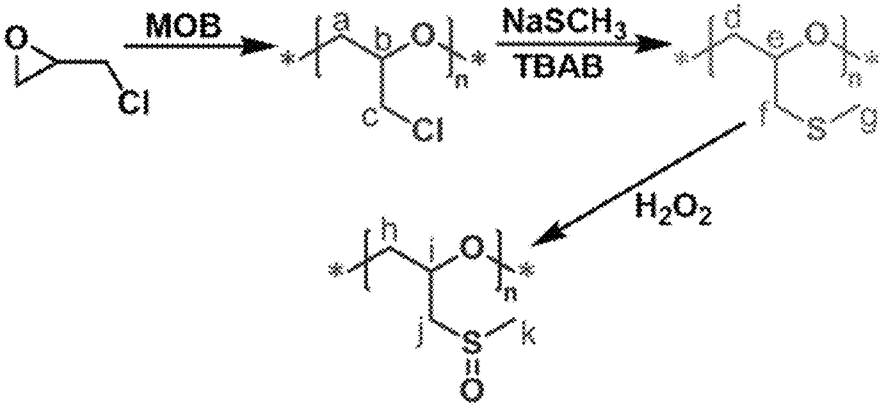
FIG. 18A illustrates the synthesis of PMGS through post-polymerization modification of PECH.
Figure 18B:
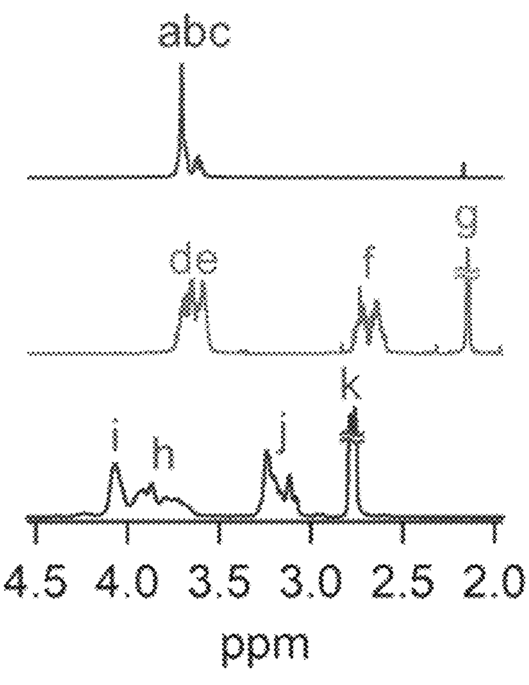
FIG. 18B shows the $^1$H NMR spectra (top: PECH in $CDCl_3$; middle: PMGT in $CDCl_3$; bottom: PMGS in $D_2O$) that confirm successful polymer synthesis.
Figure 18C:
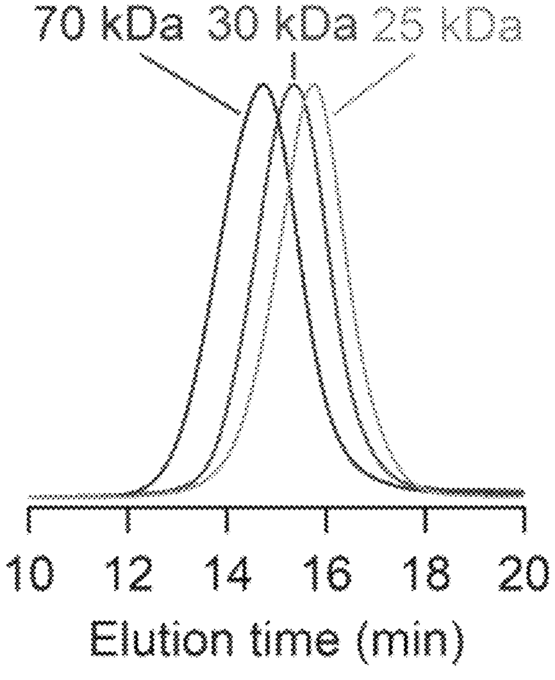
FIG. 18C demonstrates the control of PECH molecular weight, as shown by size exclusion. Refractive index intensity is shown.

Sulfoxide functionality was incorporated through the post-polymerization modification of poly(epichlorohydrin) (PECH) according to the reaction scheme shown in FIG. 18A, and structure was verified using $^1$H NMR (FIG. 18B). Poly(epichlorohydrin) precursor could be readily synthesized at various molecular weights (FIG. 18C) using mono (μ-alkoxo)bis(isobutylaluminum) (MOB) polymerization catalysts. Conversion of PECH to poly(methyl glycidyl thioether) (PMGT) was afforded by displacing the pendant chloride on the PECH repeat unit with methyl thiolate in the presence of a phase-transfer catalyst (tetrabutylammonium bromide). The resulting thioethers were subsequently oxidized with hydrogen peroxide to yield sulfoxide functional groups. In some cases, the thioether would over-oxidize to form a sulfone group. Sulfone content was less than 10% of repeat units for polymers evaluated in this example.

Cryopreservation with PMGS

Figure 19A:
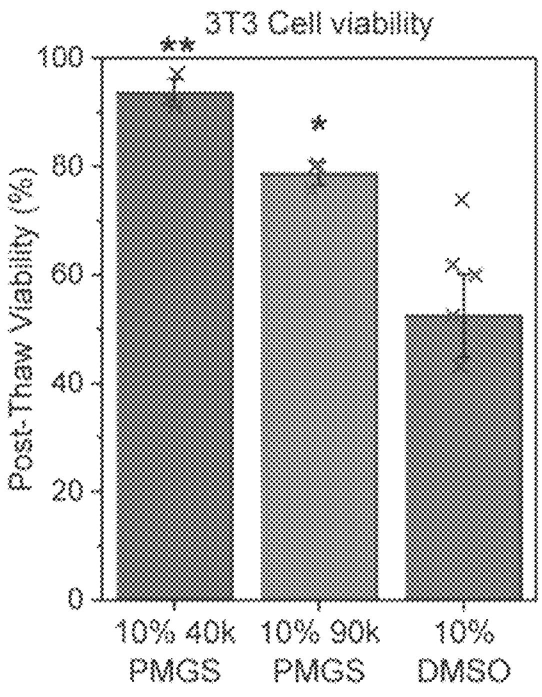
FIG. 19A shows that the post-thaw recovery of 3T3s was significantly higher than that achieved with DMSO.
Figure 19B:
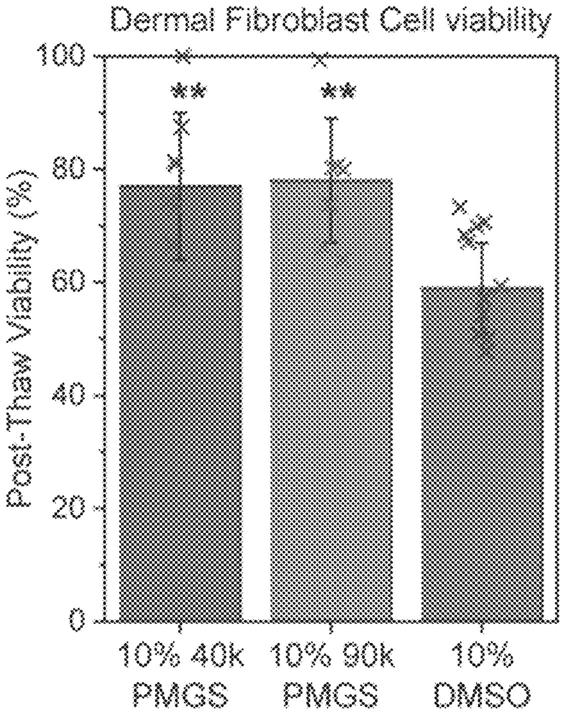
FIG. 19B shows that PMGS preserves dermal fibroblasts better than DMSO.
Figure 19C:
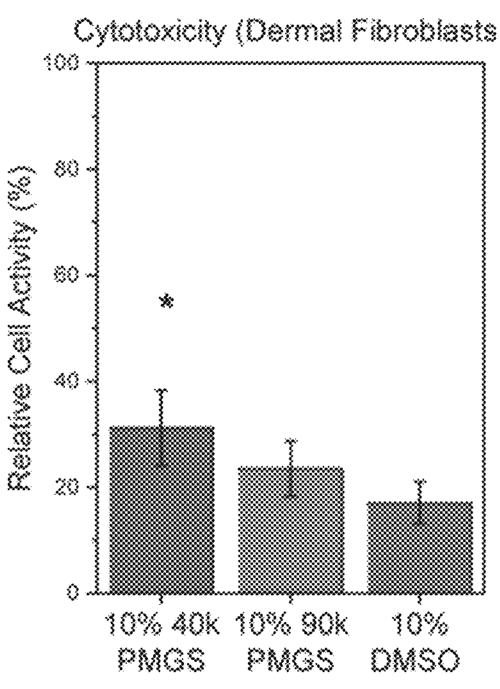
FIG. 19C shows that the toxicity of PMGS is lower than DMSO.
Figure 19D:
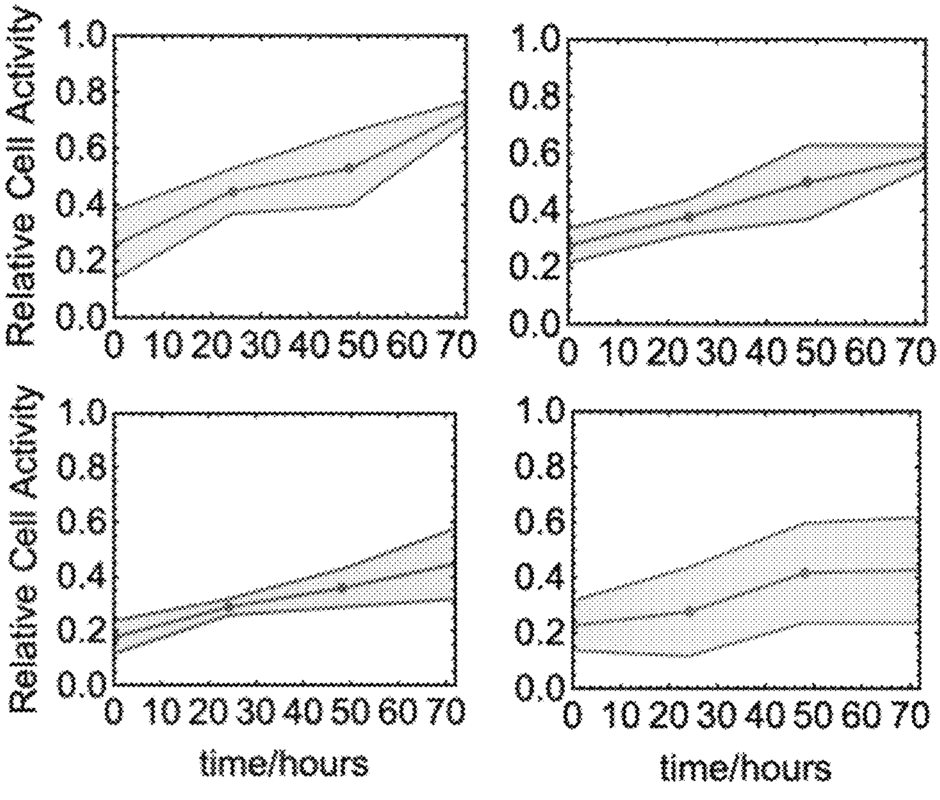
FIG. 19D shows post-thaw proliferation as measured by MTT absorbance assay demonstrates that metabolic activity continued increasing for several days after thawing. The same initial number of live cells (post-thaw) were used for each MTT assay.
Figure 19E:
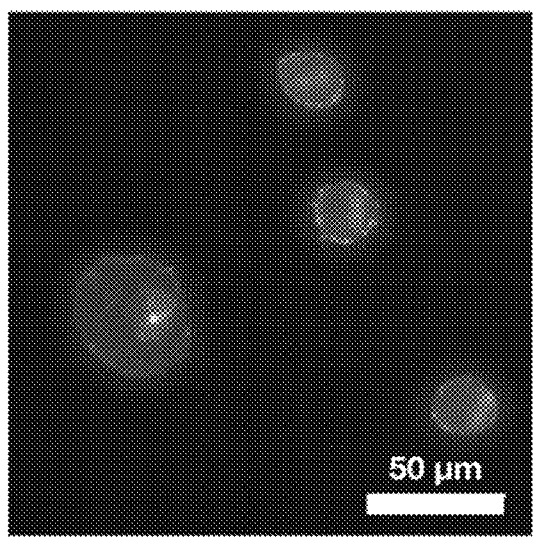
FIG. 19E shows that some fluorescently-tagged PMGS was observed to be inside the cells immediately after thawing.

High post-thaw survival of NHDF and 3T3 cells resulted when they were frozen in the presence of 10 wt % PMGS as shown in FIGS. 19A and 19B. Cells were frozen using the "slow cooling" method (1° C./min) during which time ice formed in the extracellular space. The post-thaw cell recoveries were significantly higher than those for the DMSO controls alone, even though no penetrating cryoprotectant was used in addition to PMGS. Significantly, many trials returned nearly quantitative post-thaw recoveries for both NHDF and 3T3 cells. Cytotoxicity was lower for the 10 wt % solutions of 40 kDa PMGS than for DMSO, as shown in FIG. 19C. This indicates that higher concentrations of PMGS could be tolerated by cells for cryopreservation. Over the 72 hours after thawing, cell proliferation was monitored using an MTT absorbance assay, as shown in FIG. 19D. In all cases, cellular metabolic activity continued to increase after freezing/thawing. Metabolic activity for cells frozen with PMGS was slightly lower than that for cells frozen with DMSO even though immediate post-thaw survival was much higher. The image in FIG. 19E shows that fluorescently-labelled PMGS appeared to be inside the cells immediately after thawing, though we have not yet conclusively ruled out that polymer is not merely adsorbed to the cell surface. DSC experiments with model cell membranes (DPPC liposomes) do not show any change in DPPC melting temperature with increasing PMGS concentration, suggesting that PMGS has little effect on membrane lipid packing.

Comparison to Other Cryoprotectants

PMGS is a candidate for the best cryoprotectant available. The most commonly used cryoprotectant for mammalian cell culture is DMSO supplemented with some concentration of fetal bovine serum (FBS). FBS was avoided in this study to allow a 1:1 comparison between DMSO and PMGS. However, PMGS has several key advantages over FBS: FBS is costly, its animal-based origin draws ethical concerns, it is not chemically defined, and it is inappropriate in cases where foreign proteins will interfere with an assay or application.

Some researchers have reported higher (near 100%) post-thaw cell viability for fibroblast cells with other types of polymeric cryoprotectants. However, these values were calculated by comparing the ratio of live cells in their cell counter to dead cells in their cell counter after thawing (or their method of counting is ambiguous). In our study, the ratio was calculated more conservatively by comparing the number live cells in the cell counter to total cells initially frozen, which is more appropriate in a Trypan blue assay because not all dead cells can be reliably transferred from the cryovial and prepared for counting. Another key advantage of PMGS over polyampholyte materials it that they do not affect solution pH, negating the need for pH adjustment and allowing better control over ionic strength, which has been seen to affect post-thaw survival.

Water/PMGS Phase Behavior and Glass Transitions

Figure 20A:
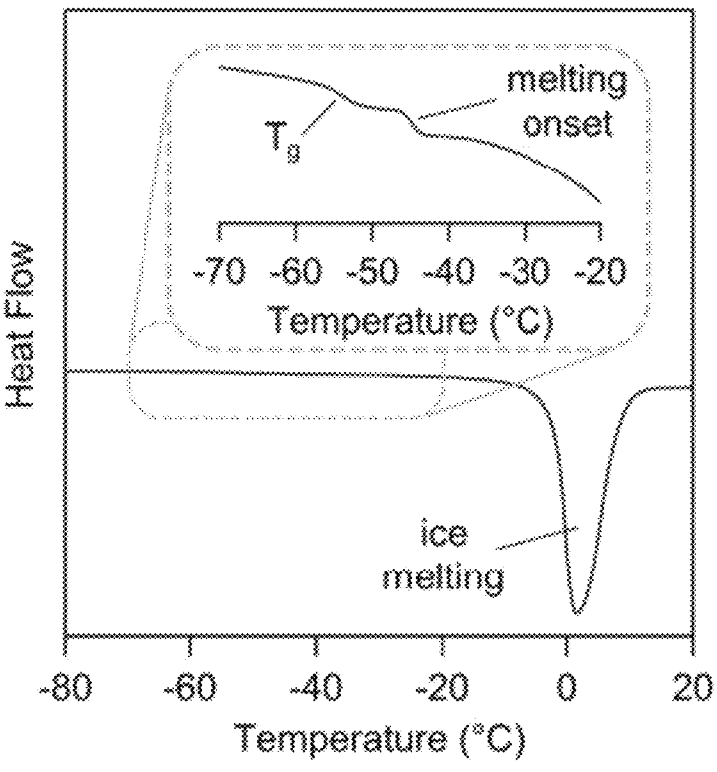
FIG. 20A shows a heating trace of 10 wt % PMGS in pure water, which demonstrates that the space between ice crystals undergoes a glass transition at −55° C., followed by melting starting at −45° C.

To investigate the mechanism of PMGS-mediated cryoprotection, we measured PMGS/water phase behavior using differential scanning calorimetry (DSC). We found that in 10 wt % solutions of PMGS, the concentration we used for cryopreservation, ice nucleated between −20° C. and −25° C. The volume of PMGS solutions used for cryopreservation assays was ca. 150× higher than that used during DSC studies, so it is likely that the nucleation temperature was higher in the cryopreservation assays. In the heating trace shown in FIG. 20A, three transitions could be observed. The transition at −55° C. was the glass transition of the concentrated polymer solution in the space between ice crystals. The sharpness of the transition, the slow cooling rate (1° C./min), and the fact that the $T_g$ was >30° C. lower than the nucleation temperature suggested that the polymer concentration in the freeze-concentrated solution was relatively uniform.

Figure 20B:
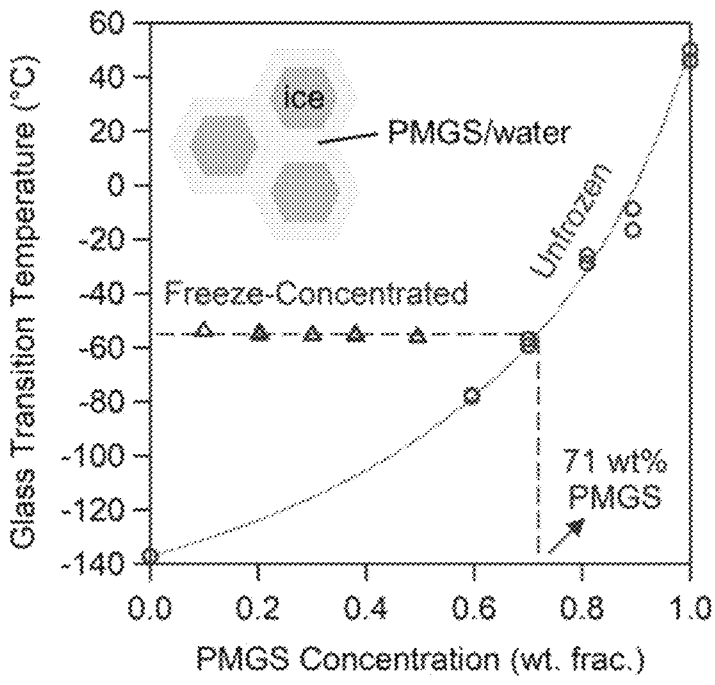
FIG. 20B demonstrates that aqueous PMGS solutions above 60 wt %, did not freeze during cooling, and their glass transition temperatures were fit to the Gordon-Taylor model. When ice formed, the $T_g$ of the concentrated solution between the ice crystals was independent of initial polymer concentration. Intersection of each trace indicates the concentration of the freeze concentrated solution (71 wt % PMGS).
Figure 20C:
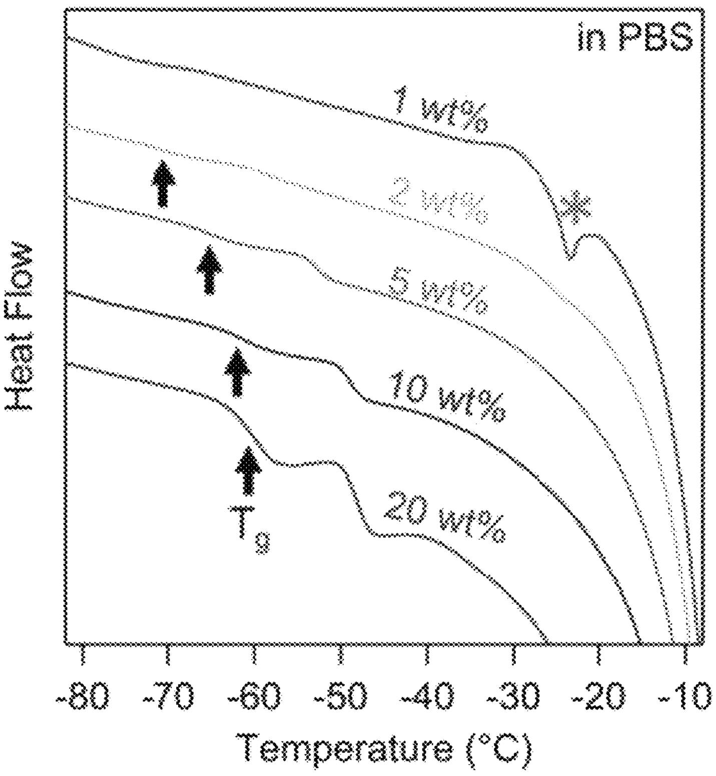
FIG. 20C shows the glass transition temperature of the freeze-concentrated solution varies slightly with temperature in the presence of PBS buffer. 2 wt % PMGS was sufficient to suppress salt/water eutectic formation (indicated by asterisk, *).

The nature of the second transition at −45° C. is a subject of some controversy. A similar transition has been observed in other aqueous solutions, especially carbohydrate solutions. The shape of the transition is very similar to a glass transition, but some authors attributed it to the onset of melting (also called ante-melting or incipient melting). In the PMGS/water system, we ruled out the scenario that the two transitions are of two distinct regions of different PMGS concentrations because the magnitude of each transition (i.e., the size of the step change in heat capacity) is too large to be accounted for in this way. The composition of the freeze-concentrated solution that emerges during freezing was estimated to be 71 wt % PMGS using established methods, as shown in FIG. 20B. This equates to 2.7 unfrozen water molecules per repeat unit of PMGS. This stands in contrast to PEO, which can phase separate and crystallize after ice nucleation. Reduction of total ice formation is important for minimizing concentration of salts and reducing the total volume change during freezing. The glass transition temperatures of freeze-concentrated PMGS solutions were independent of initial PMGS concentration. In solutions that were too concentrated for ice to form during cooling (>60 wt % PMGS), the glass transition temperatures were well-described by the Gordon-Taylor equation without the need for any adjustable parameters. The data in FIGS. 20A and 20B were collected for binary PMGS/water mixtures, but the solutions used for cryopreservation also contain PBS. FIG. 20C shows how the glass transition temperature increases slightly with PMGS concentration in the presence of PBS, the buffer used during cryopreservation experiments. A 2 wt % PMGS solution was sufficient to suppress the formation of a NaCl/water eutectic phase, which has been postulated to be important for cryopreservation. In summary, we believe that the toxicity of freezing is reduced by reducing the total amount of ice, strongly binding a hydration shell of liquid water, and enabling the vitrification of unfrozen fraction of water in the system to prevent further cold crystallization.

Cell Dehydration Kinetics after Ice Formation

An important concern during freezing, especially in the absence of penetrating cryoprotectants such as DMSO, is the degree to which cells dehydrate during freezing. After ice nucleates in the extracellular space, the high osmolality of the freeze-concentrated solution draws water out of the cells. If cellular dehydration is too high, the volume change and high intracellular solute content can damage a cell. If cellular dehydration is too low, then lethal intracellular ice formation (IN) becomes probable. Penetrating cryoprotectants like DMSO or glycerol can balance osmotic pressure by crossing the cell membrane, but polymers are generally too large to readily enter the cell. Parameters such as solute concentration, viscosity, and cooling rate must all be tuned to achieve the right rate and extent of dehydration, but the kinetics of cellular dehydration in the presence of polymeric cryoprotectants had never been previously explored.

Figure 21A:
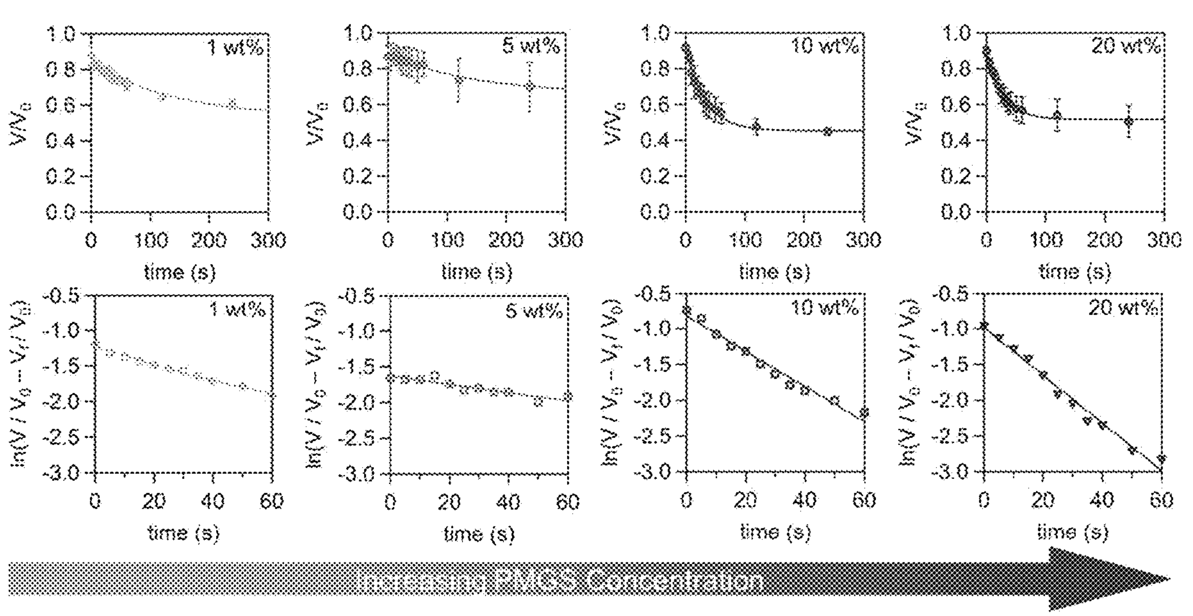
FIG. 21A shows that higher concentrations of 40 kDa PMGS led to more rapid cell dehydration. For each concentration, the top plot shows the normalized cell volume change over time after ice nucleation. The bottom plot shows the natural log of the normalized volume minus the final volume, demonstrating apparent exponential volume change kinetics.

One might predict that higher polymer concentrations would lead to slower cellular dehydration upon ice formation because the solution viscosity would increase with PMGS concentration. Indeed, the increasing $T_g$ in FIG. 20C was consistent with a decrease in molecular mobility as PMGS concentration was increased. Unexpectedly, increased PMGS concentration led to faster cellular dehydration kinetics until eventually plateauing, as shown in FIG. 21A. We speculate that at higher polymer concentrations, a fluid phase was maintained around the cell that allowed for water to diffuse, but at low polymer concentration, there was more likely to be ice/cell contact, which may have slowed dehydration. We hypothesize that the solution between ice crystals must be fluid enough to allow for water transport, but stationary enough to maintain separation between the cells and ice. Solutions containing other polymeric cryoprotectants such as PVP and HES have much higher glass transition temperatures, and may limit the ability of water to leave a cell. This might partially account for the improved post-thaw viabilities of PMGS over other polymeric cryoprotectants.

Figure 21B:
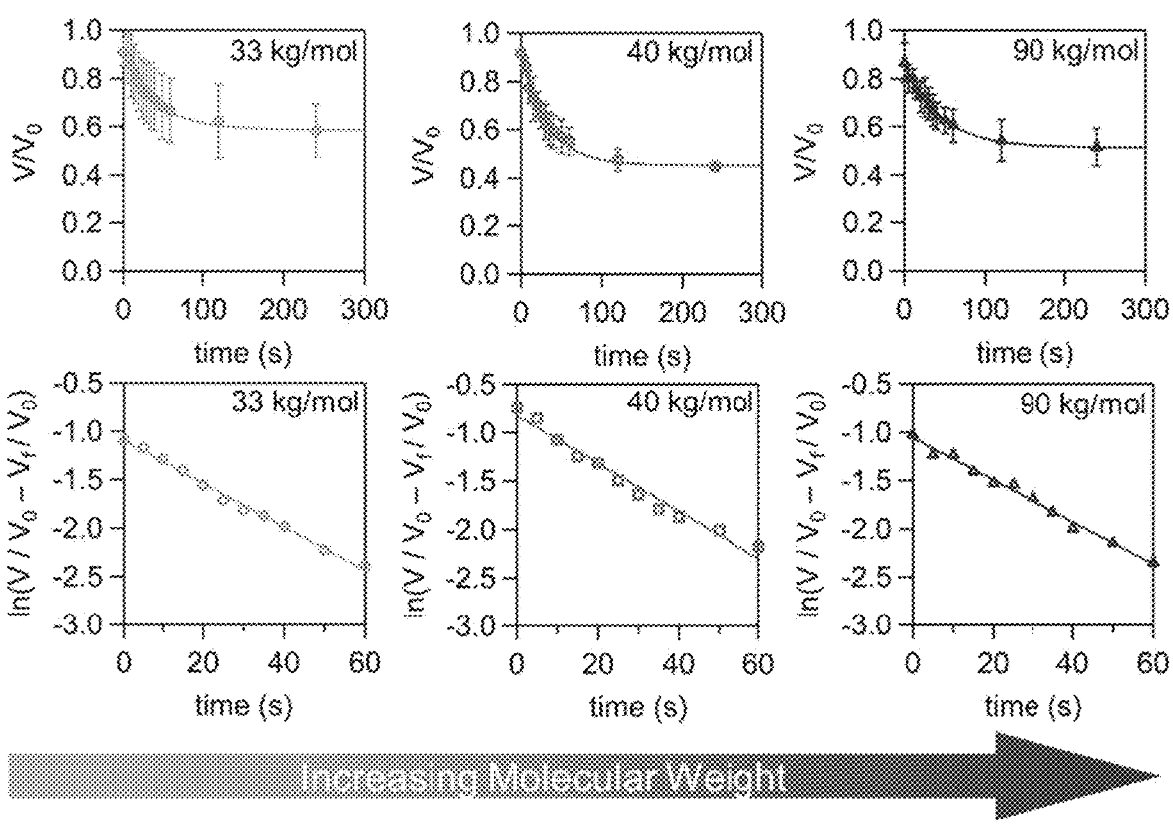
FIG. 21B shows that molecular weight had little or no difference on cell dehydration kinetics within the range tested.
Figure 21C:
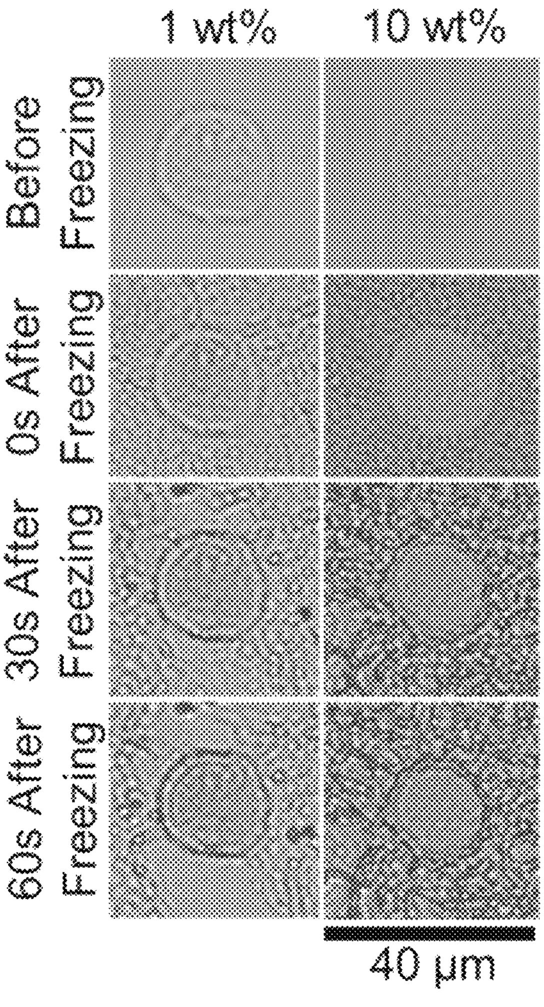
FIG. 21C shows representative images of a cell dehydrating upon freezing.

Molecular weight had little or no effect on cell dehydration, as shown in FIG. 21B. Since higher polymer concentration and higher molecular weight failed to slow dehydration despite increasing viscosity, it suggested that extracellular water transport was fast enough that it was not the rate limiting step. Instead, the rate at which water diffused inside the cell or through the cell membrane was more likely to limit the rate of dehydration. The apparent exponential character of cell volume change over time was consistent with membrane permeability limiting the rate of dehydration, but slow intracellular water transport has not been ruled out as a potential explanation. Representative images of cells dehydrating after ice formation are included in FIG. 21C. High post-thaw viability in the presence of PMGS suggested that over-dehydration was a minor concern in this system. Cellular dehydration could potentially be increased with warmer nucleation temperatures to increase water mobility.

Stability of PMGS

Figure 22:
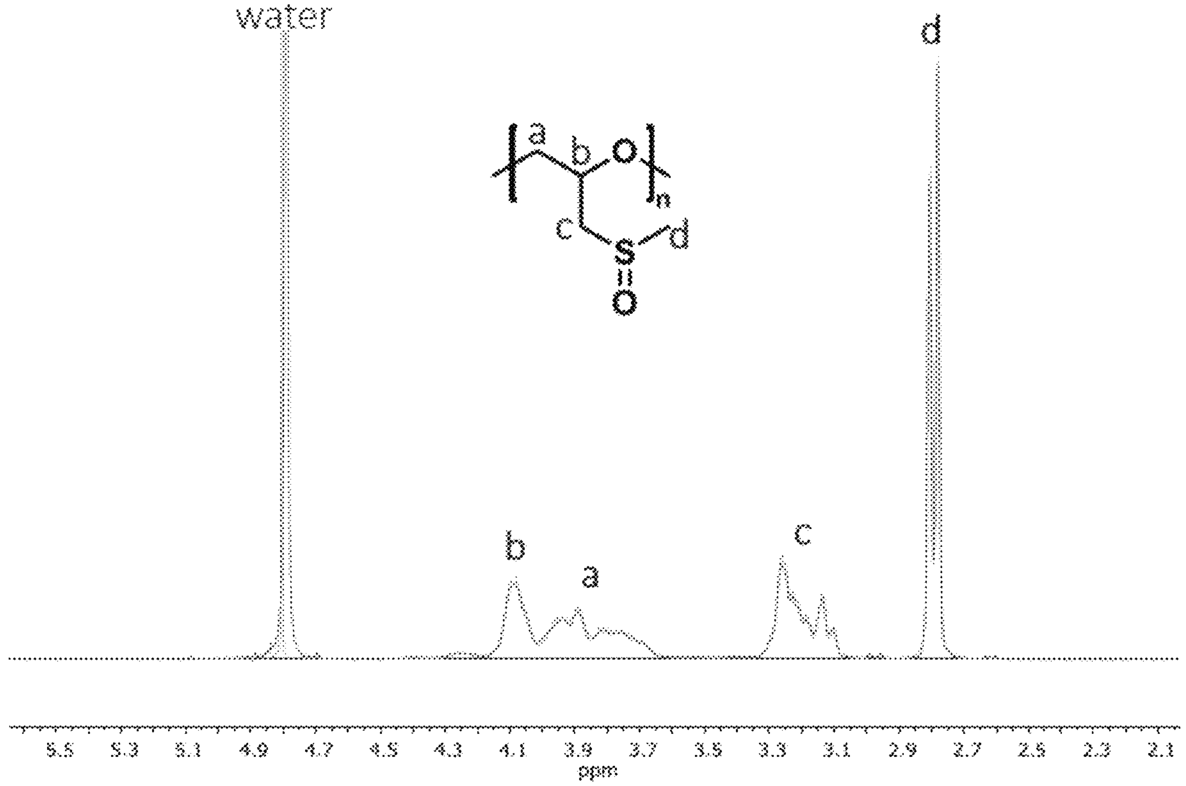
FIG. 22 shows overlaid $^1$H NMR spectra of PGMS before and after storage in PBS buffer for 17 months at 4° C. The two spectra are essentially superimposed, indicating no observable degradation of the PGMS over a period of 17 months.

A solution of PMGS in PBS buffer was stored for 17 months at 4° C. An $^1$H NMR spectra of the PMGS was obtained after storage, and overlaid on the $^1$H NMR spectra of PMGS obtained prior to storage. The results are shown in FIG. 22. The $^1$H NMR spectra of PMGS before and after storage were essentially superimposed, suggesting that no degradation of the PMGS occurred upon storage in buffered aqueous solution for up to 17 months at 4° C.

Freezing Down T-Cells with PMGS

The performance of PMGS as a cryoprotectant for cultured T-cells was evaluated. T-cell were cleaved, counted, and resuspend at a density of $1\times10^6$ cells/mL in either a standard cryopreservation solution (10% DMSO, 40% new media, 40% media that cells have been cultured in; all media included 10% FBS); a PMGS-media cryopreservation solution (10% PMGS, 40% new media, 40% media that cells have been cultured in; all media included 10% FBS), and 10% (by weight) PMGS in PBS. 0.5 mL samples were transferred to 1.9 mL cryovials and frozen at a controlled rate of −1° C./min using Mr. Frosty™ (Nalgene) in a −80° C. freezer overnight. The vials were then transferred into liquid nitrogen for a minimum of 24 hours before thawing. Vials were thawed at 37° C. in a water bath and immediately diluted 10-fold in warm DMEM. After centrifugation the supernatant was removed, and the cell pellet resuspended in 0.5 mL DMEM for counting with an automated cell counter (Invitrogen).

Figure 23:
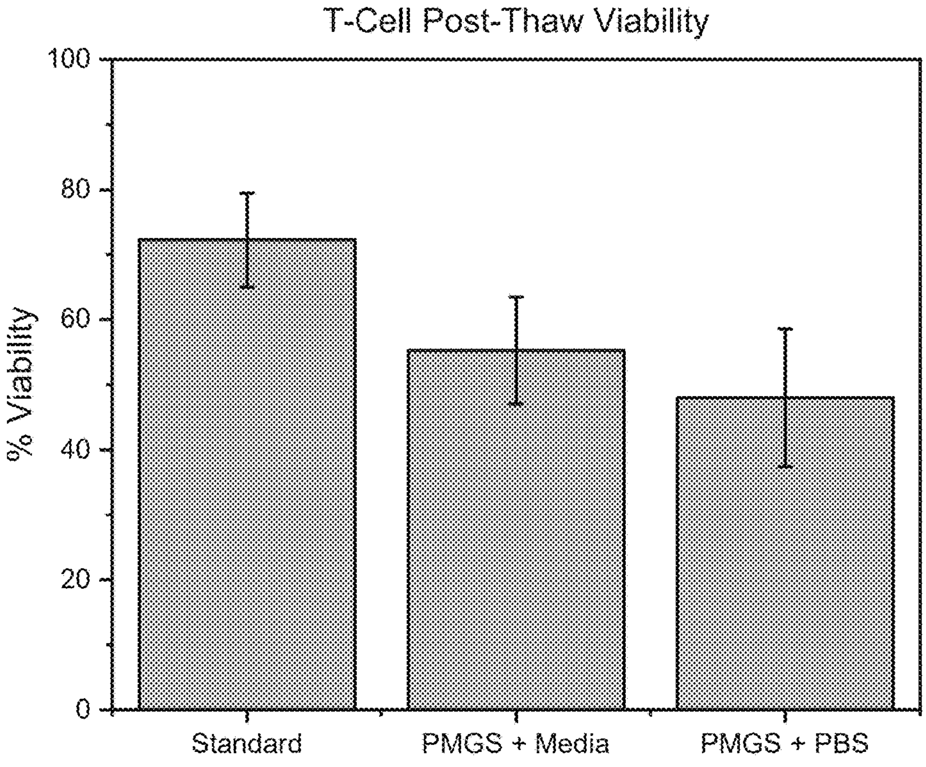
FIG. 23 compares the post-thaw viability of T-cells frozen in a standard cryopreservation solution containing DMSO and two PMGS-containing cryopreservation solutions.

Viability was calculated by dividing the post-thaw cell count by the pre-freezing cell count (two replicates per condition per trial). The results are shown in FIG. 23.

Conclusion

Our results present a breakthrough in the design of polymeric cryoprotectants that may help to enable improved cryopreservation of complex tissue, organs, and medically relevant cell lines. A DMSO-inspired polymer, PMGS, with a methyl sulfoxide pendant group exhibited improved cryoprotective properties compared to DMSO alone. PMGS, like DMSO, can limit the amount of ice formation and keep bound water from freezing even at slow cooling rates and low temperatures. Surprisingly, we found that PMGS promoted osmotic dehydration of cells after ice formation, possibly by maintaining a fluid layer around the cells through which water could diffuse. Our results challenge the assumption that polymer in the unfrozen space between ice crystals should slow osmotic cell dehydration, and they highlight the importance of enabling sufficient cellular water loss when traditional penetrating cryoprotectants are not used.

The discovery and development of a robust approach to cryopreservation could revolutionize regenerative medicine through organ and tissue banking. The synthesis and application of PMGS is a major step towards improving the number of donor organs that reach patients and widening the library of cells and tissues that can be frozen and stored.

Figure 24:
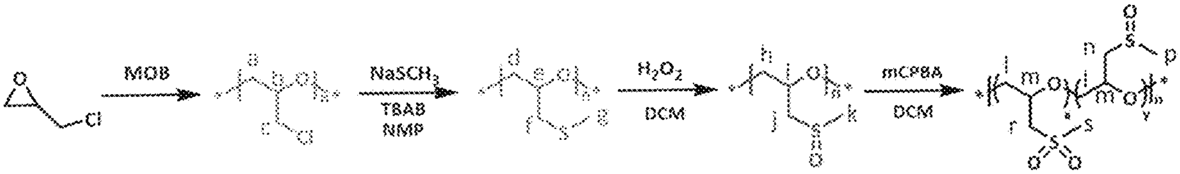
FIG. 24 illustrates a synthetic strategy used to prepare polymeric cryoprotectants with varying ratios of pendant sulfoxide moieties and sulfone moieties.
Figure 25:
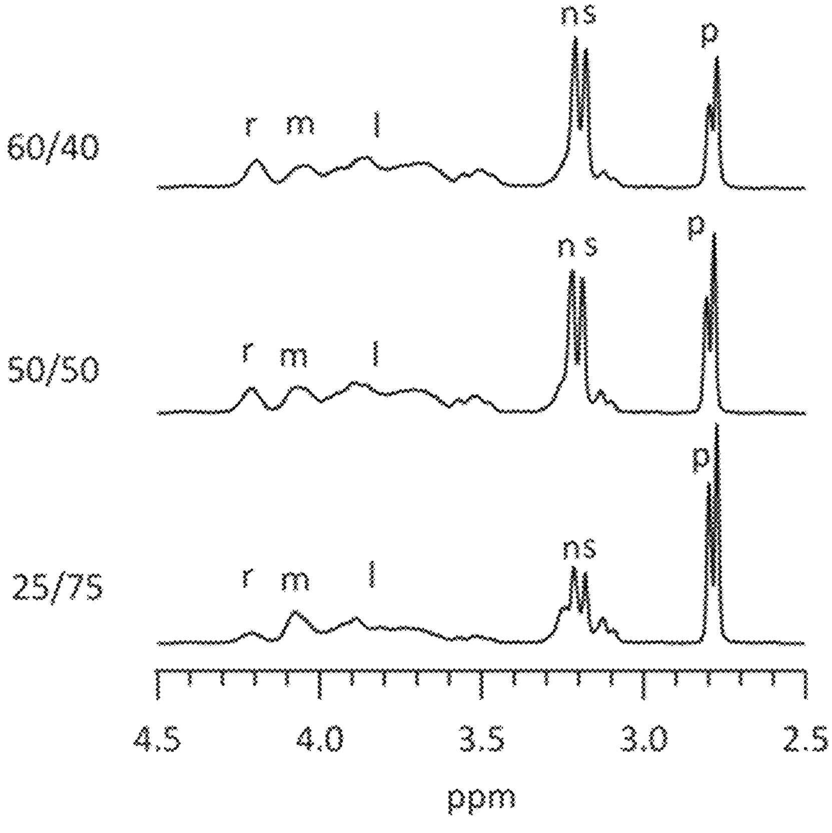
FIG. 25 illustrates $^1$H INMR spectra of a 1:3 sulfone: sulfoxide copolymer and a 1:1 sulfone: sulfoxide copolymer. The ratio of pendant sulfone moieties to pendant sulfoxide moieties was determined by integration of peaks associated with the sulfone and sulfoxide moieties.

Example 3. Polymeric Cryoprotectants Bearing Sulfoxide Moieties and Sulfone Moieties In this example, polymeric cryoprotectants were prepared using oxidation conditions which generate polymeric cryoprotectants containing varying ratios of pendant sulfoxide and sulfone moieties (FIG. 24). The resulting polymeric cryoprotectants are derivatives of PMGS where a portion of the pendant sulfoxide moieties have been converted to sulfone moieties. As shown in FIG. 25, integration of the $^1$H NMR peaks associated with the sulfone and sulfoxide moieties was used to determine the relative proportion of sulfone and sulfoxide moieties present in the resulting copolymers. Using these methods, a 1:3 sulfone:sulfoxide copolymer and the 1:1 sulfone:sulfoxide copolymer were prepared.

Figure 26:
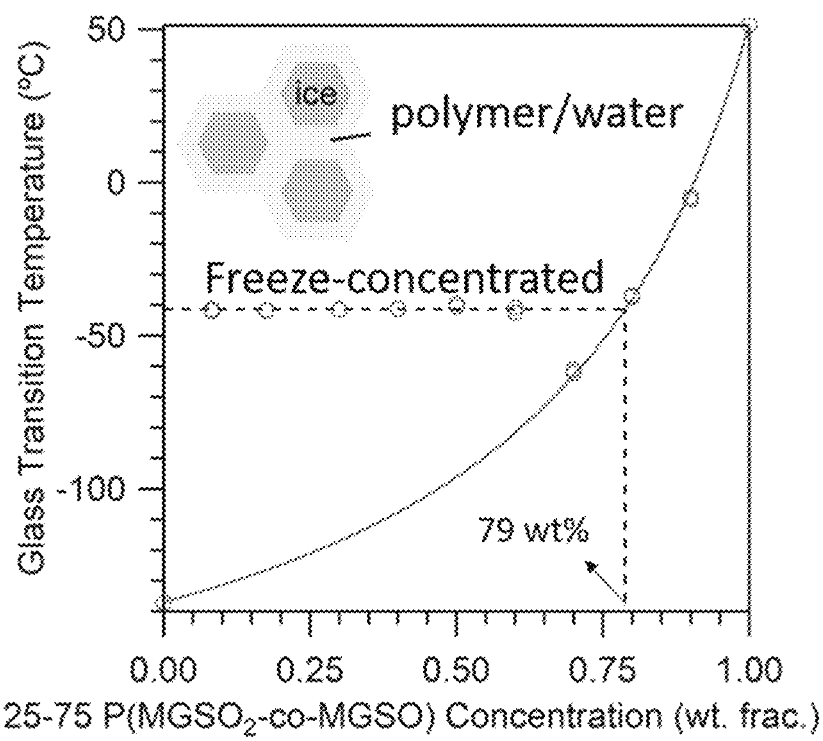
FIG. 26 details the phase behavior of 1:3 sulfone:sulfoxide copolymer solutions.

The phase behavior of these polymers was evaluated in detail. FIG. 26 details the phase behavior of 1:3 sulfone:sulfoxide copolymer solutions. Aqueous 1:3 sulfone:sulfoxide copolymer solutions above 70 wt %, did not freeze during cooling, and their glass transition temperatures were fit to the Gordon-Taylor model. When ice formed, the Tg of the concentrated solution between the ice crystals was independent of initial polymer concentration. Intersection of each trace indicates the concentration of the freeze concentrated solution (79 wt % copolymer).

Figure 27:
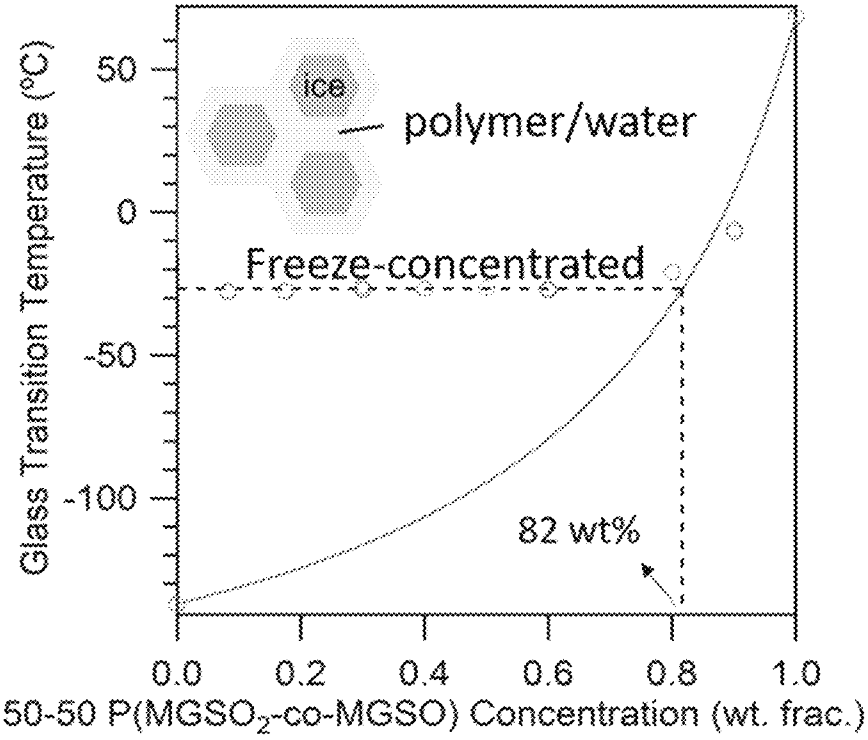
FIG. 27 details the phase behavior of 1:1 sulfone:sulfoxide copolymer solutions.

FIG. 27 details the phase behavior of 1:3 sulfone:sulfoxide copolymer solutions. Aqueous 1:1 sulfone:sulfoxide copolymer solutions above 80 wt %, did not freeze during cooling, and their glass transition temperatures were fit to the Gordon-Taylor model. When ice formed, the Tg of the concentrated solution between the ice crystals was independent of initial polymer concentration. Intersection of each trace indicates the concentration of the freeze concentrated solution (82 wt % copolymer).

Figure 28:
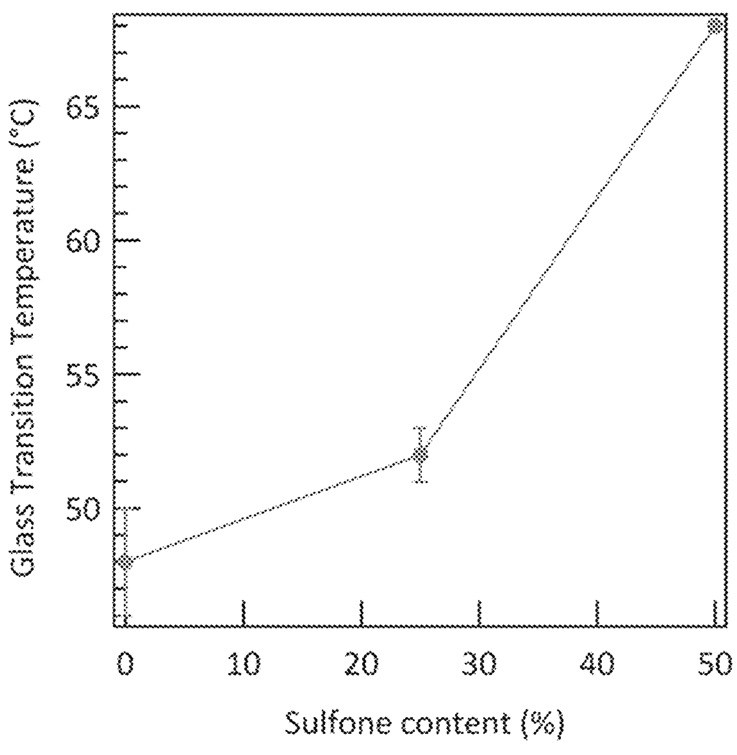
FIG. 28 is a plot summarizing the effect of sulfone content (%) on polymer glass transition temperature (° C.).
Figure 29:
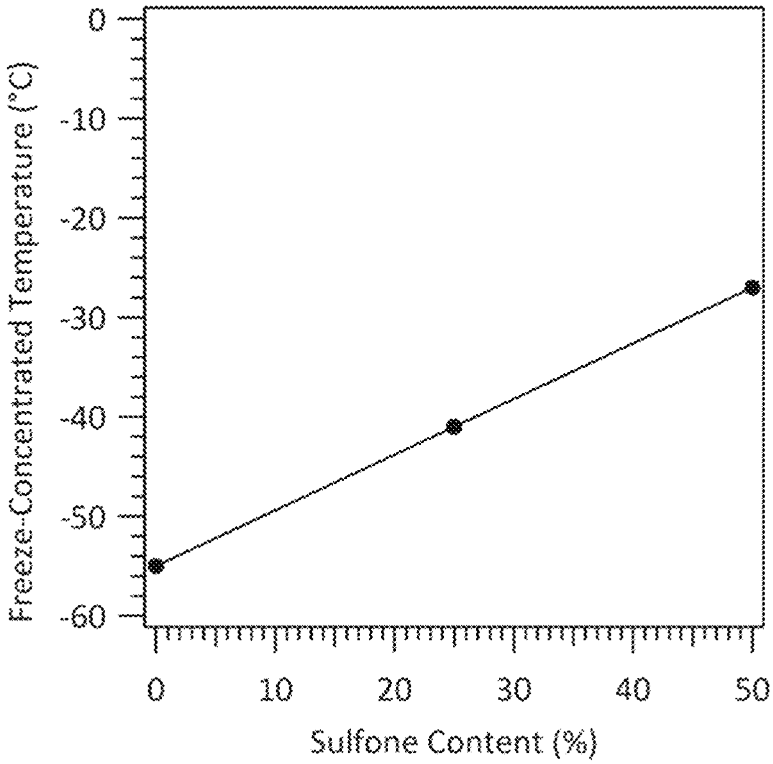
FIG. 29 is a plot summarizing the effect of sulfone content (%) on freeze-concentrated temperature (° C.).

As shown in FIG. 28, as sulfone content present in the copolymer increased, the glass transition temperature increases. Measurements were taken with neat samples (no water present). As shown in FIG. 29, as sulfone content present in the copolymer increased, the temperature of the freeze-concentrated solution (the solution between the ice crystals during the freezing process) increases linearly.

Figure 30:
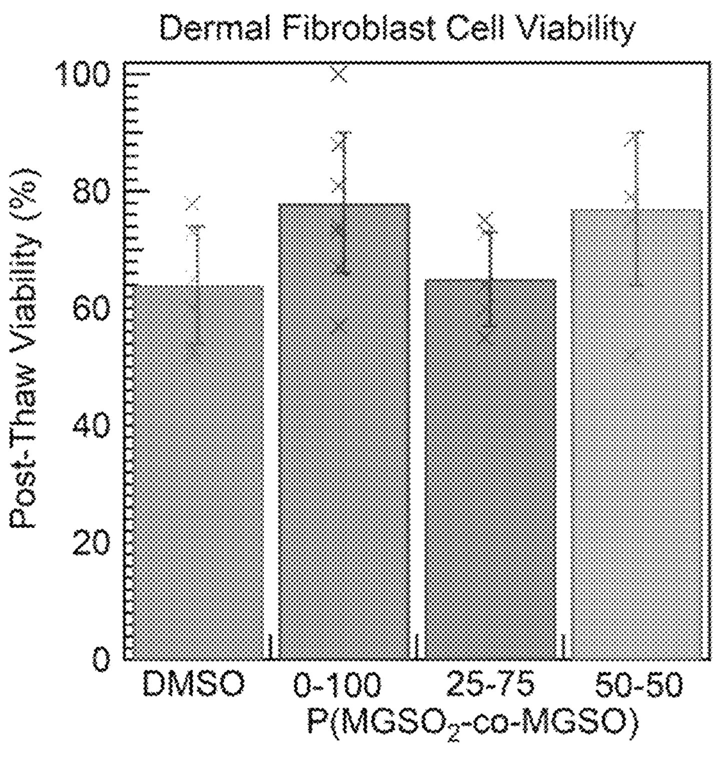
FIG. 30 is a plot showing the post-thaw recovery of dermal fibroblasts preserved in the presence of 10% DMSO, 10% PMGS, 10% 1:3 sulfone:sulfoxide copolymer, and 10% 1:1 sulfone: sulfoxide copolymer.
Figure 32:
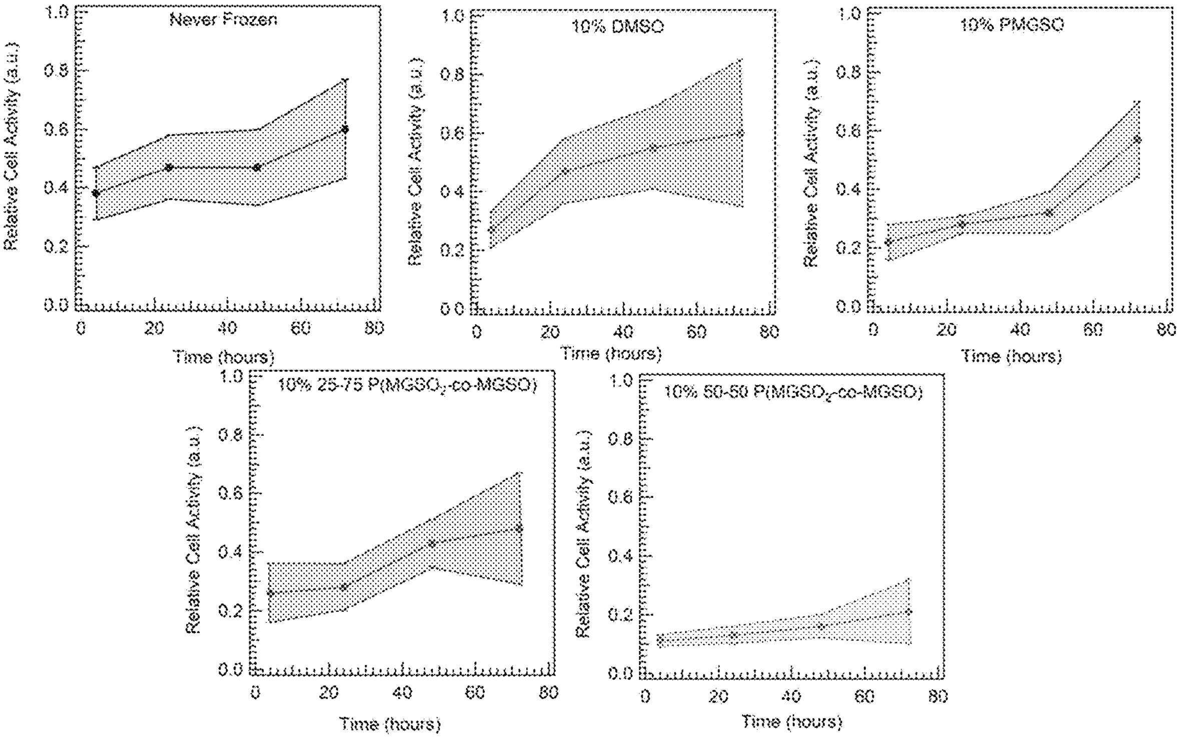
FIG. 32 is a plot showing the results of a proliferation study conducted using 10% DMSO, 10% PMGS, 10% 1:3 sulfone:sulfoxide copolymer, and 10% 1:1 sulfone:sulfoxide copolymer.

The viability of cells frozen in the presence of DMSO, PMGS, the 1:3 sulfone:sulfoxide copolymer, and the 1:1 sulfone:sulfoxide copolymer was assessed using the methods described above. FIG. 30 is a plot showing the post-thaw recovery of dermal fibroblasts preserved in the presence of 10% DMSO, 10% PMGS, 10% 1:3 sulfone:sulfoxide copolymer, and 10% 1:1 sulfone:sulfoxide copolymer. As shown in FIG. 30, an increase in oxidation of the polymer cryoprotectant leads to an increase in post-thaw cell viability. FIG. 32 is a plot showing the results of a proliferation study conducted using 10% DMSO, 10% PMGS, 10% 1:3 sulfone:sulfoxide copolymer, and 10% 1:1 sulfone:sulfoxide copolymer.

Figure 31:
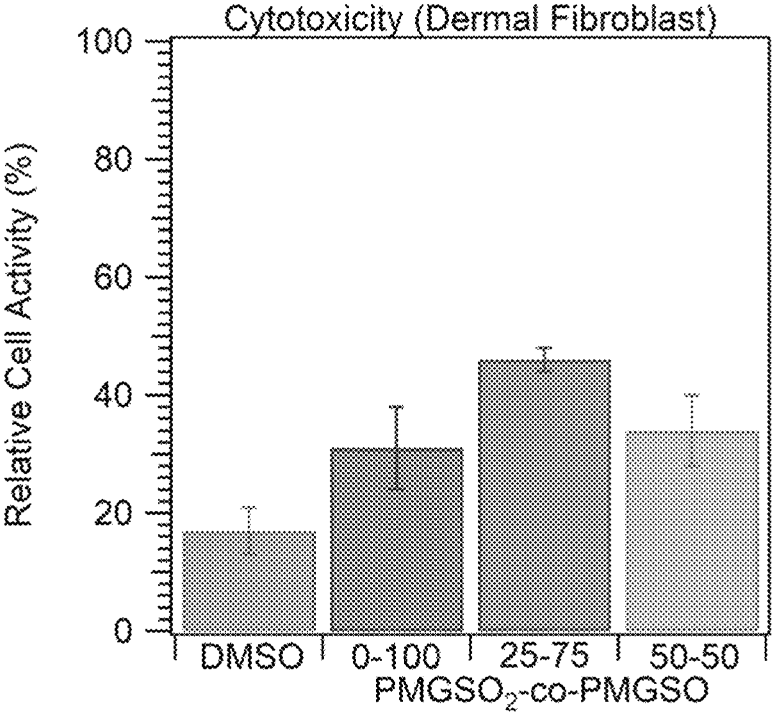
FIG. 31 is a plot showing the cytotoxicity of 10% DMSO, 10% PMGS, 10% 1:3 sulfone:sulfoxide copolymer, and 10% 1:1 sulfone:sulfoxide copolymer.

FIG. 31 is a plot showing the cytotoxicity of 10% DMSO, 10% PMGS, 10% 1:3 sulfone:sulfoxide copolymer, and 10% 1:1 sulfone:sulfoxide copolymer. As shown in FIG. 25, the 1:1 sulfone:sulfoxide copolymer was found to be more toxic than the unoxidized PMGS, while the 1:3 sulfone:sulfoxide copolymer was less toxic than the unoxidized PMGS.

Figure 33:
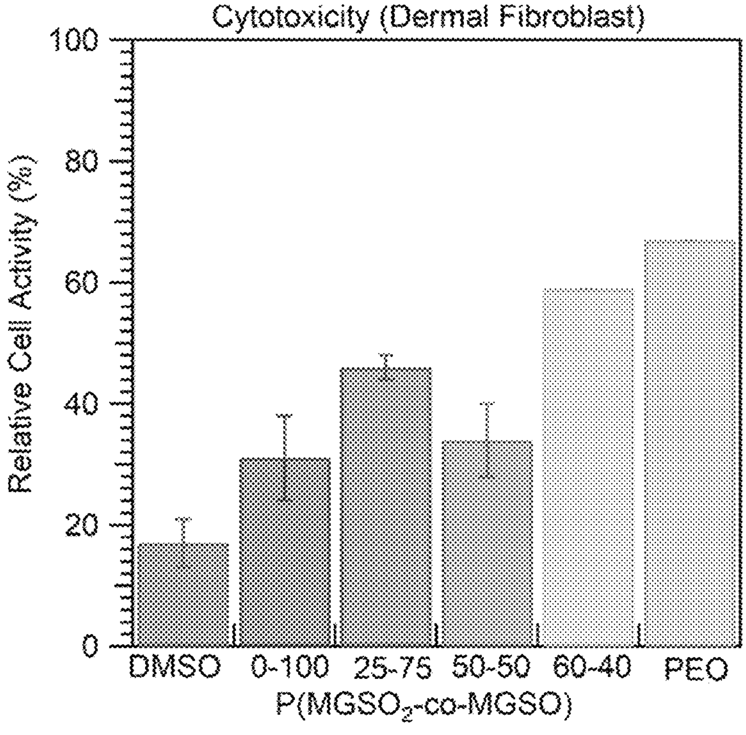
FIG. 33 is a plot showing the cytotoxicity of 10% DMSO, 10% PMGS, 10% 1:3 sulfone:sulfoxide copolymer, 10% 1:1 sulfone:sulfoxide copolymer, 10% 3:2 sulfone:sulfoxide copolymer, and poly(ethylene oxide) (PEO, a known non-toxic polymer included for comparison).

FIG. 33 is a plot showing the cytotoxicity of 10% DMSO, 10% PMGS, 10% 1:3 sulfone:sulfoxide copolymer, 10% 1:1 sulfone:sulfoxide copolymer, 10% 3:2 sulfone:sulfoxide copolymer, and poly(ethylene oxide) (PEO, a known non-toxic polymer). As shown in FIG. 33, all polymers tested exhibited less cytotoxicity than DMSO.

Figure 34:
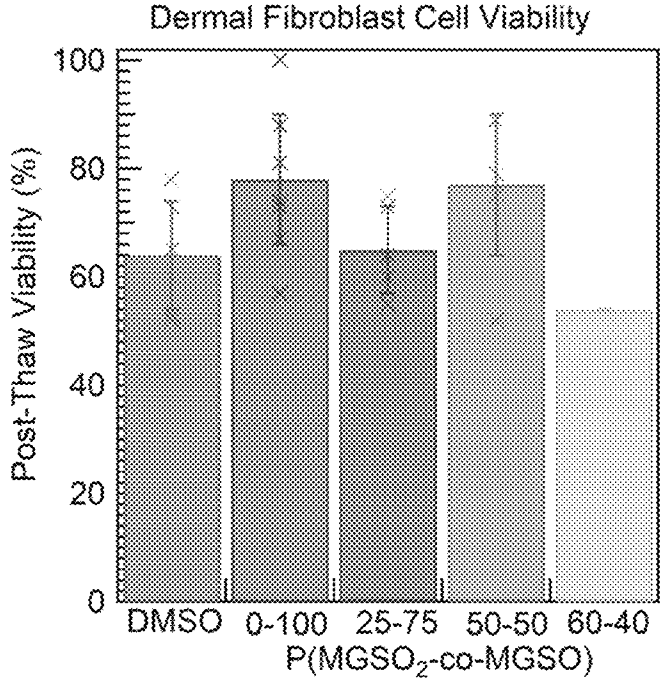
FIG. 34 is a plot showing the post-thaw recovery of dermal fibroblasts preserved in the presence of 10% DMSO, 10% PMGS, 10% 1:3 sulfone:sulfoxide copolymer, 10% 1:1 sulfone:sulfoxide copolymer, and 10% 3:2 sulfone:sulfoxide copolymer.
Figure 35:
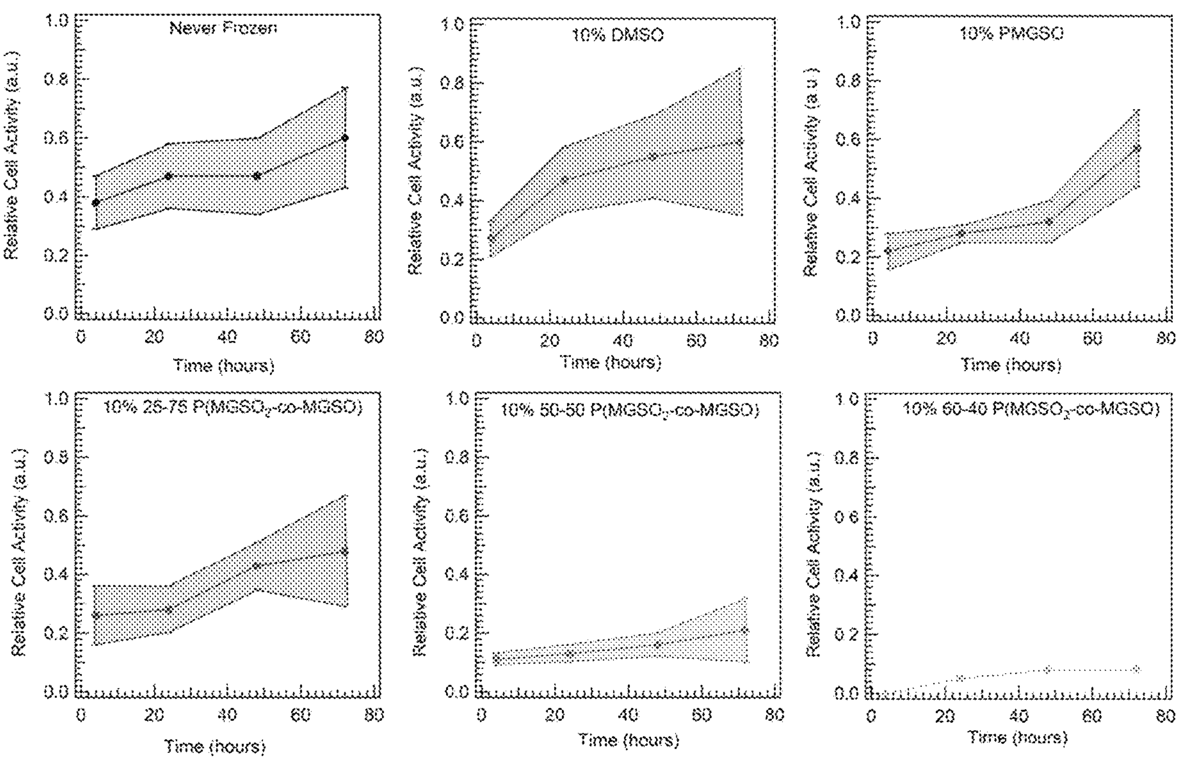
FIG. 35 showing the results of a proliferation study conducted using 10% DMSO, 10% PMGS, 10% 1:3 sulfone: sulfoxide copolymer, 10% 1:1 sulfone:sulfoxide copolymer, and 10% 3:2 sulfone:sulfoxide copolymer.

FIG. 34 is a plot showing the post-thaw recovery of dermal fibroblasts preserved in the presence of 10% DMSO, 10% PMGS, 10% 1:3 sulfone:sulfoxide copolymer, 10% 1:1 sulfone:sulfoxide copolymer, and 10% 3:2 sulfone:sulfoxide copolymer. As shown in FIG. 34, all of the polymeric cryopreservation agents tested exhibited good post-thaw cell viability. FIG. 35 summarizes the results of a proliferation study conducted using 10% DMSO, 10% PMGS, 10% 1:3 sulfone:sulfoxide copolymer, 10% 1:1 sulfone:sulfoxide copolymer, and 10% 3:2 sulfone:sulfoxide copolymer.

In short, these preliminary studies demonstrated that copolymers bearing both sulfoxide moieties and sulfone moieties can function as effective cryoprotectants (in fact better than conventional cryoprotectants such as DMSO).

Example 4. Beyond PMGS—Structural Variation of Sulfoxide-Functional Polymeric Cryoprotectants Membrane stabilization is hypothesized to be a key mechanism through which polymeric cryoprotectants protect cells against damage during freezing. For some methacrylate-based polyampholytes, adding hydrophobic moieties to the polymer chain improved post-thaw survival, purportedly because of its ability to interact with hydrophobic parts of the membrane. It has also been hypothesized that DMSO functions as a cryoprotective by dehydrating phospholipid head groups and increasing surface water diffusion rates.

Figure 36:
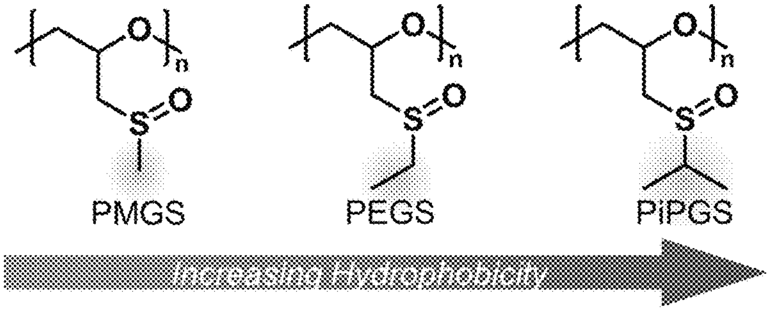
FIG. 36 illustrates how the hydrophobicity of sulfoxide-functional polyethers was increased by increasing the size of the pendant alkyl group.

PMGS is a relatively hydrophilic polymer. It was therefore hypothesized that its interaction with the cell membrane could be increased by replacing the methyl group with longer alkyl chains. See FIG. 36.

In a complementary investigation, charged units were also incorporated into PMGS in order to reduce interaction with the cell membrane. The hypothesis was that a negatively charged polymer would be less likely to interact with a cell membrane, which carries a net-negative charge. In turn, we predicted that polymer cytotoxicity would decrease. However, this turned out not to be the case, as will be explained in more detail below.

Materials and Methods

Epichlorohydrin (TCI), ethanethiol (TCI), 2-propanethiol (TCI), 1,8-Diazabicyclo[5.4.0]undec-7-ene (Alfa Aesar, 99%), acetic acid (Sigma-Aldrich, ACS reagent 99.7%) dimethyl formamide (Fisher, Certified ACS), methanol (Fisher), hydrogen peroxide (Acros Organics, 30 wt % solution in water), and methylene chloride (Fisher, Certified ACS/Stabilized) were used as received.

Synthesis of Poly(ethyl glycidyl sulfoxide) (PEGS). In a round-bottom flask, PECH (1.5 g) was dissolved in 20 mL of dimethyl formamide (DMF). Then, ethanethiol (1.8 mL, 1.5× mol equivalents relative to PECH) and 1,8-diazabicyclo[5.4.0]undec-7-ene (DBU) (1× mol equiv.) were added to the flask while stirring. The mixture reacted at room temperature for one day, and the resulting poly(ethyl glycidyl thioether) (PEGT) was precipitated and washed twice using methanol. Residual thiol in the supernatant was neutralized with a 1:10 DI water:bleach solution. PEGT was then dissolved in minimal DCM and reacted with 1.5× molar equivalents of $H_2O_2$ to yield the PEGS. PEGS polymer was dissolved in DI water and purified by dialysis. Dry PEGS was obtained after lyophilizing the aqueous polymer solution over two days.

Synthesis of Poly(isopropyl glycidyl sulfoxide) (PiPGS). In a round-bottom flask, PECH (1.5 g) was dissolved in DMF (20 mL). While stirring, 2-propanethiol (2-PT) (7 mL, 5× mol equivalents relative to PECH) and DBU (2.4 mL, 1× mol equiv. rel. to PECH) were added sequentially. The mixture was then heated to 50° C. and allowed to react for at least two days. The resulting poly(isopropyl glycidyl thioether) (PiPGT) was precipitated and washed twice using methanol. Any residual thiol in the supernatant was neutralized with a 1:10 DI water:bleach solution. The polymer was then dissolved in DCM and then dried in vacuo overnight. The purified PiPGT was then dissolved in acetic acid (16 mL), and $H_2O_2$ was added dropwise. A water bath may be helpful to temper the exothermic reaction. After stirring the mixture for ~20 min, the reaction was quenched using an aqueous 10 wt % sodium thiosulfate solution. The aqueous solution was transferred to a separatory funnel, and the PiPGS was extracted with DCM twice. The organic layer was then washed with DI water to remove residual salts, and the aqueous layer was decanted. DCM in the organic layer was evaporated, and the polymer was dried in vacuo overnight. The PiPGS was then dissolved in DI water and purified by dialysis. Dry PiPGS was recovered by lyophilizing over two days.

Synthesis of Carboxylate-Containing PMGS. 1 g of PECH was dissolved in 10 mL of dry NMP with 87 mg TBAB. Once dissolved, methyl thioglycolate was added to target 10, 20, or 30% carboxylate-functional repeat units. Then 5M NaOH was added in a 1:1 molar ratio to methyl thioglycolate to convert the thiol to a thiolate. The mixture was allowed to stir for 1 hr at room temp, at which point $NaSCH_3$ (21 wt % in water) was added dropwise to the mixture. Reagent amounts are specified in Table 5.1. The reaction was allowed to proceed for 16 h at room temperature. 200 mL of deionized water was added to precipitate the resulting thioether. The polymer was washed twice more with 50 mL of deionized water, then dried under vacuum. Thioether oxidation was performed as described above.

Results and Discussion

Figure 37A:
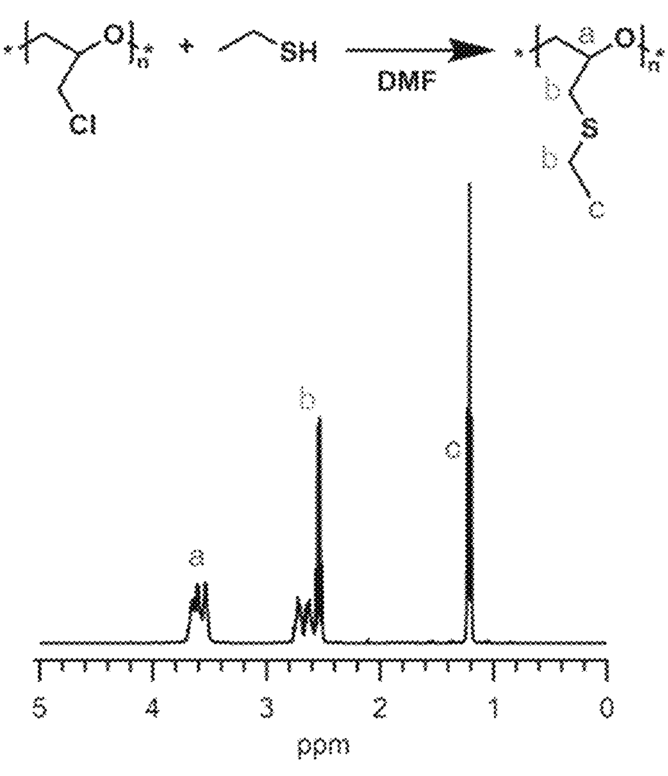
FIG. 37A illustrates the synthesis of poly(ethyl glycidyl thioether) (PEGT) and its 41 NMR spectrum in $CDCl_3$.
Figure 37B:
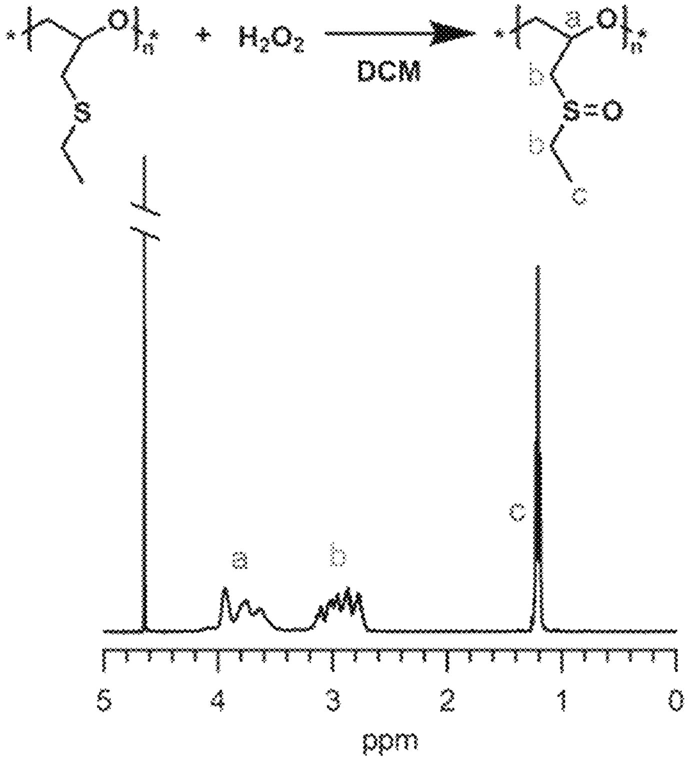
FIG. 37B illustrates the synthesis of poly(ethyl glycidyl sulfoxide) (PEGS) and its $^1$H NMR spectrum in D20.
Figure 38A:
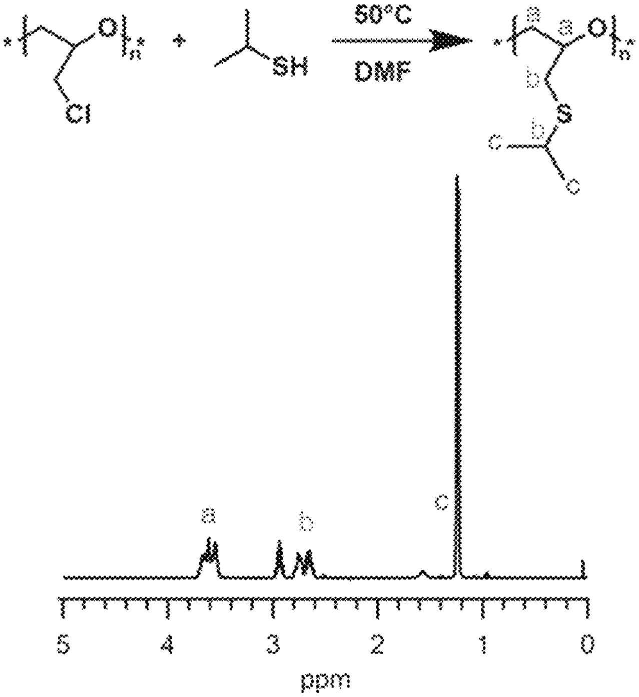
FIG. 38A illustrates the synthesis of poly(isopropyl glycidyl thioether) (PiPGT) and its $^1$H NMR spectrum in $CDCl_3$.
Figure 38B:
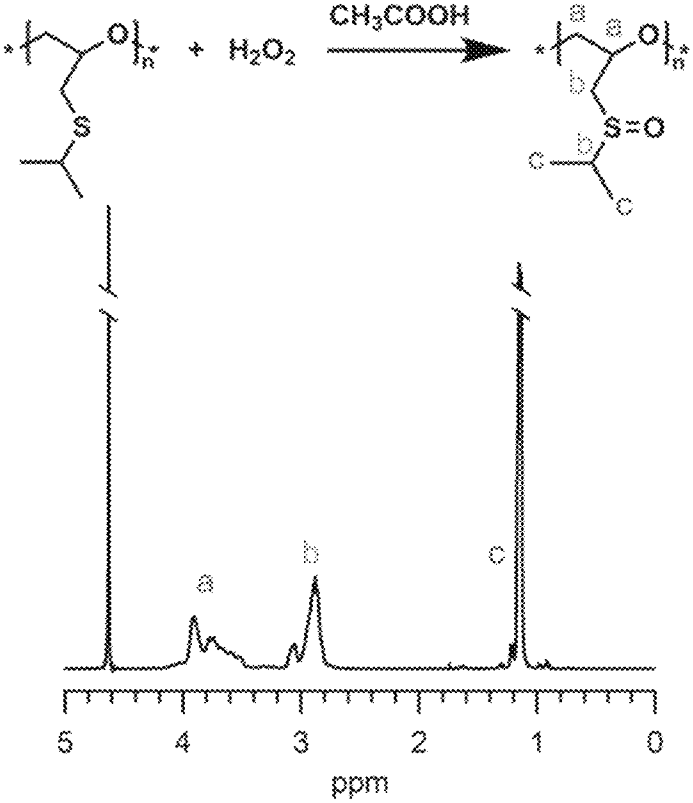
FIG. 38B illustrates the synthesis of poly(isopropyl glycidyl sulfoxide) (PiPGS) and its $^1$H NMR spectrum in $D_2O$.

Synthesis and characterization of PEGS and PiPGS. PEGS was synthesized via post-polymerization modification of polyepichlorohydrin (PECH). In the first step of the reaction, the chloride pendant on PECH was displaced with an ethyl thiolate. The resulting thioether was then oxidized using hydrogen peroxide. Successful synthesis was verified using $^1H$ NMR, as shown in FIG. 37A and FIG. 37B. PiPGS was synthesized similarly, but elevated temperature (50° C.) was necessary to displace the chloride with secondary thiolate. Additionally, a stronger oxidant (acetic peracid) was necessary to convert the resulting thioether to a sulfoxide. See FIGS. 38A-38B.

Figure 39:
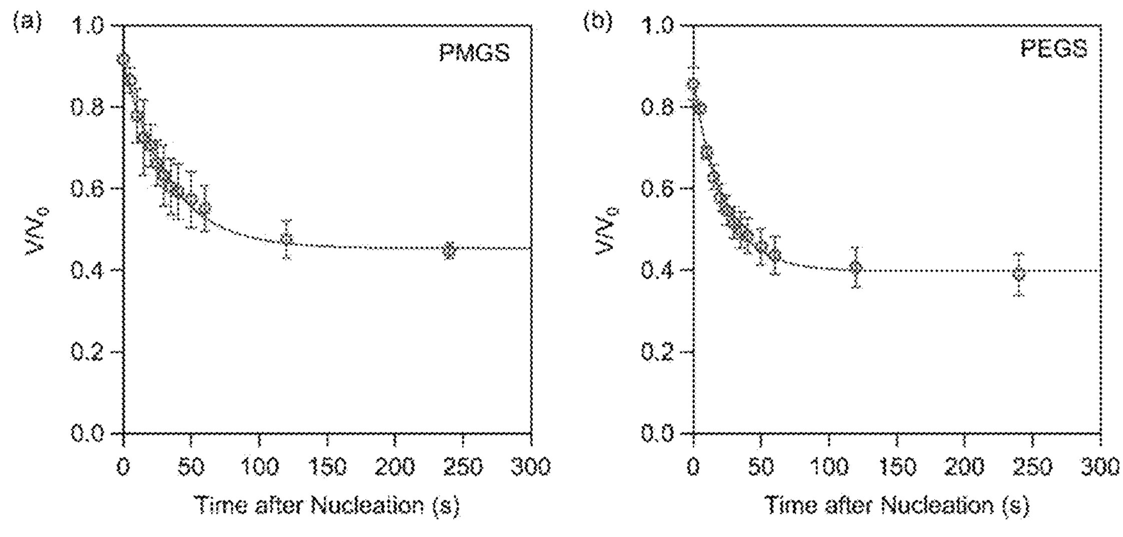
FIG. 39 illustrates the cell dehydration kinetics for NHDF cells frozen in the presence of 10 wt % PMGS (panel A) and those frozen with 10 wt % PEGS (panel B). Cells were cooled at 1° C./min.

Cell dehydration. The rate and extent to which cells dehydrate upon freeze-concentration of solutes is an important feature of cryopreservation. In a side-by-side comparison of cell dehydration in the presence of PMGS and PEGS, both derived from 30 kDa PECH, it was shown that cell dehydration kinetics were similar in both cases. See FIG. 39.

Figure 40:
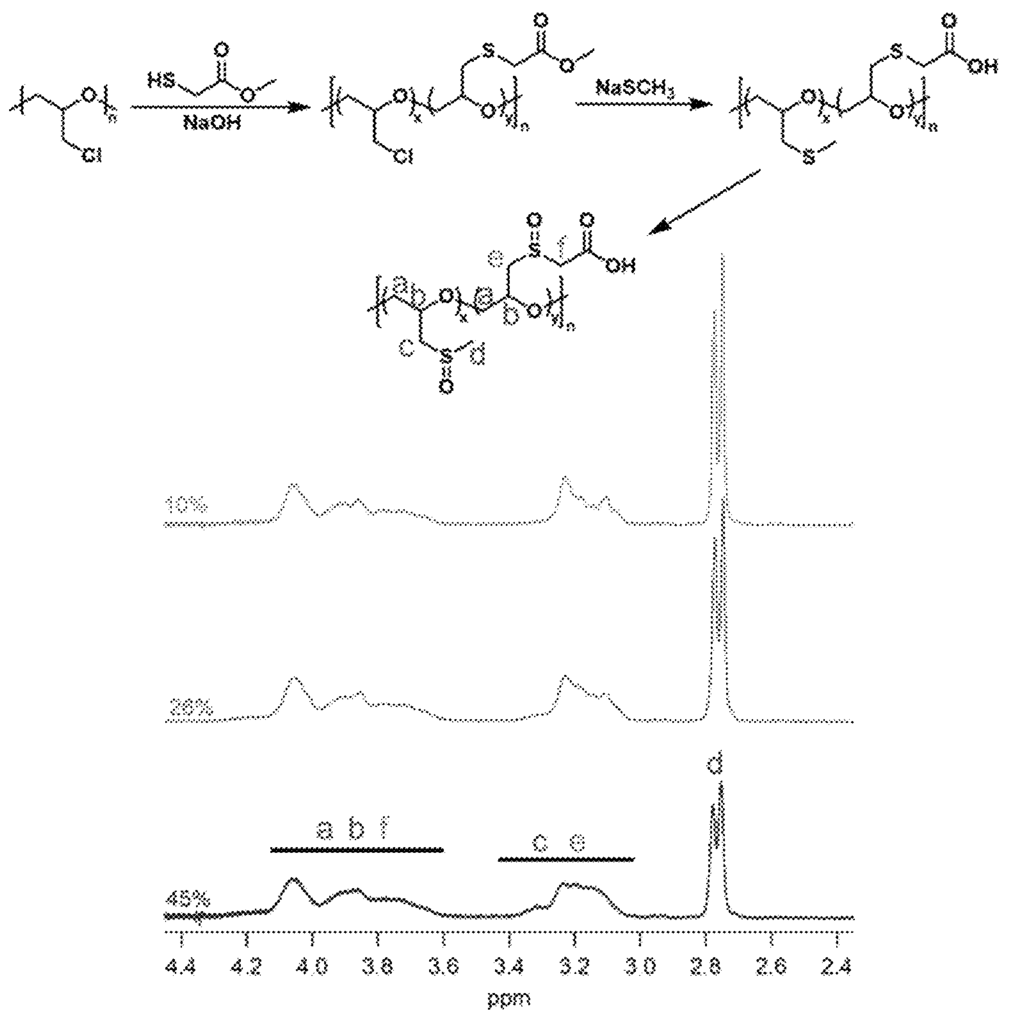
FIG. 40 illustrates the synthesis and $^1$H NMR spectra of carboxylate-functional PMGS. The percentage above each spectrum represents the calculated proportion of repeat units bearing carboxylate functionality.

Synthesis of Carboxylate-Functional PMGS. To append carboxylate functionality to PECH, the pendant chloride groups were displaced with methyl thioglycolate. It was determined to be necessary to use a methyl ester rather than a carboxylate such as mercaptoacetic acid due to solubility concerns. On a related note, it was necessary to react PECH with methyl thioglycolate prior to adding aqueous methane thiolate because otherwise the ester bonds would cleave, rendering the methyl thioglycolate insoluble. Conveniently, however, addition of methane thiolate would not only displace remaining chloride units on PECH, but would also cleave any remaining esters on the polymer pendant, obviating the need for an additional reaction step. 2× molar excess of each thiol was used to ensure complete conversion of PECH chloride units, but at high —COOH contents, the intended stoichiometry was not precisely achieved, as shown in Table 3. The percentage of repeat units with —COOH functionality was calculated by comparing the peak integrals at 2.8 ppm with those at 3.2 ppm in the $^1H$ NMR spectra (FIG. 40).

TABLE 3

The percent of repeat units with carboxylate functionality was controlled by changing the ratio of methyl thioglycolate to sodium thiomethoxide. All reactions were performed with 1 g 30 kDa PECH as starting material.

| Target —COOH content (mol %) | Measured —COOH content (mol %) | Methyl Thioglycolate (mL) | $NaSCH_3$, 21 wt % (mL) |
|---|---|---|---|
| 10 | 10 | 0.19 | 6.5 |
| 20 | 26 | 0.39 | 5.8 |
| 30 | 45 | 0.58 | 5.1 |

Figure 41:
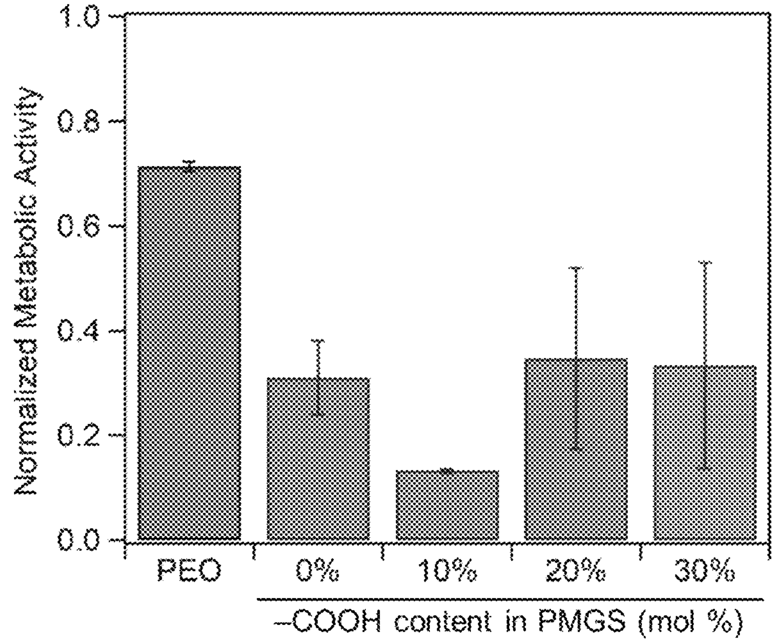
FIG. 41 illustrates the cellular metabolic activity of NHDF cells after incubating in the presence of 10 wt % polymer in media for 24 h normalized to metabolic activity of those incubating in media without polymer. Metabolic activity was determined using an MTT absorbance assay.

Cytotoxicity of Carboxylate-Functional PMGS. Contrary to expectation, carboxylate functional PMGS was found to have similar cytotoxicity to PMGS with no carboxylate groups in preliminary experiments (FIG. 41). In contrast, higher carboxylate content was found to dramatically decrease cytotoxicity for the PAGE-based polyampholyte. One challenge with using carboxylate moieties to decrease toxicity is that significant amounts of NaOH mush be added to balance buffer pH after polymer addition, potentially introducing osmotic stresses to cells.

Conclusions and Outlook. Successful synthesis of several PMGS-derivatives was demonstrated. For hydrophobic derivatives, detailed evaluation of post-thaw cell recovery is needed to establish whether larger alkyl pendants improve post-thaw viability. Fluorescent studies with cells and with liposomes could provide evidence of the effect of hydrophobicity on cell membrane interaction. More quantitative characterization could potentially be achieved with Overhauser dynamic nuclear polarization (ODNP) experiments to show proximity to spin probes incorporated in liposomes, 2D FTIR experiments to show changes in hydrogen-bonding dyanimcs for phospholipid carbonyl groups, and quartz crystal microbalance (QCM) measurements of polymer adsorption to lipid bilayers. In principle isothermal titration calorimetry (ITC) could also characterize polymer/liposome adsorption but preliminary measurements have had issues with reproducibility.

Preliminary results indicate that incorporating carboxylate groups into PMGS does not reduce toxicity, so alternative approaches are likely necessary. Copolymerization with non-toxic repeat units such as poly(ethylene oxide) and poly(glycidol) could also potentially reduce toxicity. Examples of potentially interesting polymers include those shown below (where m, n, x, y, and z are each individually integers from 2 to 500).

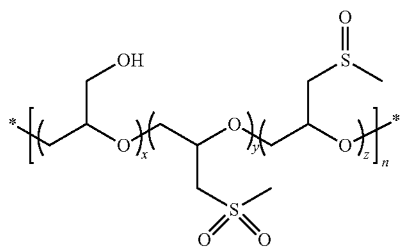

PG-*co*-PMGSO$_2$-*co*-PMGSO

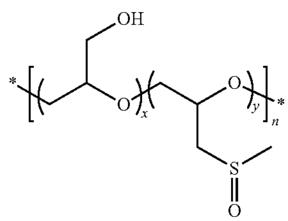

PG-*co*-PMGSO

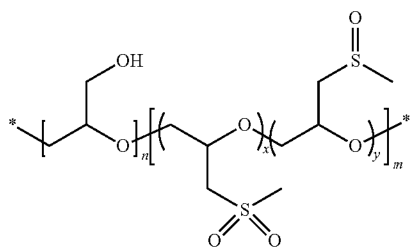

PG-*b*-PMGSO$_2$-*co*-PMGSO

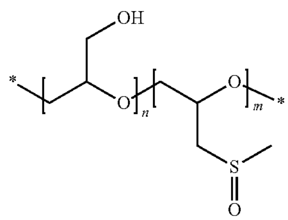

PG-*b*-PMGSO

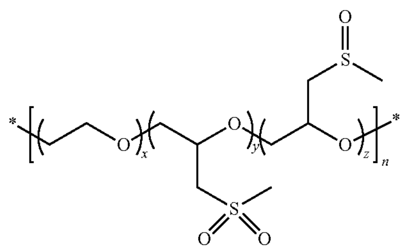

PEO-*co*-PMGSO$_2$-*co*-PMGSO

-continued

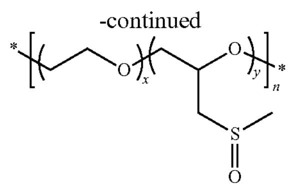

PEO-*co*-PMGSO

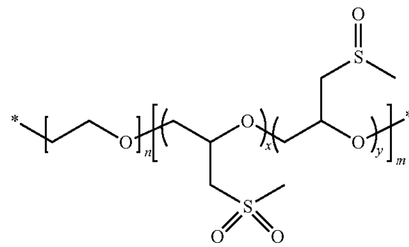

PEO-*b*-PMGSO$_2$-*co*-PMGSO

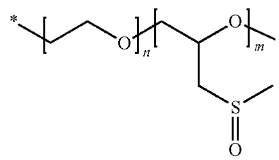

PEO-*b*-PMGSO

The effects of sulfoxide/sulfone ratio in PMGS on cryopreservation is currently being investigated. Increasing sulfone content could potentially affect cryopreservation by affecting water solubility, increasing the number of hydrogen bond acceptors, and increasing the $T_g$ of the unfrozen space between ice crystals.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative components, compositions, and method steps disclosed herein are specifically described, other combinations of the components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A cryoprotection solution for the preservation of a biological material, the solution comprising: (i) water and (ii) a cryoprotective polymer comprising a polymer backbone bearing one or more sulfoxide-containing sidechains and one or more sulfone-containing sidechains.

2. The solution of claim 1, wherein the cryoprotective polymer is present in the cryoprotective solution in an amount of from 0.1% by weight to 70% by weight, based on the total weight of the cryoprotective solution.

3. The solution of claim 1, wherein the cryoprotective polymer comprises a linear polymer or a branched polymer.

4. The solution of claim 1, wherein the cryoprotective polymer comprises a random copolymer.

5. The solution of claim 1, wherein the ratio of the one or more sulfone-containing sidechains to the one or more sulfoxide-containing sidechains is from 5:1 to 1:5.

6. The solution of claim 1, wherein the polymer backbone comprises a poly(alkylene oxy) backbone.

7. The solution of claim 6, wherein the cryoprotective polymer comprises a polymer or copolymer comprising repeat units defined by the general formula below

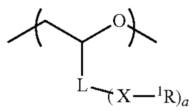

wherein

L is, individually for each occurrence, absent or represents a linking group;

X represents, individually for each occurrence, S(═O) or $S(═O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl; and a represents an integer of from 1 to 6.

8. The solution of claim 7, wherein the cryoprotective polymer comprises a polymer defined by the general formula below

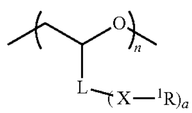

wherein

L is, individually for each occurrence, absent or represents a linking group;

X represents, individually for each occurrence, S(═O) or $S(═O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

n represents an integer from 2 to 500; and a represents an integer of from 1 to 6.

9. The solution of claim 7, wherein the cryoprotective polymer comprises a polymer defined by the general formula below

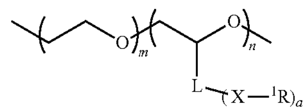

wherein

L is, individually for each occurrence, absent or represents a linking group;

X represents, individually for each occurrence, S(═O) or $S(═O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

m represents an integer from 2 to 500;

n represents an integer from 2 to 500; and a represents an integer of from 1 to 6.

10. The solution of claim 7, wherein the cryoprotective polymer comprises a polymer defined by the general formula below

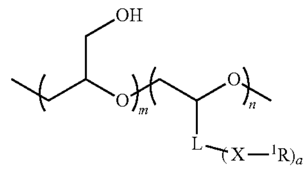

wherein

L is, individually for each occurrence, absent or represents a linking group;

X represents, individually for each occurrence, S(═O) or $S(═O)_2$;

$^1R$ represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

m represents an integer from 2 to 500;

n represents an integer from 2 to 500; and a represents an integer of from 1 to 6.

11. The solution of claim 1, wherein the polymer backbone comprises a poly(alkylene) backbone.

12. The solution of claim 11, wherein the cryoprotective polymer comprises a polymer or copolymer comprising repeating monomer units defined by the general formula below

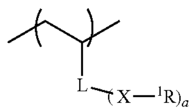

wherein

L is, individually for each occurrence, absent or represents a linking group;

X represents, individually for each occurrence, S(=O) or $S(=O)_2$;

[1]R represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl; and a represents an integer of from 1 to 6.

13. The solution of claim 12, wherein the cryoprotective polymer comprises a polymer defined by the general formula below

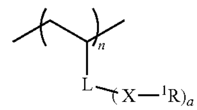

wherein

L is, individually for each occurrence, absent or represents a linking group;

X represents, individually for each occurrence, S(=O) or $S(=O)_2$;

[1]R represents, individually for each occurrence, substituted or unsubstituted C1-C8 alkyl, substituted or unsubstituted C2-C8 heteroalkyl, substituted or unsubstituted C2-C8 alkenyl, substituted or unsubstituted C2-C8 alkynyl, substituted or unsubstituted C6-C12 aryl, substituted or unsubstituted C4-C12 heteroaryl, substituted or unsubstituted C3-C12 cycloalkyl, substituted or unsubstituted C2-C12 cycloheteroalkyl, substituted or unsubstituted C2-C12 alkylaryl, or substituted or unsubstituted C4-C12 alkylcycloalkyl;

n represents an integer from 2 to 500; and a represents an integer of from 1 to 6.

14. The solution of claim 1, wherein the solution further comprises a penetrating cryoprotective agent, a non-penetrating cryoprotective agent, a toxicity reducing agent, or any combination thereof.

15. A method for the cryopreservation of a biological material, the method comprising:

contacting the biological material with a cryoprotectant solution defined by claim 1; and freezing the biological material in contact with the cryoprotectant solution.

16. The solution of claim 1, wherein the cryoprotective polymer comprises a block copolymer.

* * * * *